United States Patent
Jeong et al.

(10) Patent No.: US 9,204,199 B2
(45) Date of Patent: Dec. 1, 2015

(54) IMAGE DISPLAY APPARATUS AND METHODS FOR OPERATING THE SAME

(71) Applicant: LG ELECTRONICS INC., Seoul (KR)

(72) Inventors: Woojin Jeong, Seoul (KR); Hoduk Jang, Seoul (KR); Byungyoon Lee, Seoul (KR); Yoehan O, Seoul (KR); Jaeug Lew, Seoul (KR); Jinho Hyun, Seoul (KR); Joonghee Han, Seoul (KR)

(73) Assignee: LG Electronics Inc., Seoul (KR)

(*) Notice: Subject to any disclaimer, the term of this patent is extended or adjusted under 35 U.S.C. 154(b) by 390 days.

(21) Appl. No.: 13/688,057

(22) Filed: Nov. 28, 2012

(65) Prior Publication Data

US 2013/0145395 A1  Jun. 6, 2013

(30) Foreign Application Priority Data

| Dec. 6, 2011 | (KR) | 10-2011-0129854 |
| Apr. 3, 2012 | (KR) | 10-2012-0034537 |
| Apr. 17, 2012 | (KR) | 10-2012-0039823 |
| May 8, 2012 | (KR) | 10-2012-0048754 |
| Jul. 25, 2012 | (KR) | 10-2012-0081318 |
| Aug. 8, 2012 | (KR) | 10-2012-0086762 |

(51) Int. Cl.

| H04N 21/482 | (2011.01) |
| H04N 21/438 | (2011.01) |
| H04N 21/44 | (2011.01) |
| H04N 21/2665 | (2011.01) |
| H04N 21/654 | (2011.01) |
| H04N 21/658 | (2011.01) |
| H04N 21/475 | (2011.01) |
| H04N 21/234 | (2011.01) |
| H04N 21/422 | (2011.01) |
| H04N 21/433 | (2011.01) |

(Continued)

(52) U.S. Cl.
CPC ............. *H04N 21/4821* (2013.01); *H04N 5/50* (2013.01); *H04N 21/231* (2013.01); *H04N 21/25841* (2013.01); *H04N 21/2665* (2013.01); *H04N 21/4345* (2013.01); *H04N 21/4383* (2013.01); *H04N 21/44008* (2013.01); *H04N 21/4823* (2013.01); *H04N 21/654* (2013.01); *H04N 21/6582* (2013.01); *H04N 21/23418* (2013.01); *H04N 21/42204* (2013.01); *H04N 21/4334* (2013.01); *H04N 21/4722* (2013.01); *H04N 21/4756* (2013.01); *H04N 21/47214* (2013.01); *H04N 21/485* (2013.01); *H04N 21/8133* (2013.01)

(58) Field of Classification Search
None
See application file for complete search history.

(56) References Cited

U.S. PATENT DOCUMENTS

| 7,478,414 | B1 | 1/2009 | Glusker et al. | |
| 2004/0001081 | A1* | 1/2004 | Marsh | 345/721 |
| 2005/0108751 | A1* | 5/2005 | Dacosta | 725/39 |

(Continued)

FOREIGN PATENT DOCUMENTS

EP   2290956 A2   3/2011

*Primary Examiner* — Mark D Featherstone

(74) *Attorney, Agent, or Firm* — Birch, Stewart, Kolasch & Birch, LLP

(57) ABSTRACT

An image display apparatus, a server, and methods for operating the same are disclosed. The method for operating an image display apparatus includes displaying a broadcast program list listing a plurality of broadcast programs, receiving, upon selection of one of the plurality of broadcast programs, a broadcast signal of the selected broadcast program, and displaying the received broadcast program. The broadcast program list includes real-time viewer rating information, a thumbnail image, and a name for each of the plurality of broadcast programs.

18 Claims, 72 Drawing Sheets

(51) Int. Cl.
*H04N 21/472* (2011.01)
*H04N 21/4722* (2011.01)
*H04N 21/485* (2011.01)
*H04N 21/81* (2011.01)
*H04N 5/50* (2006.01)
*H04N 21/434* (2011.01)
*H04N 21/231* (2011.01)
*H04N 21/258* (2011.01)

(56) References Cited

U.S. PATENT DOCUMENTS

| | | | |
|---|---|---|---|
| 2005/0223322 A1* | 10/2005 | Graham et al. | 715/526 |
| 2008/0097984 A1 | 4/2008 | Candelore | |
| 2009/0254964 A1 | 10/2009 | Park et al. | |
| 2010/0169919 A1 | 7/2010 | Du Breuil | |
| 2011/0047578 A1* | 2/2011 | Kim et al. | 725/56 |
| 2013/0198768 A1* | 8/2013 | Kitazato | 725/19 |

* cited by examiner (a)  (b)

| Name | Number | Number | Number |
|---|---|---|---|
| Type | ECONOMICAL | BASIC | PREMIUM |
| MBC GAME | 607 | 607 | 607 |
| ON GAME NET | 608 | 608 | 608 |
| BADOOK TV | 621 | 621 | 621 |
| FTV | | 622 | 622 |
| FSTV | | 623 | 623 |
| MOUNTAIN TV | | 624 | 624 |
| BRAIN TV | | | 625 |
| LIVING TV | | | 626 |

1382   1384   1386

T = t₁

T = t₂

T = t₃

T = t₄

T = t₅

T = t₆

IMAGE DISPLAY APPARATUS AND METHODS FOR OPERATING THE SAME

CROSS-REFERENCE TO RELATED APPLICATION

This application claims the benefit of Korean Patent Application Nos. 10-2011-0129854, filed on Dec. 6, 2011, 10-2012-0034537, filed on Apr. 3, 2012, 10-2012-0039823, filed on Apr. 17, 2012, 10-2012-0048754, filed on May 8, 2012, 10-2012-0081318, filed on Jul. 25, 2012, and 10-2012-0086762, filed on Aug. 8, 2012. The disclosure of all these applications is incorporated herein by reference.

BACKGROUND OF THE INVENTION

1. Field of the Invention

The present invention relates to an image display apparatus, a server, and methods for operating the same, and more particularly, to an image display apparatus, a server, and methods for operating the same, which can increase user convenience.

2. Description of the Related Art

An electronic device processes an electrical signal and operates based on the processed electrical signal, according to a user's manipulation. Among electronic devices, an image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus, a server, and methods for operating the same, which can increase user convenience.

In accordance with an aspect of the present invention, the above and other objects can be accomplished by the provision of a method for operating an image display apparatus, including displaying a broadcast program list listing a plurality of broadcast programs, receiving, upon selection of one of the plurality of broadcast programs, a broadcast signal of the selected broadcast program, and displaying the received broadcast program. The broadcast program list includes real-time viewer rating information, a thumbnail image, and a name for each of the plurality of broadcast programs.

In accordance with another aspect of the present invention, there is provided a method for operating an image display apparatus, including displaying a broadcast program list listing a plurality of broadcast programs, transmitting, upon selection of one of the plurality of broadcast programs, channel information about the selected broadcast program to a remote controller, receiving a broadcast signal of the broadcast program corresponding to the channel information from a set-top box, and displaying the received broadcast program.

In accordance with a further aspect of the present invention, there is provided an image display apparatus including a display to display a broadcast program list listing a plurality of broadcast programs, a broadcasting receiver to receive, upon selection of one of the plurality of broadcast programs, a broadcast signal of the selected broadcast program, and a controller to control display of the received broadcast program. The broadcast program list includes real-time viewer rating information, a thumbnail image, and a name for each of the plurality of broadcast programs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
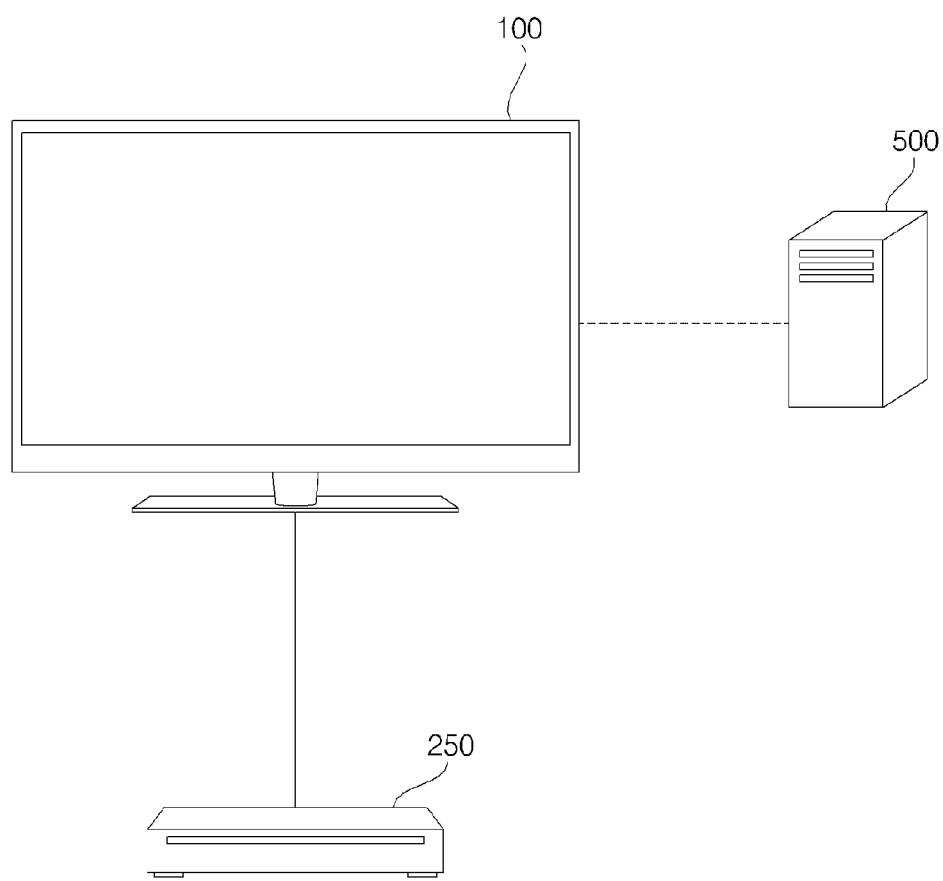
FIG. 1 illustrates an image display system according to an embodiment of the present invention.

FIG. 1 illustrates an image display system according to an embodiment of the present invention.

Referring to FIG. 1, an image display system 10 according to an embodiment of the present invention may include an image display apparatus 100, a set-top box 250, and a server 500.

The set-top box 250 may receive a broadcast signal, process the received broadcast signal, and transmit the processed broadcast signal to the image display apparatus 100.

For the operation, the set-top box 250 may include a broadcasting receiver (272 in FIG. 3B) having a tuner and a demodulator. Aside from the broadcasting receiver, the set-top 250 may receive a broadcast image through a network interface (255 in FIG. 3A).

The set-top box 250 may receive a terrestrial broadcast signal, a satellite broadcast signal, a cable broadcast signal, an Internet Protocol TV (IPTV) broadcast signal, etc.

In addition to broadcast signals, the set-top box 250 may read a media signal from a storage medium such as an optical disk or a memory and process the media signal.

The image display apparatus 100 may receive a broadcast signal through an antenna or the set-top box 250.

Figure 2:
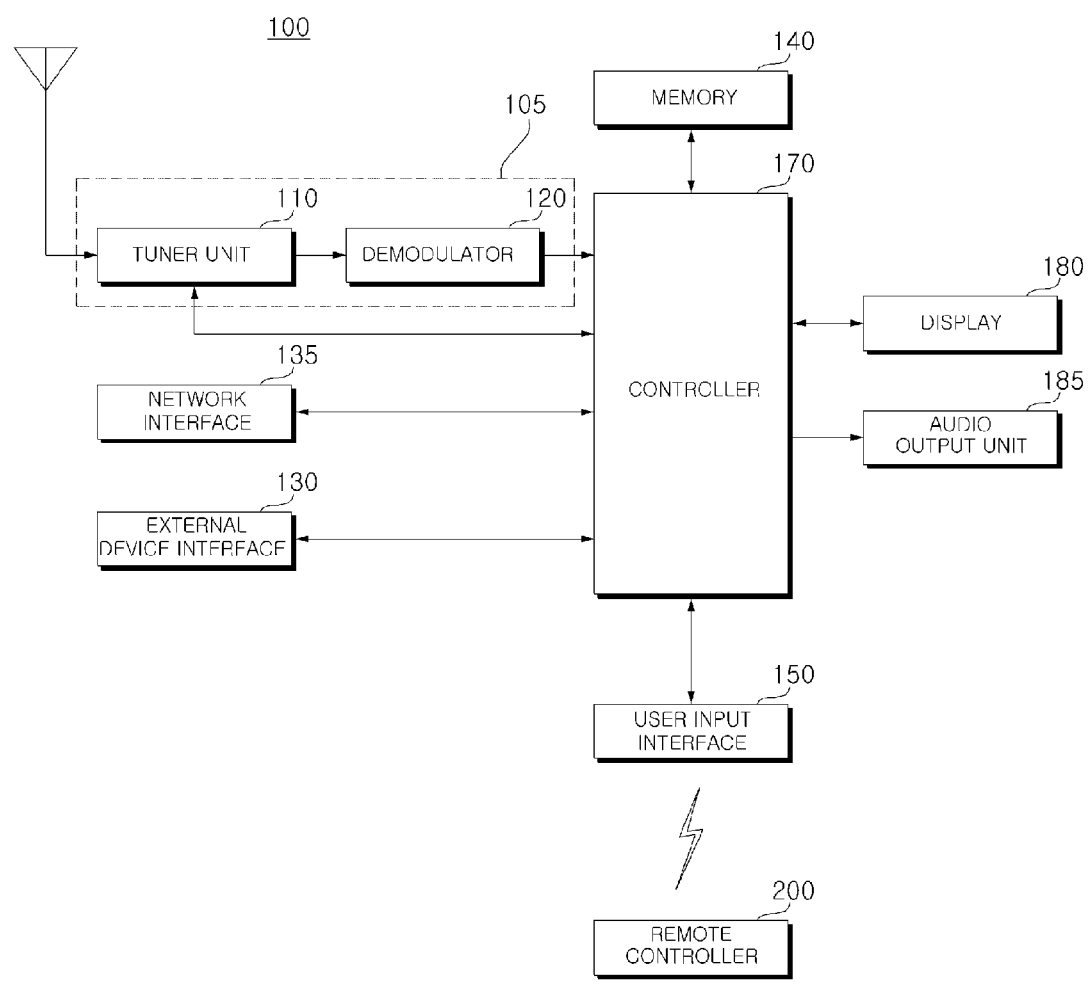
FIG. 2 is a block diagram of an image display apparatus according to an embodiment of the present invention.

In the case where it receives a broadcast signal through the antenna, the image display apparatus 100 may receive the broadcast signal through a tuner unit 110 illustrated in FIG. 2. The broadcast signal received through the antenna may be a terrestrial digital broadcast signal, a terrestrial analog broadcast signal, or a satellite digital broadcast signal.

In the case where it receives a broadcast signal through the set-top box 250, the image display apparatus 100 may receive the broadcast signal through an external device interface 130 illustrated in FIG. 2. The broadcast signal received through the set-top box 250 may be a terrestrial digital broadcast signal, a terrestrial analog broadcast signal, a cable digital broadcast signal, a cable analog broadcast signal, a satellite digital broadcast signal, or an IPTV broadcast signal.

In accordance with an embodiment of the present invention, the image display apparatus 100 may generate a channel map including information about channel numbers and channel names.

In the case of a terrestrial digital broadcast signal received through the antenna, since it includes channel number information and channel name information, the image display apparatus 100 may use the channel number information and channel name information in generating the channel map.

In the case of a terrestrial analog broadcast signal received through the antenna, it includes channel number information without channel name information. Therefore, the image display apparatus 100 cannot identify a channel name corresponding to the channel number.

In regard to a broadcast signal without channel name information such as a terrestrial analog broadcast signal, when a broadcast video includes an image indicating a channel name, the image is extracted and thus the channel name is acquired from the extracted image in the embodiment of the present invention. Specifically, a logo representing a channel name may be detected and thus the channel name may be acquired from the logo.

In contrast, in the absence of an image indicating a channel name in a broadcast image, it is difficult to acquire the channel name. In this case, the present invention provides a method for determining a channel name from a preliminarily created channel map. That is, the image display apparatus 100 transmits the channel map with channel number information and channel name information determined so far to the server 500. The server 500 detects a channel map matching the received channel number information and channel name information from among a plurality of stored channel maps and transmits information about the detected channel map to the image display apparatus 100. In this manner, the image display apparatus 100 can determine the channel name in spite of the absence of an image indicating the channel name in a broadcast image, thereby completing the channel map.

Figure 7:
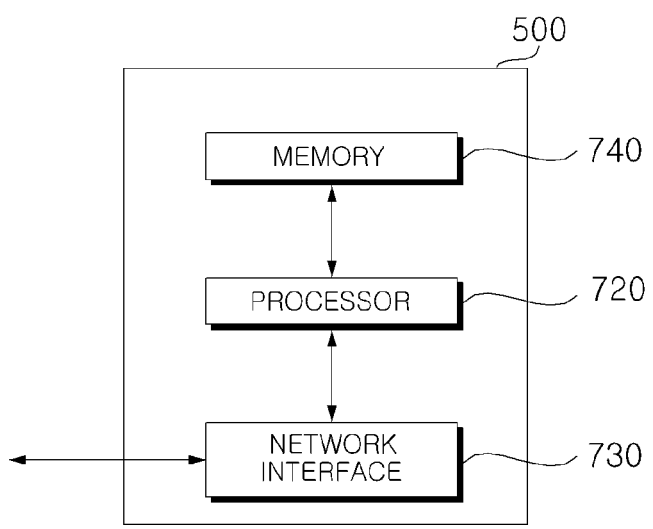
FIG. 7 is a block diagram of a server illustrated in FIG. 1.

The server 500 may receive channel number information and channel name information or channel map information from each of a plurality of image display apparatuses 100*a* to 100*n* through a network interface (730 in FIG. 7).

As described before, the server 500 selects a matching channel map for each of the image display apparatuses 100*a* to 100*n* based on channel number information and channel name information received from the image display apparatus and transmits information about the selected channel map to the image display apparatus.

If the server 500 does not preserve channel maps for the image display apparatuses 100*a* to 100*n*, it may receive channel maps from another server and select a matching channel map for each image display apparatus from among the channel maps.

In the case where the server 500 does not preserve channel maps for the image display apparatuses 100a to 100n and the channel maps are not available from another server, when a specific number of channel maps are the same among channel maps received from the image display apparatuses 100a to 100n, the server 500 may store the same channel map as a new channel map. Preferably, the same channel map may be completed using the channel maps received from the image display apparatuses 100a to 100n and then stored as a new channel map.

In the embodiment of the present invention, while the image display apparatus 100 is receiving a broadcast signal of a detected broadcast channel in channel scan mode, it extracts an image indicating a channel name, in the presence of the image indicating the channel name in a broadcast image, and acquires the channel name from the extracted image, as described above. Thus the image display apparatus 100 can generate a channel map simply using the channel number and the channel name, thereby increasing user convenience.

On the other hand, in the absence of an image indicating the channel name in the broadcast image, the image display apparatus 100 transmits channel number information and channel name information determined so far to the server 500, receives channel map information from the server 500, and updates the channel map using the received channel map information. Thus the image display apparatus 100 can complete the channel map so that it may include channel names for all channels.

In another embodiment of the present invention, the image display apparatus 100 may include an object with a plurality of broadcast program items. The object may be created based on real-time viewer rating information received from the server 500.

Upon selection of one of the plurality of broadcast program items, the image display apparatus 100 may transmit channel information about the selected broadcast program to a remote controller 200. The remote controller 200 may then transmit channel number information about the selected broadcast program based on the received channel information to the set-top box 250.

Thus, the set-top box 250 may switch to a channel to transmit the selected broadcast program, receive the broadcast program, and transmit the received broadcast program. Accordingly, the image display apparatus 100 can simply display the broadcast program, thereby enabling the user to view an intended program easily.

Particularly, since the remote controller 200 communicates with the set-top box 250 in a first communication scheme and communicates with the image display apparatus 100 in a second communication scheme, the image display apparatus 100 and the set-top box 250 can be readily controlled with the single remote controller 200.

Meanwhile, even though the object does not provide channel number information, any of the plurality of broadcast program items can be selected in a program-based manner. Therefore, the user can view an intended broadcast program reliably.

The server 500 may generate the real-time viewer rating information based on an image indicating a channel name or program name received from the image display apparatus 100.

In another embodiment of the present invention, the image display apparatus 100 receives a broadcast signal from the set-top box 250 through an external device interface (130 in FIG. 2) and extracts broadcasting information or an image having the broadcasting information from the broadcast signal.

The image display apparatus 100 transmits the extracted broadcasting information or the extracted image including the broadcasting information to the server 500 through the network interface (135 in FIG. 2).

The server 500 receives broadcasting information or images including the broadcasting information from a plurality of image display apparatuses through the network interface (730 in FIG. 7). Then the server 500 generates real-time viewer rating information based on the received broadcasting information or the received images including the broadcasting information and transmits the real-time viewer rating information to at least one of the image display apparatuses.

In the case where the image display apparatus 100 receives a broadcast signal through the set-top box 250 instead of a broadcasting receiver (105 in FIG. 2) as described above, real-time viewer rating information is generated using broadcasting information or an image including the broadcasting information, included in the broadcast signal. Therefore, the user can readily identify a program or channel of interest, with increased convenience.

In another embodiment of the present invention, when a recording mode is set, the image display apparatus 100 may determine whether an image including broadcasting information exists in a broadcast signal and, in the presence of the image, may store broadcast content of the broadcast signal. Therefore, only user-intended broadcast content can be recorded correctly.

In another embodiment of the present invention, upon receipt of an application execution input, the image display apparatus 100 may acquire broadcast program information and execute a requested application based on the broadcast program information. Accordingly, the user can readily acquire additional information about a viewed broadcast program.

Applications are distinguished on a broadcast program basis. They may be downloaded from the server 500 and installed.

In another embodiment of the present invention, auto channel scan mode may be classified into fast mode and normal mode.

In fast mode, a part of the total channels are scanned and channel number information about the total channels are acquired fast based on channel number information and channel name information about the scanned channels. In this manner, a channel map is generated for the total channels.

In normal mode, all the channels are scanned and channel number information is determined for the channels. Accordingly, a channel map is generated using the channel number information about the entire channels.

In another embodiment of the present invention, in fast mode, the image display apparatus 100 scans broadcast signals of a part of all channels, extracts images indicating channel names or program names from broadcast images of broadcast signals of the scanned channels, determines channel number information and channel name information about the broadcast signals, transmits the determined channel number information and channel name information to the server 500, and receives channel number information and channel name information about a plurality of channels including the scanned channels. Thus, channel number information about all channels can be determined fast.

The image display apparatus 100 may be any of a TV, monitor, PC, etc. that can display a broadcast program.

The server 500 may be one of a content server for providing content, a service server for providing a service, and a network server for providing a network.

FIG. 2 is a block diagram of the image display apparatus according to an embodiment of the present invention. Referring to FIG. 2, the image display apparatus 100 according to an embodiment of the present invention includes a broadcasting receiver 105, an external device interface 130, a network interface 135, a memory 140, a user input interface 150, a sensor unit (not shown), a controller 170, a display 180, and an audio output unit 185.

The broadcasting receiver 105 may include the tuner unit 110, a demodulator 120, and a network interface 130. As needed, the broadcasting receiver 105 may be configured so as to include only the tuner unit 110 and the demodulator 120 or only the network interface 130.

Unlike the configuration illustrated in FIG. 2, the broadcasting receiver 105 may include the external device interface 130. For example, a broadcast signal from the set-top box 250 may be received through the external device interface 130.

The tuner unit 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner unit 110 downconverts the selected RF broadcast signal into a digital IF signal, DIF. On the other hand, if the selected RF broadcast signal is an analog broadcast signal, the tuner unit 110 downconverts the selected RF broadcast signal into an analog baseband A/V signal, CVBS/SIF. That is, the tuner unit 110 may be a hybrid tuner capable of processing not only digital broadcast signals but also analog broadcast signals. The analog baseband A/V signal CVBS/SIF may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The tuner unit 110 may include a plurality of tuners for receiving broadcast signals on a plurality of channels. Alternatively, the tuner unit 110 may be implemented into a single tuner for simultaneously receiving broadcast signals on a plurality of channels.

The demodulator 120 receives the digital IF signal DIF from the tuner unit 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 130 may serve as an interface between a connected external device and the image display apparatus 100. For interfacing, the external device interface 130 may include an A/V Input/Output (I/O) unit (not shown) and/or a wireless communication module (not shown).

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 transmits and receives signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet. The network interface 135 may receive content or data from the Internet, a Content Provider (CP), or a Network Provider (NP).

The memory 140 may store various programs necessary for the controller 170 to process and control signals, and may also store processed video, audio and data signals.

The memory 140 may temporarily store a video, audio and/or data signal received from the external device interface 130. The memory 140 may store information about broadcast channels by the channel-add function such as a channel map.

While the memory 140 is shown in FIG. 2 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200, provide the controller 170 with user input signals received from local keys (not shown), such as inputs of a power key, a channel key, and a volume key, and a setting key, transmit a control signal received from a sensor unit (not shown) for sensing a user gesture to the controller 170, or transmit a signal received from the controller 170 to the sensor unit.

The controller 170 may demultiplex the stream signal TS received from the tuner unit 110, the demodulator 120, or the external device interface 130 into a number of signals and process the demultiplexed signals into audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 2, the controller 170 may include a demultiplexer (DEMUX) and a video processor, which will be described later with reference to FIG. 4.

In addition, the controller 170 may provide overall control to the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may also control the display 180 to display images. The image displayed on the display 180 may be a two-Dimensional (2D) or three-Dimensional (3D) still image or moving picture.

The controller 170 may control a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded together with a decoded image. The controller 170 may display a thumbnail list including a plurality of received thumbnail images on the display 180.

The thumbnail list may be displayed on a part of the display 180 with an image displayed on the display 180, that is, as a compact view, or the thumbnail list may be displayed in full screen on the display 180. The thumbnail images of the thumbnail list may be updated sequentially.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax bather are examples of auto-stereoscopic 3D imaging.

The traditional stereoscopy requires an additional display besides the display 180 in order to display 3D images. The additional display may be a Head Mount Display (HMD) type, a glasses type, etc.

As special 3D glasses, polarized glasses operate in a passive manner, whereas shutter glasses operate in an active manner. Also, HMD types may be categorized into passive ones and active ones.

A viewing device (not shown) may be 3D glasses that enable the user to view 3D images. The 3D glasses may be passive-type polarized glasses, active-type shutter glasses, or an HMD type.

The display 180 may also be a touch screen that can be used not only as an output device but also as an input device.

The audio output unit 185 may receive a processed audio signal from the controller 170 and output the received audio signal as voice.

The camera module (not shown) captures a user. The camera module may include, but not limited to, a single camera. When needed, the camera module may include a plurality of cameras. The camera module may be embedded above the display 180 in the image display apparatus 100, or may be separately configured. Image information captured by the camera module may be provided to the controller 170.

The controller 170 may sense a user's gesture from a captured image received from the camera module or from signals received from the sensor unit (not shown) alone or in combination.

The remote controller 200 transmits a user input to the user input interface 150. For the transmission of a user input, the remote controller 200 may operate in conformance to various communication standards such as Bluetooth, RF, InfraRed (IR), Ultra WideBand (UWB), and ZigBee. In addition, the remote controller 200 may receive a video signal, audio signal and/or data signal from the user input interface 150 and output the received signal as an image or sound.

The above-described image display apparatus 100 may be a fixed or mobile digital broadcast receiver.

The block diagram of the image display apparatus 100 illustrated in FIG. 2 is an exemplary embodiment of the present invention. The image display apparatus 100 is shown in FIG. 2 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and playback video content through the network interface 135 or the external device interface 130, without the tuner unit 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 3A and 3B.

Figure 3A:
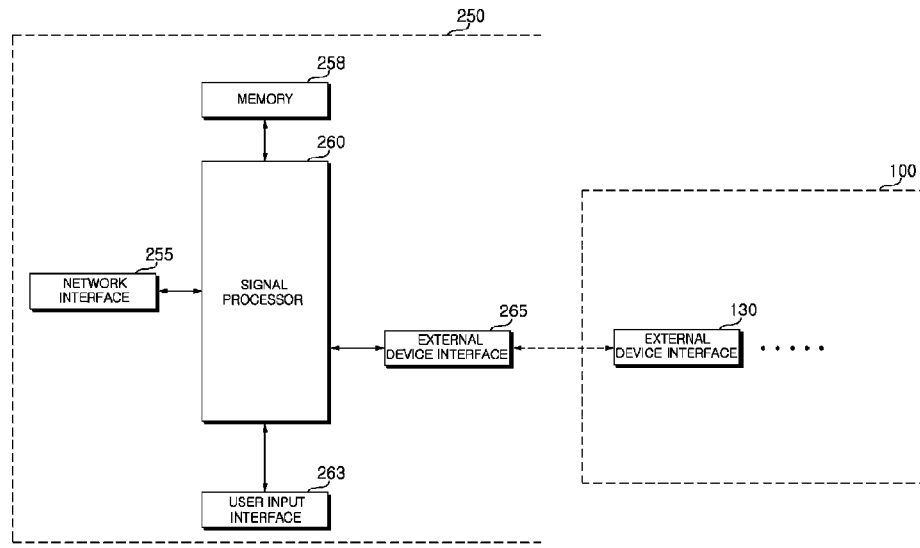
FIGS. 3A and 3B are block diagrams of a set-top box according to embodiments of the present invention.
Figure 3B:
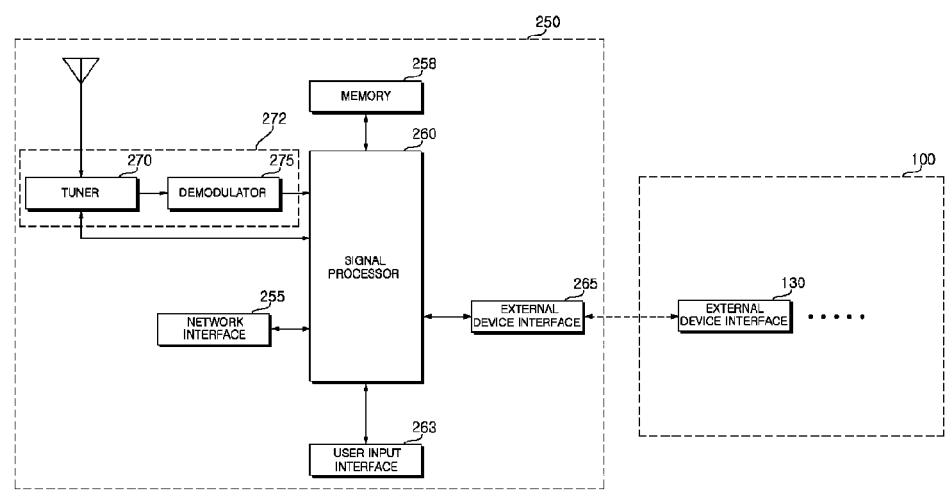

FIGS. 3A and 3B are block diagrams of the set-top box according to embodiments of the present invention.

Referring to FIG. 3A, the set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and may temporarily store a video, audio and/or data signal received from the external device interface 265 or the network interface 255.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the image display apparatus 100 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller 200 and may output the control signals to the signal processor 260.

The external device interface 265 serves as an interface between the set-top box 250 and an external device that is connected wirelessly or by wire, particularly the image display apparatus 100, for signal transmission or reception. The external device interface 265 may also interface with an external device such as a game console, a camera, a camcorder, and a computer (e.g. a laptop computer), for data transmission or reception.

The set-top box 250 may further include a media input unit (not shown) for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the image display apparatus 100 through the external device interface 265 so as to be displayed on the image display apparatus 100.

Referring to FIG. 3B, the configuration of the set-top box 250 illustrated in FIG. 3B is similar to that of the set-top box 250 illustrated in FIG. 3A, except that a broadcasting receiver 272 resides in the set-top box 250. The broadcast receiver 272 may include the tuner 270 and the demodulator 275. Especially, a broadcast signal may be received through an antenna. The received broadcast signal may be input to the signal processor 260.

The signal processor 260 operates in the same manner as described before with reference to FIG. 3A and thus its description is not provided herein.

Figure 4:
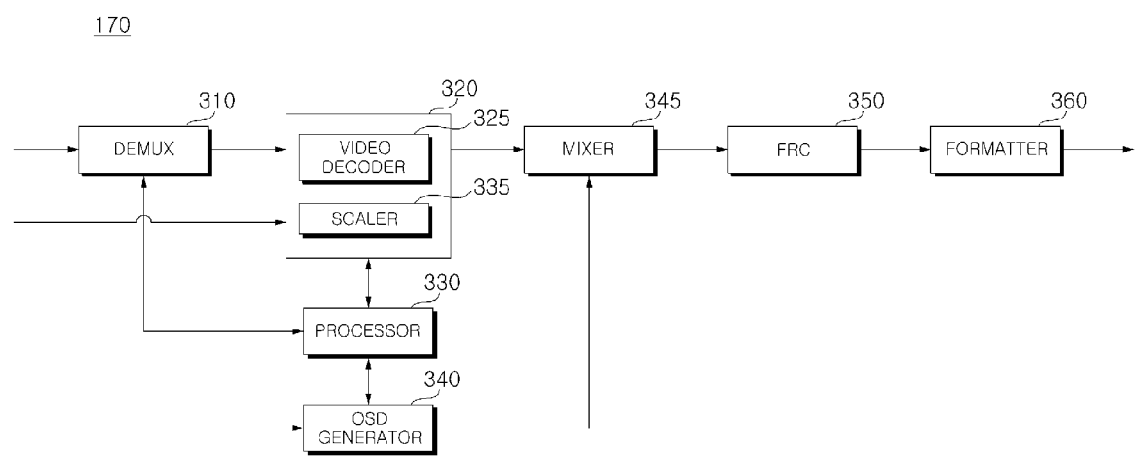
FIG. 4 is a block diagram of a controller illustrated in FIG. 2.

FIG. 4 is a block diagram of the controller illustrated in FIG. 2.

Referring to FIG. 4, the controller 170 may include a DEMUX 310, a video processor 320, a processor 330, an On Screen Data (OSD) generator 340, a mixer 345, a Frame Rate Converter (FRC) 350, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate in conformance to various standards.

The decoded video signal processed by the video processor 320 may be a 2D video signal, a 3D video signal, or a combination of both.

For example, it may be determined whether an external video signal received from an external device or a video signal included in a broadcast signal received from the tuner unit 110 is a 2D signal, a 3D signal, or a combination of both. Accordingly, the controller 170, particularly the video processor 320 processes the video signal and outputs a 2D video signal, a 3D video signal, or a combination of both.

The decoded video signal from the video processor 320 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, available 3D formats include a side-by-side format, a top/bottom format, a frame sequential format, an interlaced format, and a checker box format. A left-eye image L and a right-eye image R are arranged side by side in the side by side format. The left-eye image L and the right-eye image R are stacked vertically in the top/bottom format, while they are arranged in time division in the frame sequential format. In the interlaced format, the left-eye image L and the right-eye image R alternate line by line. The left-eye image L and the right-eye image R are mixed on a box basis in the checker box format.

The processor 330 may provide overall control to the image display apparatus 100 or the controller 170. For example, the processor 330 may control the tuner unit 110 to tune to RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

Further, the OSD generator 340 may generate a pointer to be displayed on the display 180 based on a pointing signal received from the remote controller 200. Especially, the pointer may be generated from a pointing signal processor (not shown), which may reside in the OSD generator 240. Obviously, the pointing signal processor may be configured separately.

The mixer 345 may mix the decoded video signal processed by the video processor 320 with the OSD signal generated from the OSD generator 340. The OSD signal and the decoded video signal each may include at least one of a 2D signal or a 3D signal. The mixed video signal is provided to the FRC 350.

The FRC 350 may change the frame rate of the mixed video signal or simply output the mixed video signal without frame rate conversion.

The formatter 360 may arrange left-eye and right-eye video frames of the frame rate-converted 3D image and may also output a synchronization signal Vsync to open the left or right lens of the viewing device 195.

The formatter 360 may separate a 2D video signal and a 3D video signal from the mixed video signal of the OSD signal and the decoded video signal received from the mixer 345.

The formatter 360 may change the format of the 3D video signal, for example, to one of the afore-described 3D formats.

Meanwhile, the formatter 360 may convert a 2D video signal to a 3D video signal. For example, the formatter 360 may detect edges or a selectable object from the 2D video signal and generate a 3D video signal with an object based on the detected edges or the selectable object. As described before, the 3D video signal may be separated into left-eye and right-eye image signals L and R.

A 3D processor (not shown) may further be provided at the rear end of the formatter 360, for processing a signal to exert 3D effects. For enhancing 3D effects, the 3D processor may adjust the brightness, tint, and color of a video signal. For example, the 3D processor may process a video signal so that a near area appears clear and a far area appears obscure. Meanwhile, the function of the 3D processor may be incorporated into the formatter 360 or the video processor 320.

The audio processor (not shown) of the controller 170 may process the demultiplexed audio signal. For the audio signal processing, the audio processor may have a plurality of decoders.

The audio processor of the controller 170 may also adjust the bass, treble, and volume of the audio signal.

The data processor (not shown) of the controller 170 may process the data signal obtained by demultiplexing the input stream signal. For example, if the demultiplexed data signal is a coded data signal, the data processor may decode the coded data signal. The coded data signal may be an EPG which includes broadcast information specifying the start time, end time, etc. of scheduled broadcast TV or radio programs.

While it is shown in FIG. 4 that the mixer 345 mixes signals received from the OSD generator 340 and the video processor 320 and then the formatter 360 performs 3D processing on the mixed signal, to which the present invention is not limited, the mixer 345 may be positioned after the formatter 360. Thus the formatter 360 may perform 3D processing on a signal received from the video processor 320, the OSD generator 340 may generate an OSD signal and subject the OSD signal to 3D processing, and then the mixer 345 may mix the processed 3D signals received from the formatter 360 and the OSD generator 340.

The block diagram of the image display apparatus 100 illustrated in FIG. 4 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Especially, the FRC 350 and the formatter 360 may be configured separately outside the controller 170.

Figure 5:
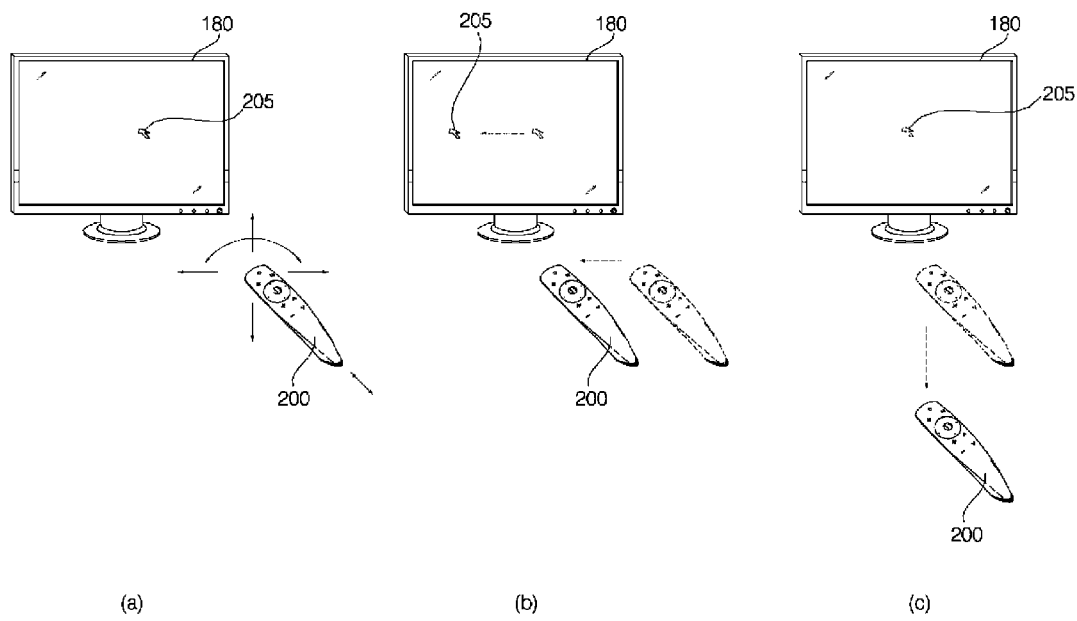
FIG. 5 illustrates a method for controlling a remote controller illustrated in FIG. 2.

FIG. 5 illustrates a method for controlling the remote controller illustrated in FIG. 2.

FIG. 5(*a*) illustrates a pointer 205 representing movement of the remote controller 200 displayed on the display 180.

The user may move or rotate the remote controller 200 up and down, side to side (FIG. 5(*b*)), and back and forth (FIG. 5(*c*)). Since the pointer 205 moves in accordance with the movement of the remote controller 200 in 3D space, the remote controller 200 may be referred to as a pointing device.

Referring to FIG. 5(*b*), if the user moves the remote controller 200 to the left, the pointer 205 also moves to the left on the display 180.

A sensor of the remote controller 200 detects the movement of the remote controller 200 and transmits motion information corresponding to the result of the detection to the image display apparatus 100. Then, the image display apparatus 100 determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus 100 then displays the pointer 205 at the calculated coordinates.

Referring to FIG. 5(*c*), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is also possible. That is, when the remote controller 200 recedes from the display 180, the selection area may be zoomed out and when the remote controller 200 approaches the display 180, the selection area may be zoomed in.

With the predetermined button pressed on the remote controller 200, the up, down, left and right movements of the remote controller 200 may be ignored. That is, when the remote controller 200 recedes from or advances toward the display 180, only the back and forth movements of the remote controller 200 may be sensed, while the up, down, left and right movements of the remote controller 200 may be ignored. Unless the predetermined button is pressed in the remote controller 200, the pointer 205 may move in accordance with the up, down, left or right movement of the remote controller 200.

The speed and direction of the pointer 205 may correspond to the speed and direction of the remote controller 200.

Figure 6:
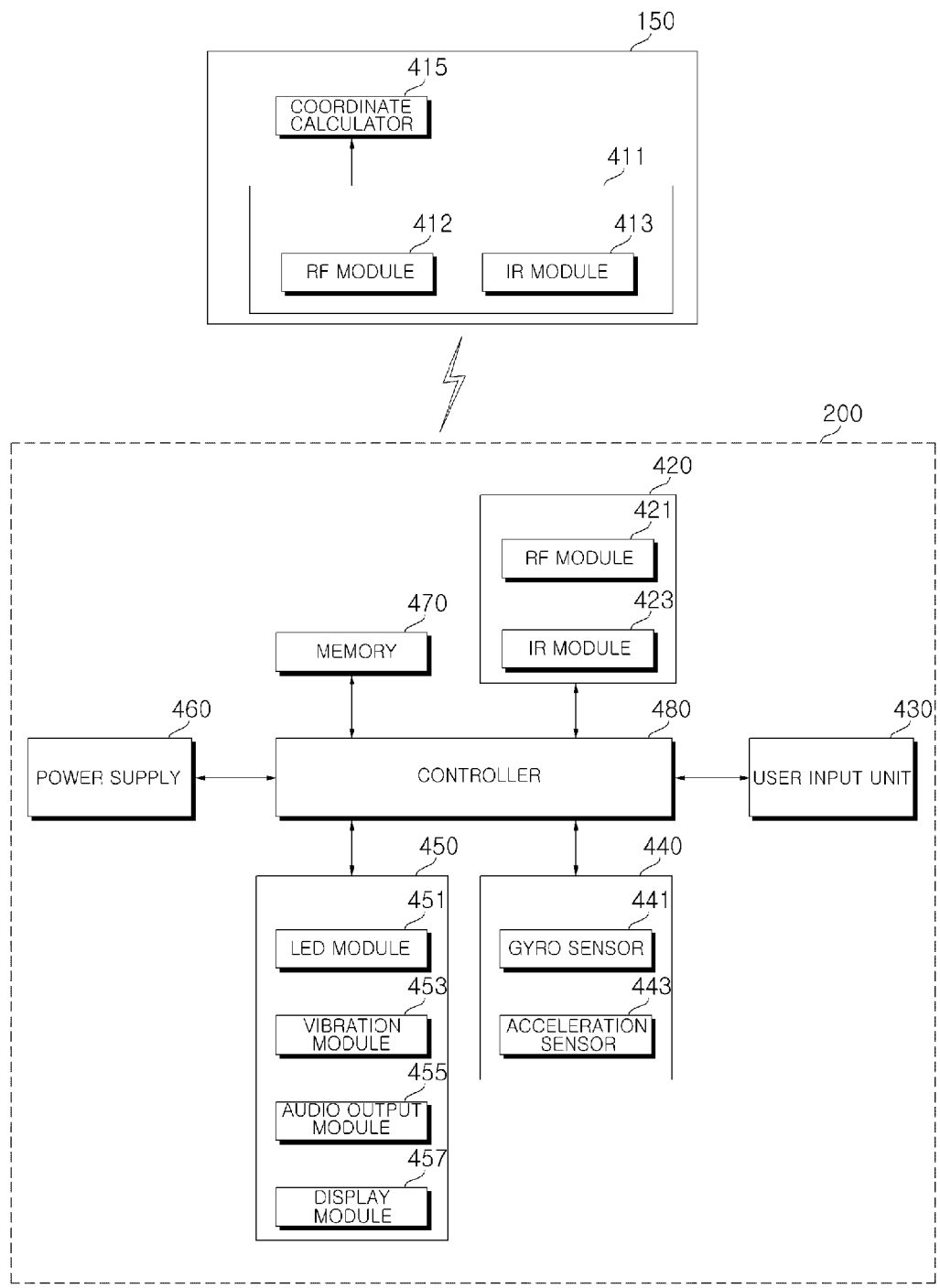
FIG. 6 is a block diagram of the remote controller illustrated in FIG. 2.

FIG. 6 is a block diagram of the remote controller illustrated in FIG. 2.

Referring to FIG. 6, the remote controller 200 may include a wireless communication module 420, a user input unit 430, a sensor unit 440, an output unit 450, a power supply 460, a memory 470, and a controller 480.

The wireless communication module 405 transmits signals to and receives signals from the image display apparatus 100.

In the embodiment of the present invention, the wireless communication module 420 may include an RF module 421 for transmitting RF signals to and/or receiving RF signals from the image display apparatus 100 according to an RF communication standard. The wireless communication module 420 may also include an IR module 423 for transmitting IR signals to and/or receiving IR signals from the image display apparatus 100 according to an IR communication standard.

The remote controller 200 may transmit motion information regarding its movement to the image display apparatus 100 through the RF module 421.

The remote controller 200 may also receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input unit 430 may include a keypad, a plurality of buttons, a touch pad, and/or a touch screen. The user may enter commands to the image display apparatus 100 by manipulating the user input unit 430. If the user input unit 230 includes a plurality of hard-key buttons, the user may input various commands to the image display apparatus 100 by pressing the hard-key buttons. Alternatively or additionally, if the user input unit 430 includes a touch screen displaying a plurality of soft keys, the user may input various commands to the image display apparatus 100 by touching the soft keys. The user input unit 430 may also include various input tools other than those set forth herein, such as a scroll key and/or a jog key, which should not be construed as limiting the present invention.

The sensor unit 440 may include a gyro sensor 441 and/or an acceleration sensor 443. The gyro sensor 441 may sense the movement of the remote controller 200

For example, the gyro sensor 441 may sense the movement of the remote controller 200, for example, in X-, Y-, and Z-axis directions, and the acceleration sensor 443 may sense the moving speed of the remote controller 200. The sensor unit 440 may further include a distance sensor for sensing the distance between the remote controller 200 and the display 180.

The output unit 450 may output a video and/or audio signal corresponding to a manipulation of the user input unit 430 or a signal transmitted by the image display apparatus 100. The user may easily identify whether the user input unit 430 has been manipulated or whether the image display apparatus 100 has been controlled based on the video and/or audio signal output from the output unit 450.

The output unit 450 may include a Light Emitting Diode (LED) module 451 which is turned on or off whenever the user input unit 430 is manipulated or whenever a signal is received from or transmitted to the image display apparatus 100 through the wireless communication module 420, a vibration module 453 which generates vibrations, an audio output module 455 which outputs audio data, and a display module 457 which outputs an image.

The power supply 460 supplies power to the remote controller 200. If the remote controller 200 is kept stationary for a predetermined time or longer, the power supply 460 may, for example, reduce or cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 280 may transmit a signal corresponding to a key manipulation detected from the user input unit 430 or a signal corresponding to motion of the remote controller 200, as sensed by the sensor unit 440, to the image display apparatus 100 through the wireless communication module 420.

The user input interface 150 of the image display apparatus 100 may include a wireless communication module 151 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through the RF module 412. In addition, the user input interface 150 may wirelessly receive IR signals from the remote controller 200 through the IR module 413 according to the IR communication standard.

The coordinate calculator 415 may receive motion information regarding the movement of the remote controller 200 through the wireless communication module 151 and may calculate coordinates (x, y) representing the position of the pointer 202 on a screen of the display 180 by correcting the motion information for possible errors such as user hand tremor.

A signal received in the image display apparatus 100 from the remote controller 200 through the interface 150 may be transmitted to the controller 170. Then, the controller 170 may acquire information regarding the movement of the remote controller 200 and information regarding a key manipulation detected from the remote controller 200 from the signal received from the user input interface 150, and may control the image display apparatus 100 based on the acquired information.

In another example, the remote controller 200 may calculate the coordinates of a position to which the pointer 205 is to be shifted in correspondence with its movement and output the coordinates to the user input interface 150 of the image display apparatus 100. In this case, the user input interface 150 may transmit information about the pointer coordinates which was not corrected for possible errors such as user hand tremor to the controller 170.

In a further example, unlike the configuration of the remote controller 200 illustrated in FIG. 6, the coordinate calculator 415 may reside in the controller 170, instead of the user input interface 150.

FIG. 7 is a block diagram of the server illustrated in FIG. 1.

Referring to FIG. 7, the server 500 may include a network interface 730, a memory 740, and a processor 720.

The network interface 730 may receive channel number information and channel name information (e.g. MBS, CBB, KBB, NCC, etc.) from one or more image display apparatuses or channel map information from the image display apparatuses.

The network interface 730 may further receive information about program names (e.g. Oh! Lady, ABC news, DR. OZ, etc.) from the image display apparatuses in addition to the channel name information.

The memory 740 preserves a plurality of channel maps. The channel maps may include a cable broadcasting (terrestrial and analog) channel map, a terrestrial analog broadcasting channel map, a satellite broadcasting channel map, an IPTV channel map, etc. Cable broadcasting channel maps may be distinguished on a region basis or on a cable broadcasting service type basis.

The processor 720 may select channel maps from among the plurality of channel maps stored in the memory 740 based on the channel map information or the channel number and channel name information received from the image display apparatuses and may control transmission of information about the selected channel maps to the respective image display apparatuses.

In the absence of a channel map corresponding to each of the image display apparatuses 100a to 100n in the server 500, the processor 720 may control reception and selection of the channel map from another server.

In the case where a channel map corresponding to each of the image display apparatuses 100a to 100n is not present in the server 500 and the channel map is not available from another server, when a specific number of channel maps are the same from among channel maps received from the image display apparatuses 100a to 100n, the server 500 may control the same channel map to be stored as a new channel map in the memory 740.

Meanwhile, the processor 720 may generate real-time viewer rating information using real-time broadcasting information or broadcast images received from a plurality of image display apparatuses. The real-time viewer rating information may include information about a channel share, the numbers of channel viewers, a program share of a specific channel, and the number of viewers for the specific channel. Besides, the real-time viewer rating information may include real-time channel search information or real-time program search information.

The processor 720 may determine whether images including broadcasting information received from a plurality of image display apparatuses are real-time broadcast images by comparing the received images with real-time broadcast images received through a network.

If the received images are real-time broadcast images, the processor 720 may extract broadcasting information such as channel information and program information from the broadcast images and generate real-time viewer rating information based on the extracted broadcasting information.

The network interface 730 may transmit the selected channel map or channel number and channel name information included in the selected channel map to each image display apparatus.

In addition, the network interface 730 may transmit the real-time viewer rating information to at least one of the plurality of image display apparatuses. It is preferred to transmit the real-time viewer rating information to all image display apparatuses that have transmitted broadcasting information or images including the broadcasting information.

Figure 8:
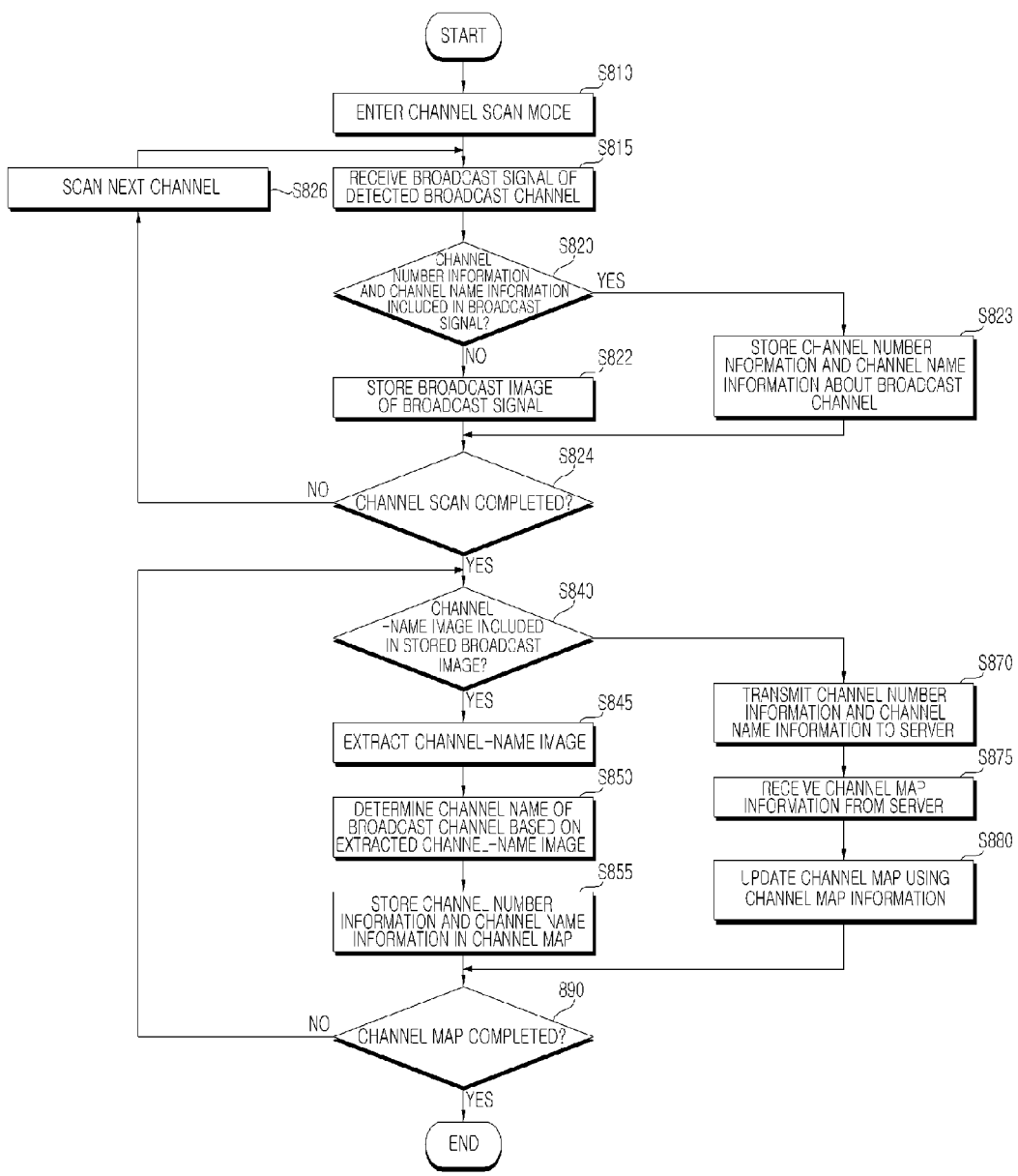
FIG. 8 is a flowchart illustrating a method for operating the image display apparatus according to an embodiment of the present invention.
Figure 9:
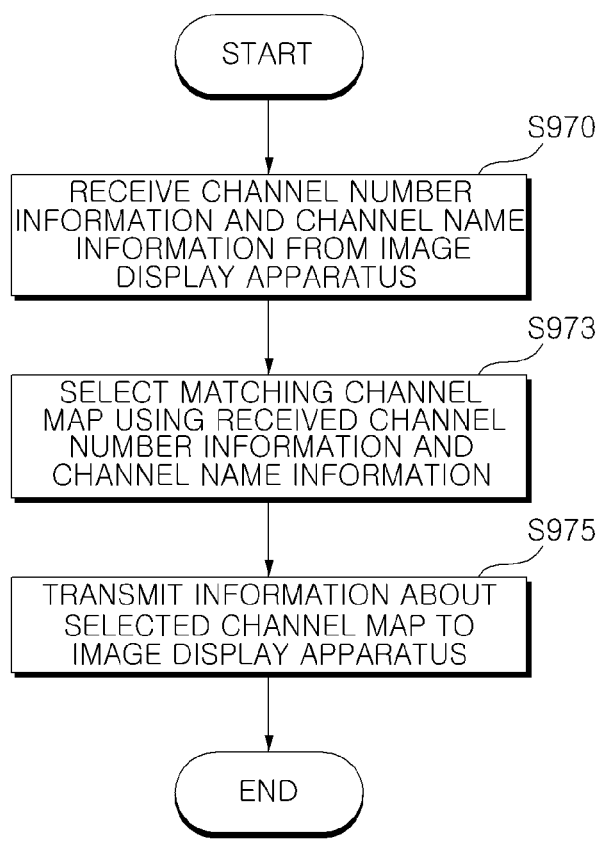
FIG. 9 is a flowchart illustrating a method for operating the server according to an embodiment of the present invention.
Figure 10:
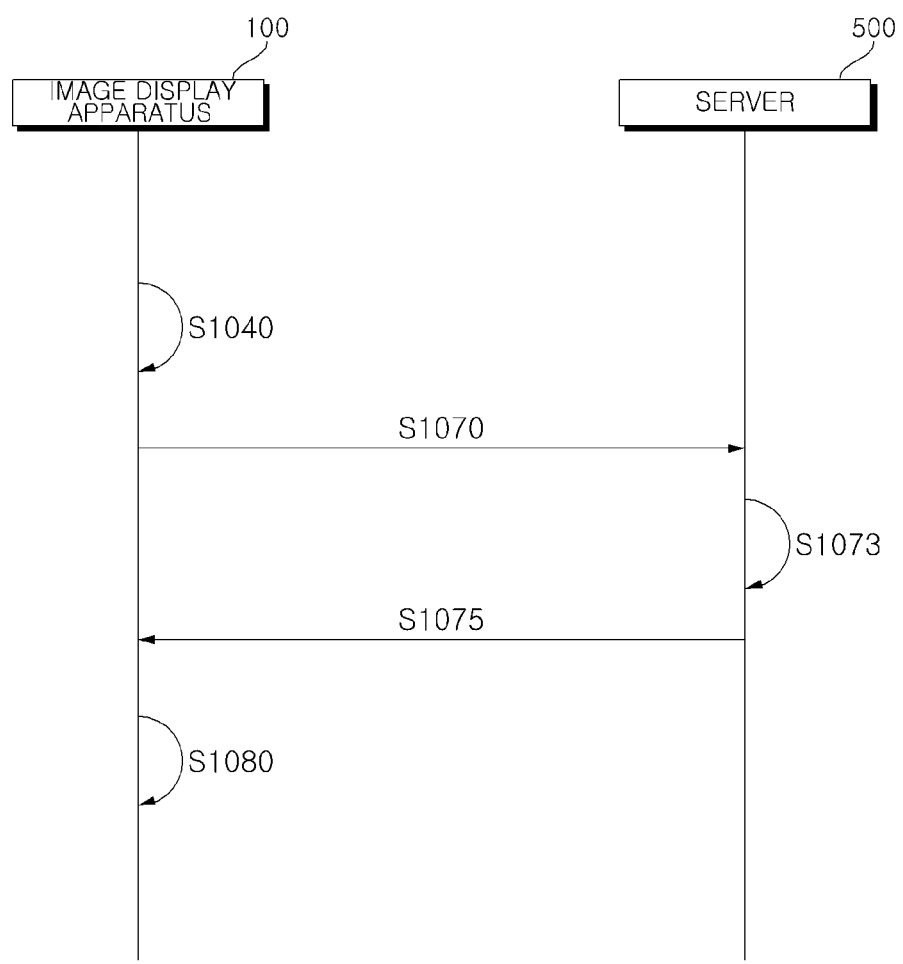
FIG. 10 is a diagram illustrating a signal flow for performing an operation between the image display apparatus and the server according to an embodiment of the present invention.

FIG. 8 is a flowchart illustrating a method for operating the image display apparatus according to an embodiment of the present invention, FIG. 9 is a flowchart illustrating a method for operating the server according to an embodiment of the present invention, FIG. 10 is a diagram illustrating a signal flow for performing an operation between the image display apparatus and the server according to an embodiment of the present invention, and FIGS. 11A to 16E are views referred to for describing various examples of the method for operating the image display apparatus illustrated in FIG. 8 or the method for operating the server illustrated in FIG. 9.

First of all, the image display apparatus 100 enters channel scan mode (S810). The image display apparatus 100 may enter the channel scan mode automatically or in response to reception of a user input. For instance, the channel scan mode may be automatic or manual.

Figure 11A:
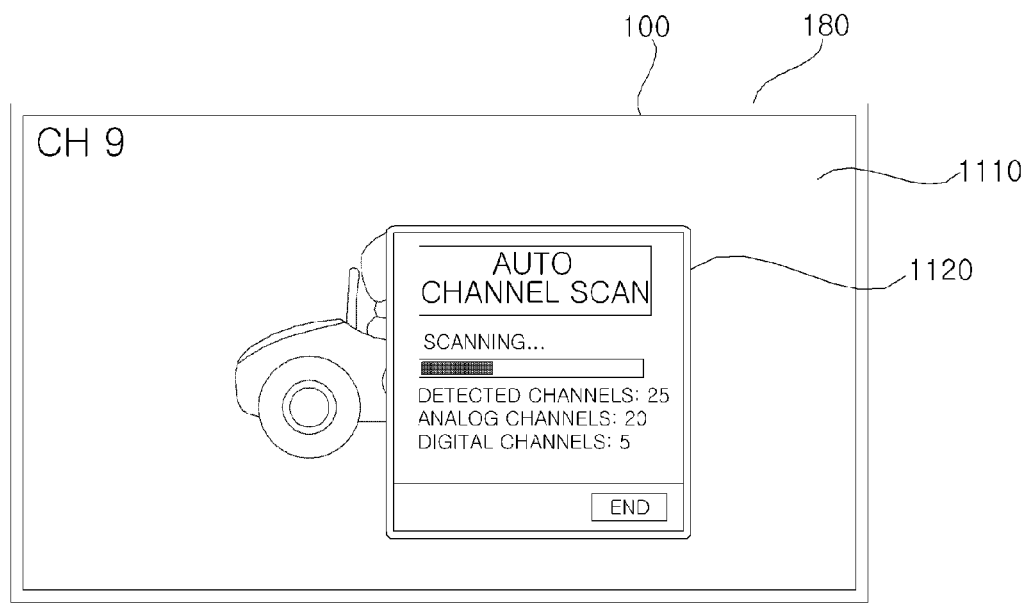
FIGS. 11A to 16E are views referred to for describing various examples of the method for operating the image display apparatus illustrated in FIG. 8 or the method for operating the server illustrated in FIG. 9.

FIG. 11A is an exemplary view illustrating automatic channel scan mode. Referring to FIG. 11A, when the image display apparatus 100 enters the automatic channel scan mode in response to reception of a user input, it scans channels automatically. An object 1120 indicating automatic channel scan may be displayed as illustrated in FIG. 11A.

The object 1120 indicating automatic channel scan may be displayed together with a broadcast image 1110 of CH 9 that the user is viewing. The object 1120 may be transparent so that the user can view the on-going broadcast image 1110.

Meanwhile, the controller 170 controls the image display apparatus 100 to be set to the automatic channel scan mode, upon receipt of a user input requesting the automatic channel scan mode. That is, the controller 170 controls channel scanning, while switching from one channel to another in regard to input broadcast signals by controlling the broadcasting receiver 105.

Subsequently, the image display apparatus 100 receives a broadcast signal of a detected broadcast channel (S815) and determines whether channel number information and channel name information is included in the broadcast signal (S820). If the broadcast signal does not include the channel number information or the channel name information, the image display apparatus 100 stores a broadcast image included in the broadcast signal (S822). On the other hand, if the broadcast signal includes the channel number information and the channel name information, the image display apparatus 100 stores the channel number information and channel name information (S823).

The image display apparatus 100 receives a detected broadcast signal through the broadcasting receiver 105.

For example, if broadcast signals are received through the antenna, the tuner unit 110 of the broadcasting receiver 105 may sequentially receive broadcast images of a plurality of channels, while switching from one channel to another. The controller 170 may control channel switching through the tuner unit 110. The broadcast signals received through the tuner unit 110 are input to the controller 170 through the demodulator 120.

If broadcast signals are received through the set-top box 250, that is, through the external device interface 130, the controller 170 may control reception of broadcast images of a plurality of channels at the set-top box 250. For instance, the controller 170 may transmit a control signal for automatic channel scan to the set-top box 250. The broadcast signals received through the external device interface 130 are input to the controller 170.

Upon receipt of a broadcast signal, the controller 170 demultiplexes the broadcast signal at the DEMUX 310 and determines whether a demultiplexed data signal includes channel number information and channel name information. For example, in the case of an ATSC digital broadcast signal, channel number information and channel name information may be included in Program and System Information Protocol (PSIP). In the case of a DVB digital broadcast signal, channel number information and channel name information may be included in System Information (SI).

If the broadcast signal is a digital broadcast signal received through the antenna, the controller 170 extracts channel number information and channel name information from the broadcast signal and stores the extracted channel number information and channel name information in the memory 140. The channel number information and channel name information may be stored in the form of a channel map in the memory 140.

Figure 11B:
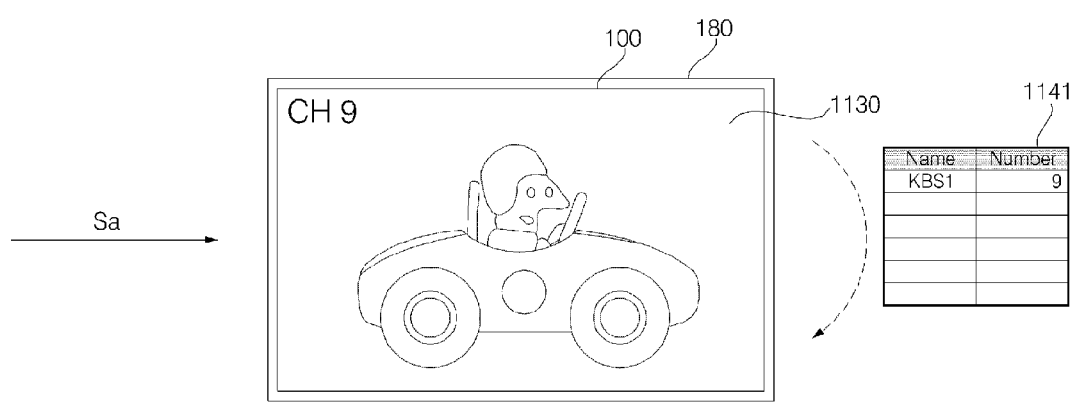

FIG. 11B is an exemplary view illustrating reception of a first broadcast signal Sa on CH 9 in the image display apparatus 100. The display 180 of the image display apparatus 100 may display a first broadcast image 1130 corresponding to the received first broadcast signal Sa. On the assumption that CH 9 is a digital broadcast channel, when a broadcast signal is received on CH 9 through the antenna, the memory 140 may store channel number information, 9 and channel name information, KBS1 in a channel map 1141 as done in step S823.

If the received broadcast signal is a digital broadcast signal received through the set-top box 250, the broadcast signal may include channel number information and channel name information. Then the controller 170 may extract the channel number information and channel name information from the broadcast signal and control storage of the channel number information and channel name information in a channel map in the memory 140.

On the contrary, if the received broadcast signal is an analog broadcast signal, the broadcast signal may include only channel number information without channel name information. In this case, the controller 170 may subject the received broadcast signal to demultiplexing and video signal processing and may control storage of the processed broadcast image in the memory 140. The stored broadcast image may be a still image. The broadcast image is preferably stored along with the channel number information.

If the broadcast signal is a digital broadcast signal received through the set-top box 250, the broadcast signal may not include channel number information or channel name information. For example, a digital broadcast signal provided by a cable system operator may not include channel number information or channel name information. In this case, step S822 is performed as is done when an analog broadcast signal is received. That is, the controller 170 may process the received broadcast signal by demultiplexing and video signal processing and may control storage of the processed broadcast image.

Figure 11C:
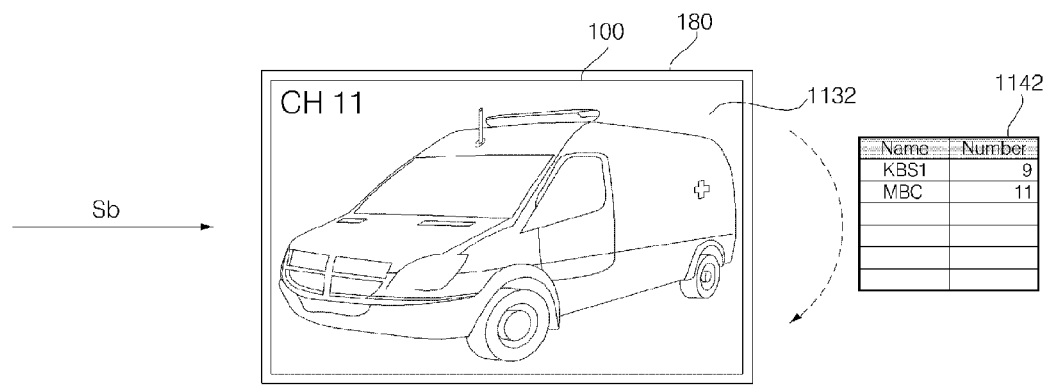
Figure 11D:
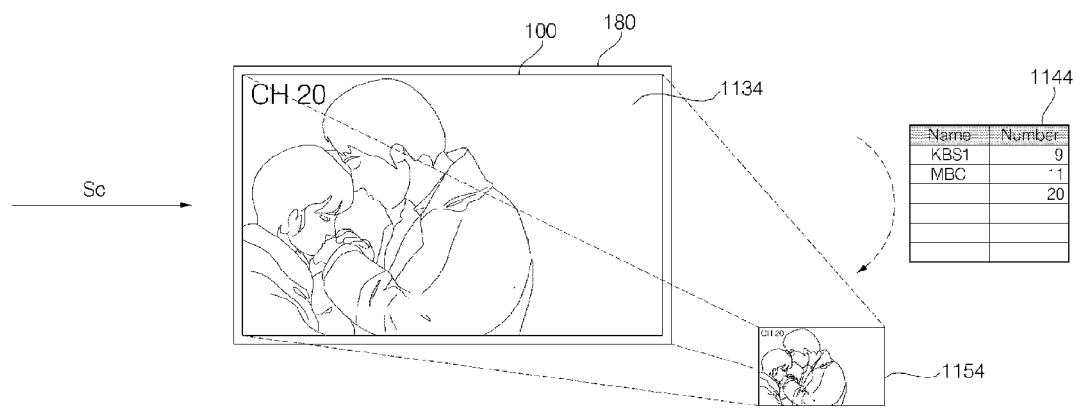

FIG. 11D is an exemplary view illustrating reception of a third broadcast signal Sc on CH 20 in the image display apparatus 100. The display 180 of the image display apparatus 100 may display a third broadcast image 1134 corresponding to the third broadcast signal Sc. On the assumption that CH 20 broadcasts an analog signal, the memory 140 may store a video frame 1154 of the third broadcast image 1134 as done in step S822. Meanwhile, the memory 140 may further store channel number information, 20 in a channel map 1144.

The image display apparatus 100 determines whether the channel scan has been completed (S824). If the channel scan still runs, the next channel is scanned (S826). Steps S815 through S824 are repeated for a broadcast signal of the next detected broadcast signal.

FIG. 11C is an exemplary view illustrating reception of a second broadcast signal Sb on CH 11 in the image display apparatus 100. The display 180 of the image display apparatus 100 may display a second broadcast image 1132 corresponding to the second broadcast signal Sb. On the assumption that CH 11 broadcasts a digital signal, when a broadcast signal of CH 11 is received through the antenna, the memory 140 may store channel number information, 11 and channel name information, MBC in a channel map 1142 in the memory 140 as done in step S823.

Figure 11E:
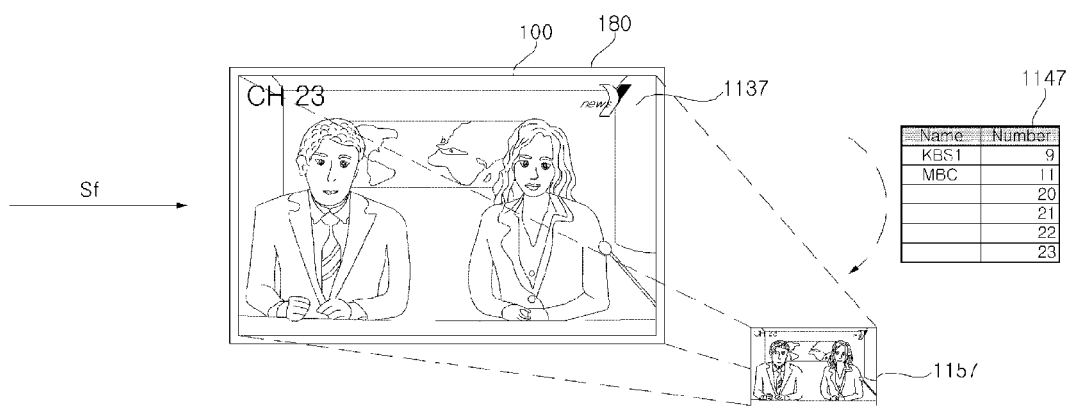

FIG. 11E is an exemplary view illustrating reception of a sixth broadcast signal Sf on CH 23 in the image display apparatus 100. The display 180 of the image display apparatus 100 may display a sixth broadcast image 1137 corresponding to the sixth broadcast signal Sf. On the assumption that CH 23 broadcasts an analog signal, the memory 140 may store a video frame 1157 of the sixth broadcast image 1137 as done in step S822. Meanwhile, the memory 140 may further store channel number information, 22 in a channel map 1147.

Upon completion of the channel scanning, the image display apparatus 100 determines whether any stored broadcast image includes a channel name image (S840). In the presence of any stored broadcast image including a channel name image, the image display apparatus 100 extracts the channel name image and acquires the channel name of a channel that has broadcast the broadcast image (S850) and stores channel number information and channel name information associated with the channel in a channel map (S855).

When the channel scanning is completed in the channel scan mode, the controller 170 generates the channel map using the pre-stored broadcast images.

Specifically, the controller 170 determines whether an image indicating a channel name exists in a broadcast image stored in the memory 140.

Figure 12A:
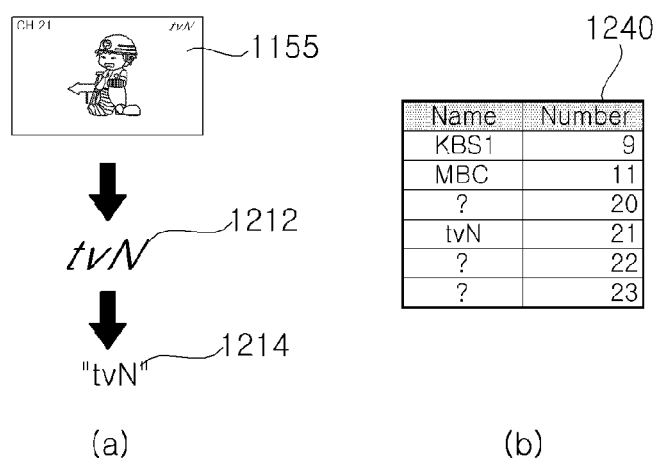

FIG. 12A is an exemplary view illustrating determination of a channel name by detecting a log indicating the channel name in an image 1155 of CH 21 stored in the memory 140.

The controller 170 may invoke the broadcast image 1155 of CH 21 and detect a log. In general, the logo indicating the channel name is displayed at the top right corner, the bottom right corner, or the top left corner of the broadcast image 1155. Thus, the controller 170 extracts the displayed area of the log and detects the channel name by comparing the logo or text included in the extracted area with pre-stored channel name information.

As noted from (a) of FIG. 12A, the controller 170 may extract a logo 1212 from the top right corner of the broadcast image 1155 and detect a channel name 1214, tvN from the logo 1212.

As illustrated in (b) of FIG. 12A, the channel name 121, tvN may be stored along with the channel number, 21 in a channel map 1240 in the memory 140.

Figure 12B:
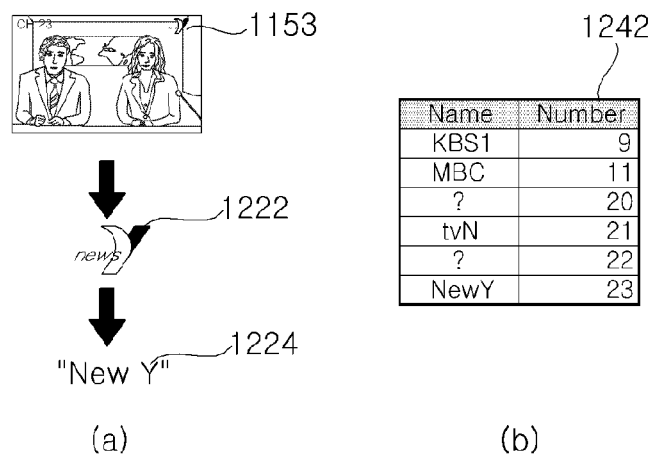

FIG. 12B is an exemplary view illustrating determination of a channel name by detecting a log indicating the channel name in an image 1153 of CH 23 stored in the memory 140.

The controller 170 may invoke the broadcast image 1153 of CH 23 and detect a log.

As noted from (a) of FIG. 12B, the controller 170 may extract a logo 1222 from the top right corner of the broadcast image 1153 and detect a channel name 1224, NewY from the logo 1222.

As illustrated in (b) of FIG. 12B, the channel name 1224, NewY may be stored along with the channel number, 23 in a channel map 1242 in the memory 140.

In the absence of a broadcast image including a channel-name image in step S840, the image display apparatus 100 transmits to the server 500 the channel number information and channel name information that have been determined until then (S870). Step S870 of FIG. 8 corresponds to step S970 of FIG. 9 and step S1070 of FIG. 10.

In the absence of a broadcast image including a channel-name image for a channel, the controller 170 cannot determine the name of the channel. Therefore, the controller 170 may control transmission of the channel number information and channel name information that have been detected so far to the server 500.

Figure 12C:
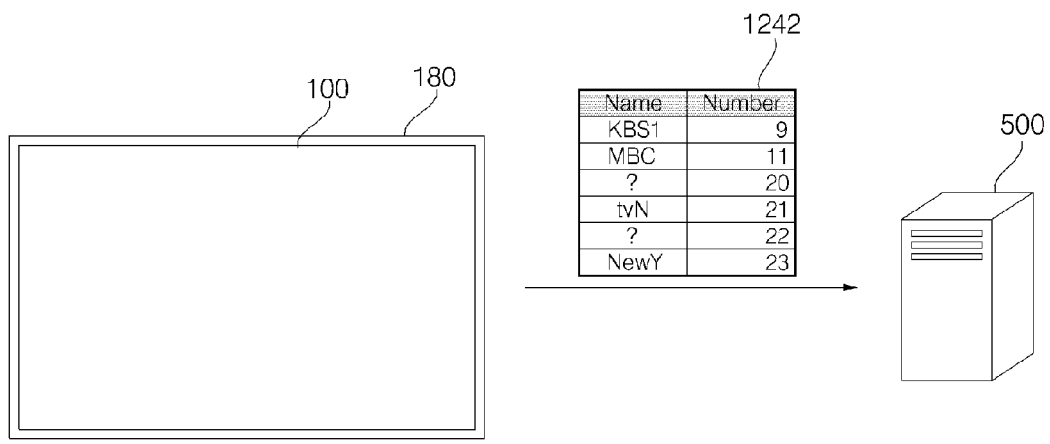

For example, the controller 170 may control transmission of an incomplete channel map 1242 that has been created so far to the server 500 through the network interface 135 as illustrated in FIG. 12C.

Referring to FIG. 12C, the channel map 1242 lists the channel names of digital broadcast channels, CH 9 and CH 11 and the channel names of analog broadcast channels, CH 21 and CH 23, with the channel names of analog broadcast channels CH 20 and CH 22 left empty.

The server 500 receives the determined channel number information and channel name information from the image display apparatus 100 (S970). The server 500 receives the determined channel number information and channel name information from the image display apparatus 100 through the network interface 730. Alternatively, the network interface 730 may receive the incomplete channel map from the image display apparatus 100. Step S970 of FIG. 9 corresponds to step S870 of FIG. 8 and step S1070 of FIG. 10.

Subsequently, the server 500 selects a channel map matching to the received channel number information and the channel name information (S973). The processor 720 of the server 500 selects a channel map matching to the channel number information and channel name information received from the image display apparatus 100 from among a plurality of channel maps stored in the memory 740.

Step S973 of FIG. 9 corresponds to step S1073 of FIG. 10.

For example, since channel names are filled for some channels (i.e. CH 9, CH 11, CH 21, and CH 23) in the channel map 1242 illustrated in FIG. 12C, a matching complete channel map may be selected based on the channel numbers (i.e. CH 9, CH 11, CH 21, and CH 23) and their channel names (i.e. KBS1, MBC, tvN, and New Y).

The server 500 transmits information about the selected channel map to the image display apparatus 100 (S975). The network interface 730 of the server 500 transmits the information about the selected channel map to the image display apparatus 100. Step S975 of FIG. 9 corresponds to step S875 of FIG. 8 and step S1075 of FIG. 10.

Figure 12D:
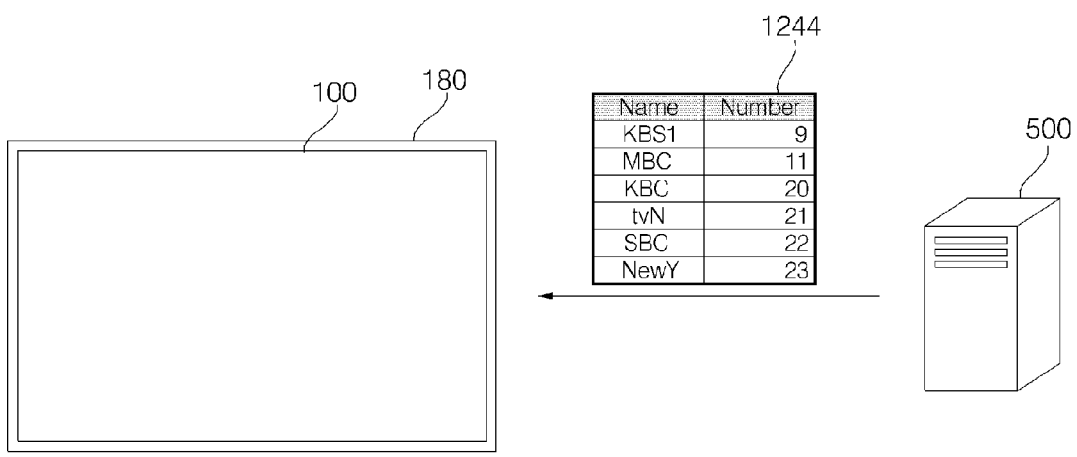

For example, the server 500 may transmit a selected channel map 1244 to the image display apparatus 100 through the network interface 135, as illustrated in FIG. 12D. Alternatively or additionally, the network interface 135 may transmit channel name information, KBC and SBC for the broadcast channels, CH 20 and CH 22 for which channel names were left empty in the channel map 1242 illustrated in FIG. 12C.

Then the image display apparatus 100 updates the channel map with the received channel map information (S880). Step S880 of FIG. 8 corresponds to step S1080 of FIG. 10.

The controller 170 may complete the incomplete channel map using the channel map information received through the network interface 135.

Referring to FIG. 12D, upon receipt of the channel map 1244 selected by the server 500, the image display apparatus 100 may replace its incomplete channel map with the received channel map 1244. That is, the incomplete channel map may be updated to the received channel map 1244.

On the other hand, upon receipt of the channel name information, KBC and SBC for the broadcast channels CH 20 and CH 22 whose channel names are yet to be determined in the channel map 1242 illustrated in FIG. 12C, the image display apparatus 100 may update the incomplete channel map to the channel map 1244 using the received channel name information.

Therefore, the image display apparatus 100 can readily acquire the channel names, KBC and SBC of the channels CH 20 and CH 22 whose channel names were not determined.

A step of determining whether the channel map has been completed, 5890 may follow step S855 or S880. If the channel map remains to be completed, the procedure returns to step S840.

Figure 13A:
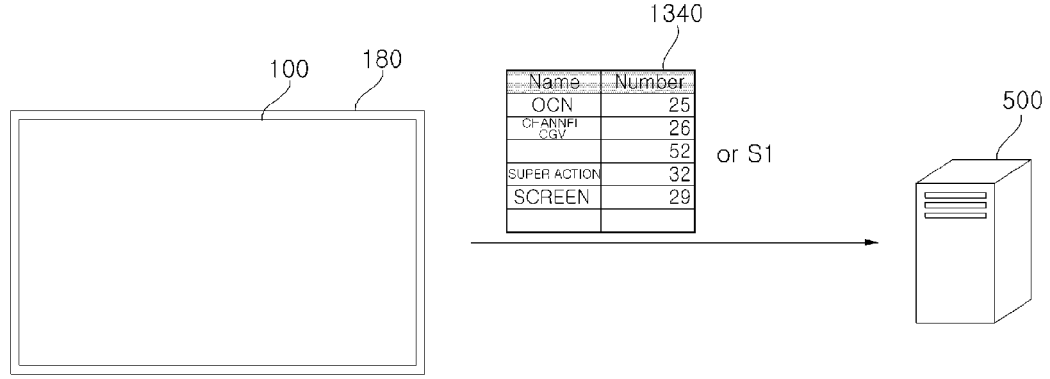

FIG. 13A is an exemplary view illustrating transmission of an incomplete channel map 1340, or location information or network information S1 about the image display apparatus 100 from the image display apparatus 100 to the server 500.

The controller 170 of the image display apparatus 100 may control transmission of the incomplete channel map 1340 or the location information or network information S1 about the image display apparatus 100 through the network interface 135.

The location information or network information S1 may include the IP address or region information of the image display apparatus 100. The server 500 may readily identify a broadcasting service provider to which the image display apparatus 100 subscribed to, using the location information or network information S1.

The channel map 1340 has the channel names, OCN, Channel CGV, SUPER ACTION, and SCREEN of CH 25, CH 26, CH 32 and CH 29, with the channel name of CH 52 left empty.

Figure 13B:
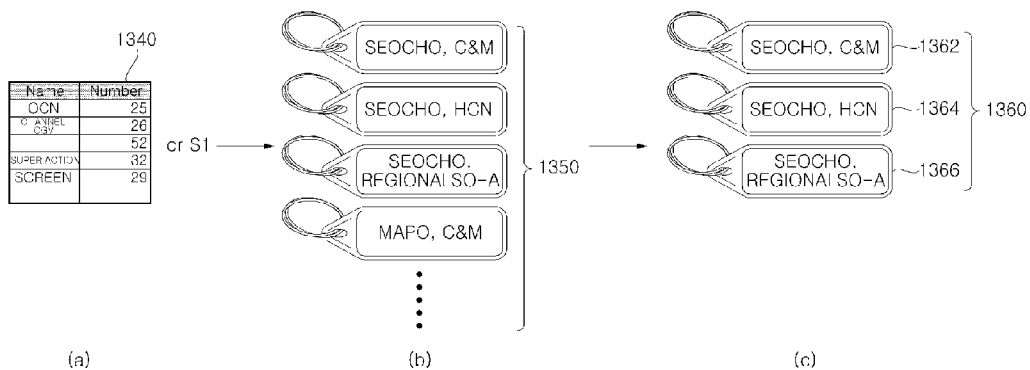

FIG. 13B is an exemplary view illustrating selection of a channel map in the server 500.

The processor 720 of the server 500 may use the incomplete channel map 1340 or the location information or network information S1 about the image display apparatus 100 received through the network interface 730, as indicated by (a) of FIG. 13B.

That is, the processor 720 may filter a plurality of channel maps 1350 stored in the memory 740 using the incomplete channel map 1340 or the location information or network information S1, as indicated by (b) of FIG. 13B.

For example, if the location information or network information S1 indicates a specific region (e.g. Seochogu in Seoul, Korea), the processor 720 of the server 500 may search only a list 1360 of broadcasting service providers that provide broadcasting services to the specific region among a list 1350 of plural service providers stored in the memory 740, as indicated by (c) of FIG. 13B.

(c) of FIG. 13B illustrates exemplary extraction of three broadcasting service providers 1362, 1364, and 1366.

The processor 720 of the server 500 compares the received incomplete channel map 1340 with channel maps associated with the three broadcasting service providers 1362, 1364, and 1366 and then selects a channel map matching to the incomplete channel map 1340.

Figure 13C:
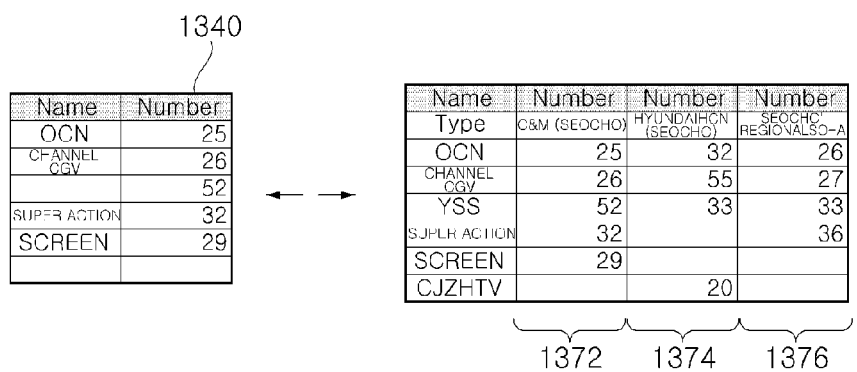

FIG. 13C is an exemplary view illustrating comparison between the received incomplete channel map 1340 with channel maps 1372, 1374, and 1376 associated with the three broadcasting service providers 1362, 1364, and 1366. As noted from FIG. 13C, the first channel map 1372 matches to the incomplete channel map 1340. Thus the channel name YSS of CH 52 is determined from the first channel map 1372.

The processor 720 of the server 500 may control transmission of the selected channel map 1372 to the image display apparatus 100.

Figures 13D, 13E:
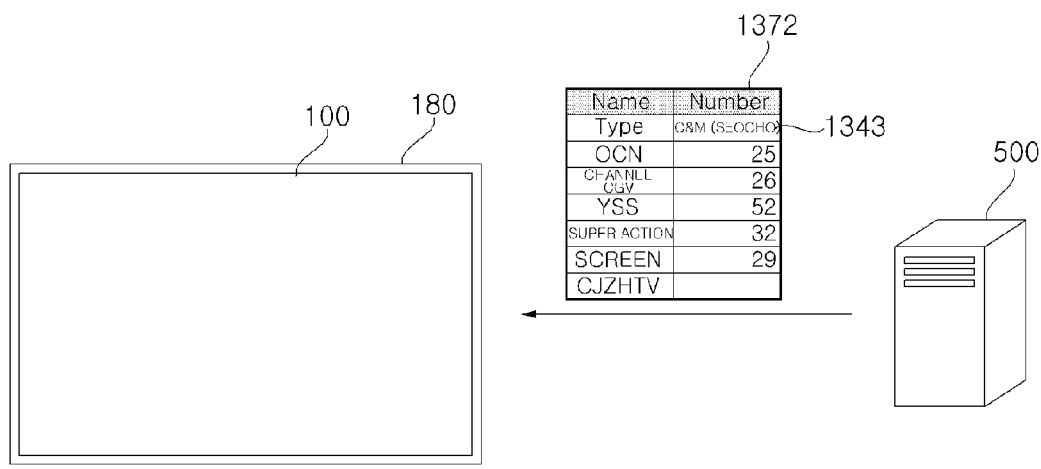

FIG. 13D is an exemplary view illustrating transmission of information about the selected channel map 1372 from the server 500. The channel map information may include information about the broadcasting service provider 1343 that provides broadcasting service to the image display apparatus 100 in addition to channel number information and channel name information. The broadcasting service provider information may be transmitted separately from the channel map information.

Meanwhile, the channel map information may include information about a broadcasting service type received from the broadcasting service provider in addition to the channel number information and the channel name information.

FIG. 13E is an exemplary view illustrating different channel maps 1382, 1384, and 1386 for different broadcasting service types provided by the same broadcasting service provider. Three-level channel maps are defined: the economical-type channel map 1382, the basic-type channel map 1384, and the premium-type channel map 1386. The processor 720 of the server 500 may compare the incomplete channel map received from the image display apparatus 100 with the channel maps 1382, 1384, and 1386 classified by broadcasting service type and select the channel map 1386 matching to the incomplete channel map.

Figure 13F:
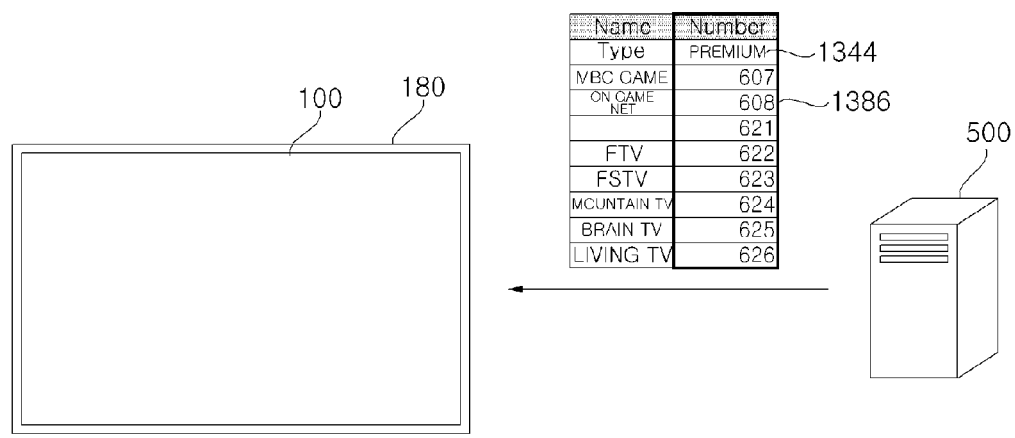

FIG. 13F is an exemplary view illustrating transmission of channel map information associated with the selected channel map 1386 from the server 500. In addition to channel number information and channel name information, the channel map information may include information 1344 (i.e. premium) about a broadcasting service type provided to the image display apparatus 100. The broadcasting service type information may be transmitted separately from the channel map information.

Figure 14A:
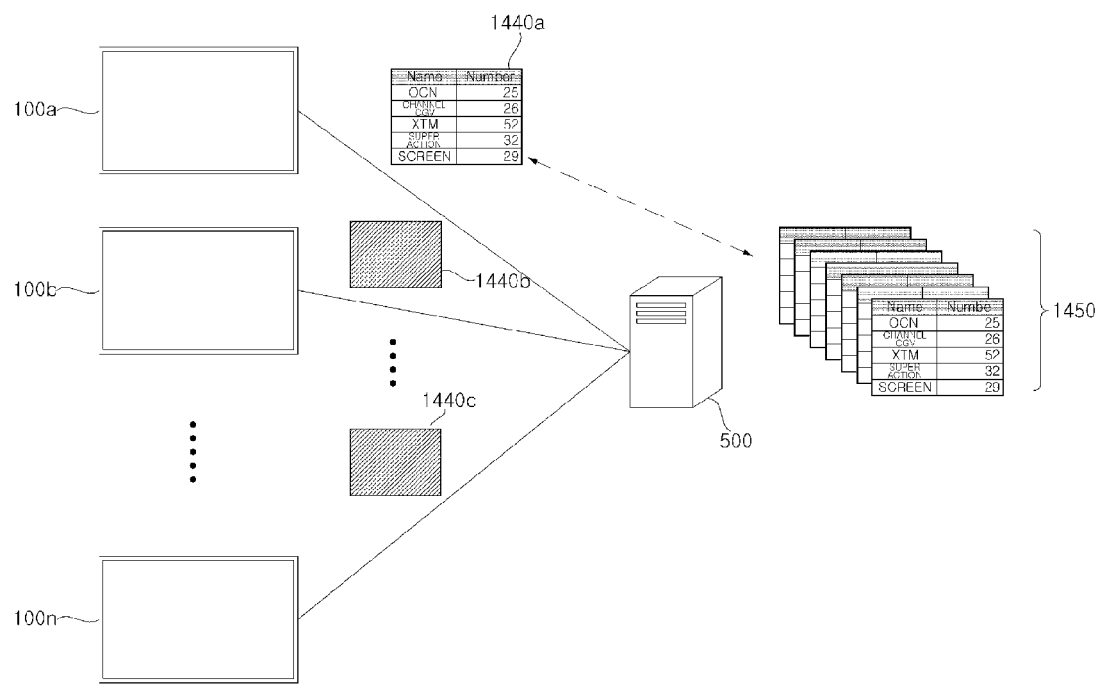

FIG. 14A is an exemplary view illustrating reception of information about incomplete channel maps 1440a to 1440c from a plurality of image display apparatuses 100a to 100n at the server 500.

The server 500 may select matching channel maps by comparing the incomplete channels maps 1440a to 1440c received from the image display apparatuses 100a to 100n with channel maps 1450 stored in the server 500.

In FIG. 14A, the server 500 is shown as selecting a matching channel map for the first image display apparatus 100a by comparing the channel map 1440a received from the first image display apparatus 100a with the stored channel maps 1450, by way of example.

The server 500 may transmit information about the selected channel maps to the respective image display apparatuses 100a to 100n.

Figure 14B:
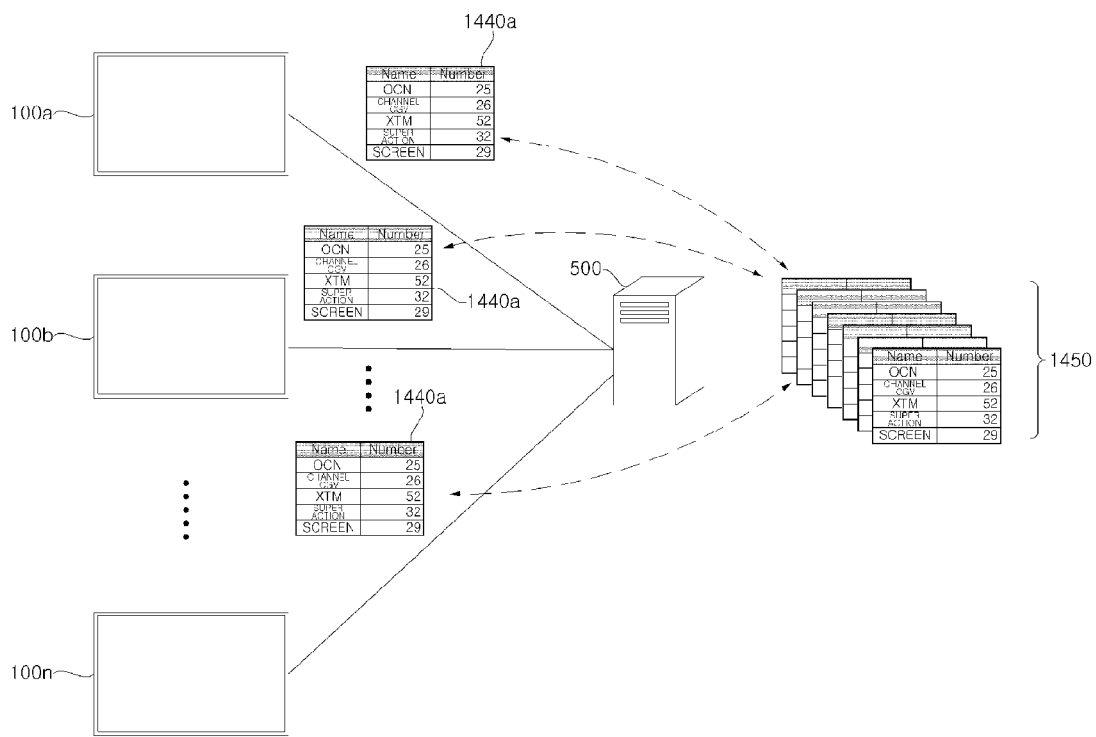

FIG. 14B is an exemplary view illustrating reception of information about the same incomplete channel map 1440a from the plurality of image display apparatuses 100a to 100n at the server 500.

The server 500 may select a matching channel map by comparing the incomplete channels map 1440a received from the image display apparatuses 100a to 100n with the channel maps 1450 stored in the server 500.

It may occur that none of the stored channel maps 1450 match to the incomplete channel map 1440a.

In this case, if a specific number of channel maps are identical among the channel maps received from the image display apparatuses 100a to 100n, the server 500 may store the identical channel map as a new channel map. Herein, it is preferred to complete the identical incomplete channel map using the channel maps received from the image display apparatuses 100a to 100n and then store the completed channel map.

Figure 14C:
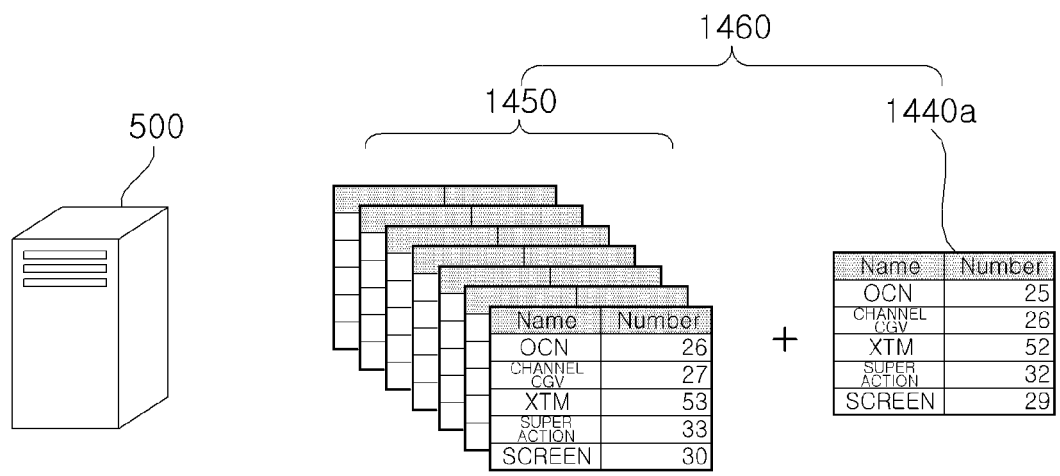

FIG. 14C is an exemplary view illustrating adding the channel map 1440a to the existing channel maps 1450 and storing the resulting updated channel maps 1460. Preferably, the channel map 1440a is completed by filling all channel names and then added.

The image display apparatus 100 may store a completed channel map by exchanging data, particularly, channel map information with the server 500.

Figure 15:
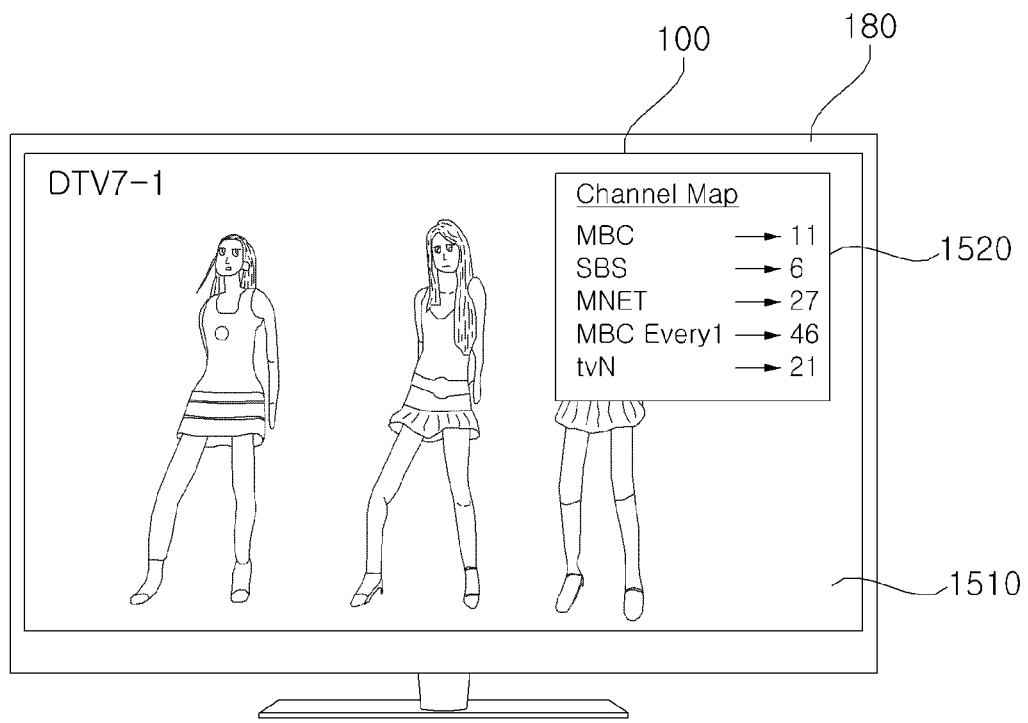

Upon receipt of a user input or upon completion of the channel map, the image display apparatus 100 may display an object 1520 representing the channel map on the display 180, as illustrated in FIG. 15. The channel map object 1520 may be displayed together with a broadcast image 1510. Therefore, the user can readily identify channel names corresponding to channel numbers.

The image display apparatus 100 may also display real-time viewer rating information by exchanging data with the server 500.

Figure 16A:
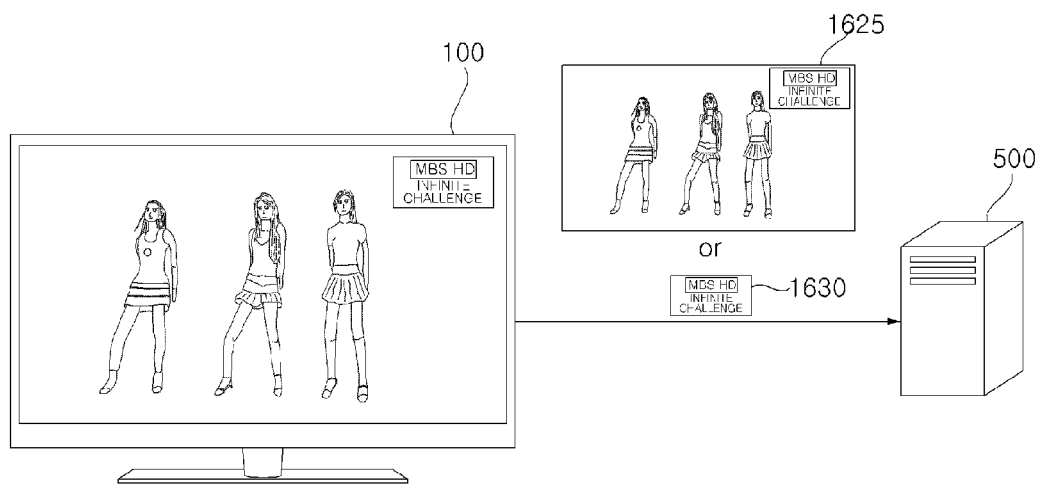

FIG. 16A is an exemplary view illustrating transmission of broadcasting information 1630 or an image 1625 including the broadcasting information from the image display apparatus 100 to the server 500.

While the broadcasting information 1630 is shown in FIG. 16A as transmitted in the form of an image, this is purely exemplary. Thus, the broadcasting information 1630 may be text data. For instance, the broadcasting information 1630 may be text data indicating "MBS HD" or/and "Infinite Challenge".

While the image 1625 including the broadcasting information is shown as a whole broadcast image, it may include only a broadcasting information part. That is, reference numeral 1630 denotes an image including the broadcasting information.

Figure 16B:
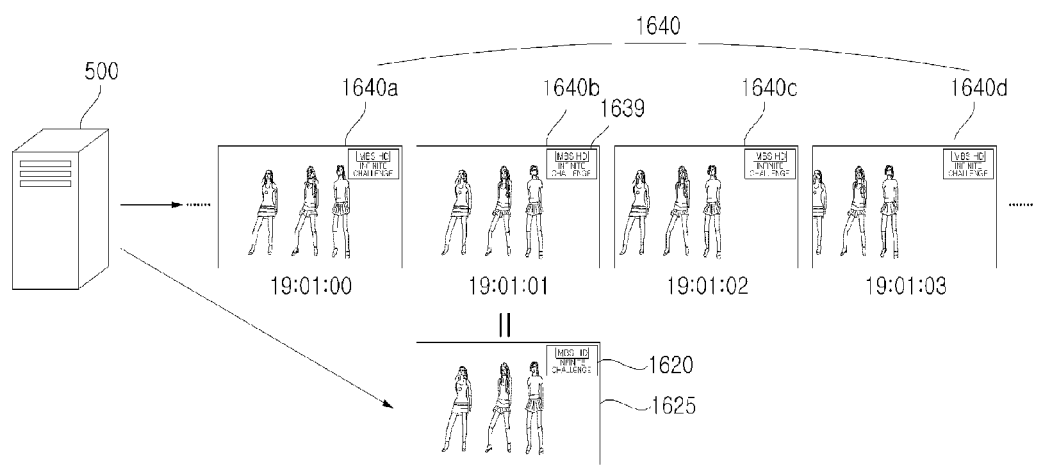

FIG. 16B is an exemplary view illustrating determination made at the server 500 as to whether the image 1625 received from the image display apparatus 100 is a real-time broadcast by comparing the image 1625 with real-time broadcast images 1640 received through a network.

The server 500 may receive real-time broadcast images 1640a to 1640d through the network and store them in the memory 740.

The processor 720 of the server 500 compares the image 1625 received from the image display apparatus 100 with the real-time broadcast images 1640a to 1640d. If the image 1625 is identical to any of the real-time broadcast images 1640a to 1640d, the processor 720 determines that the image 1625 is a real-time broadcast image.

To perform the operation, the processor 720 may use a video pattern comparison algorithm.

In FIG. 16B, the image 1625 is shown as identical to the second real-time broadcast image 1640b, by way of example.

Figure 16C:
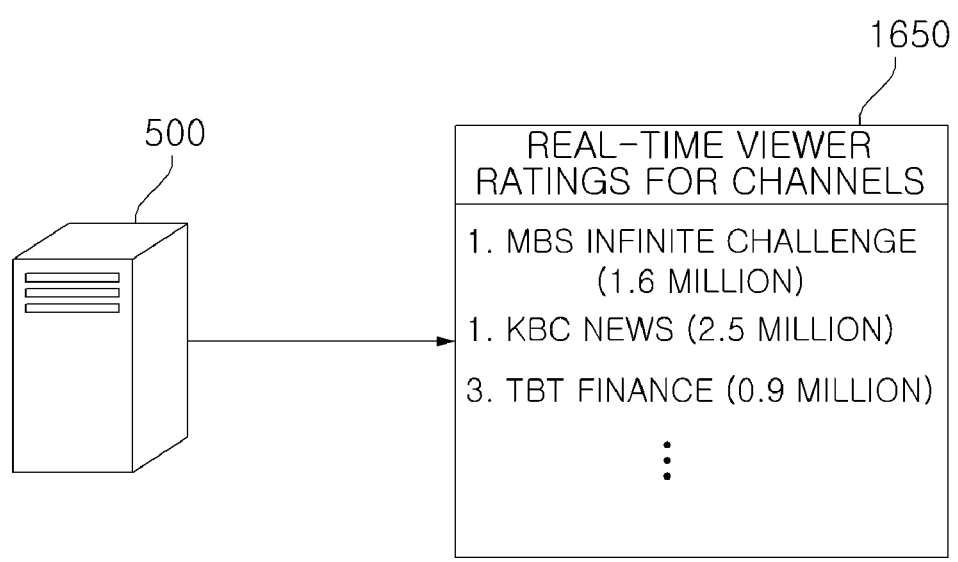

FIG. 16C is an exemplary view illustrating generation of real-time viewer rating information 1650 at the server 500.

The real-time viewer rating information 1650 may be generated, taking into account broadcasting information or broadcast images that the image display apparatus 100 receives through both the set-top box 250 and the broadcasting receiver 105.

In FIG. 16C, the real-time viewer rating information 1650 is specified as the numbers of viewers.

Figure 16D:
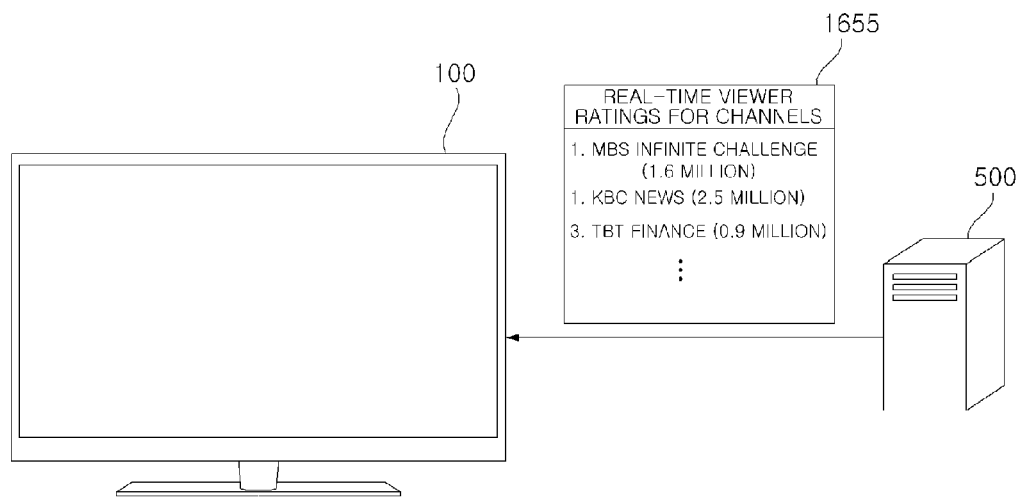

FIG. 16D is an exemplary view illustrating transmission of real-time viewer rating information 1655 from the server 500 to the image display apparatus 100.

The image display apparatus 100 may receive the real-time viewer rating information 1655 from the server 500 through the network interface 135.

Figure 16E:
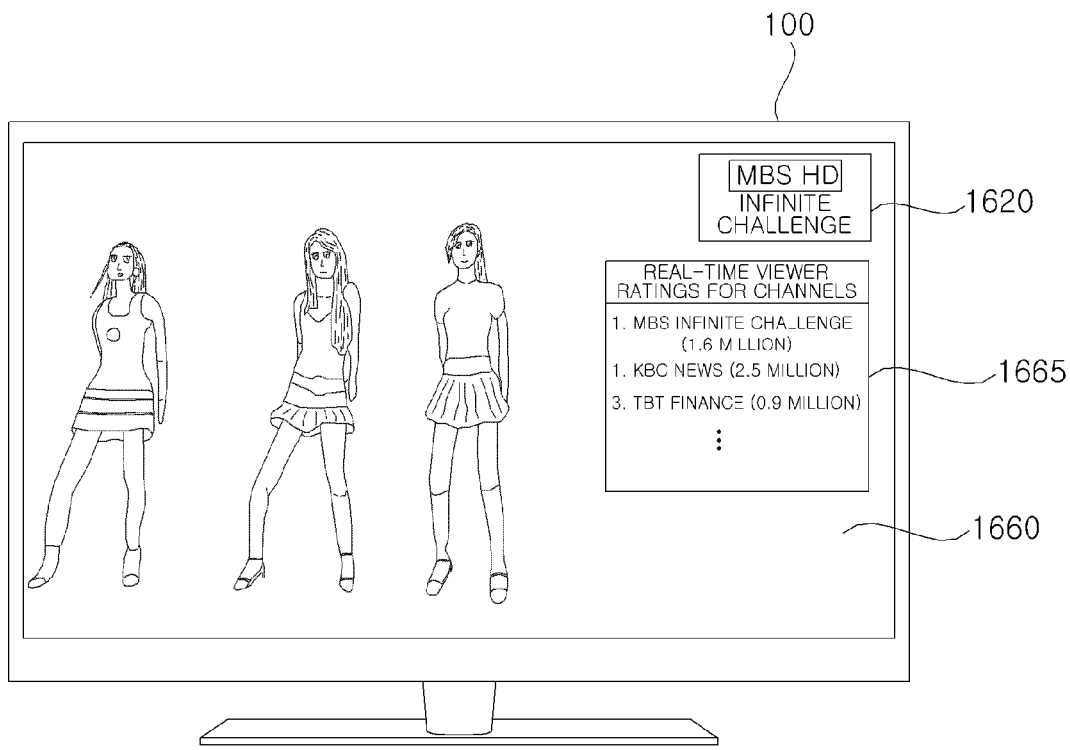

FIG. 16E is an exemplary view illustrating display of a real-time viewer rating object 1665 along with a broadcast image 1660 on the image display apparatus 100.

The controller 170 of the image display apparatus 100 may generate the real-time viewer rating object 1665 based on the real-time viewer rating information 1655 received from the server 500 and may control display of the real-time viewer rating object 1665 on the display 180.

In FIG. 16E, broadcasting information 1620 including channel information, 'MBS HD' and program information, 'Infinite Challenge' is also displayed, by way of example.

Therefore, the user can readily view real-time viewer rating information. Since the user can switch to or view another broadcast channel or broadcast program according to viewer ratings, user convenience can be increased.

Meanwhile, the image display apparatus 100 may determine whether a received broadcast signal is a real-time broadcast signal.

For example, the image display apparatus 100 may receive the real-time broadcast images 1640 through the network, as illustrated in FIG. 16B. Then the image display apparatus 100 may determine whether the image 1625 received from the set-top box 250 is a real-time broadcast image by comparing the image 1625 with the real-time broadcast images 1640.

If the image 1625 is identical to any of the real-time broadcast images 1640, the image display apparatus 100 may determine that the image 1625 is a real-time broadcast image and extract real-time broadcasting information from the image 1625.

As described before, when the same text, figure, or symbol is displayed for a predetermined time in a specific area of a real-time broadcast image, for example, at a corner of the real-time broadcast image, the image display apparatus 100 may extract the specific area, considering that the specific area includes broadcasting information.

Then the image display apparatus 100 may extract real-time channel information, 'MBS BD' or program information, 'Infinite Challenge' from the specific area and may transmit the real-time broadcasting information to the server 500. The image display apparatus 100 may attach a tag 'live' to the real-time broadcasting information.

Even though the received broadcast image is not a real-time broadcast image, the image display apparatus 100 may extract broadcasting information in the afore-described method. The image display apparatus 100 may transmit recorded broadcasting information, not live broadcasting information to the server 500. The image display apparatus 100 may attach a tag 'record' to the recorded broadcasting information.

Figure 17:
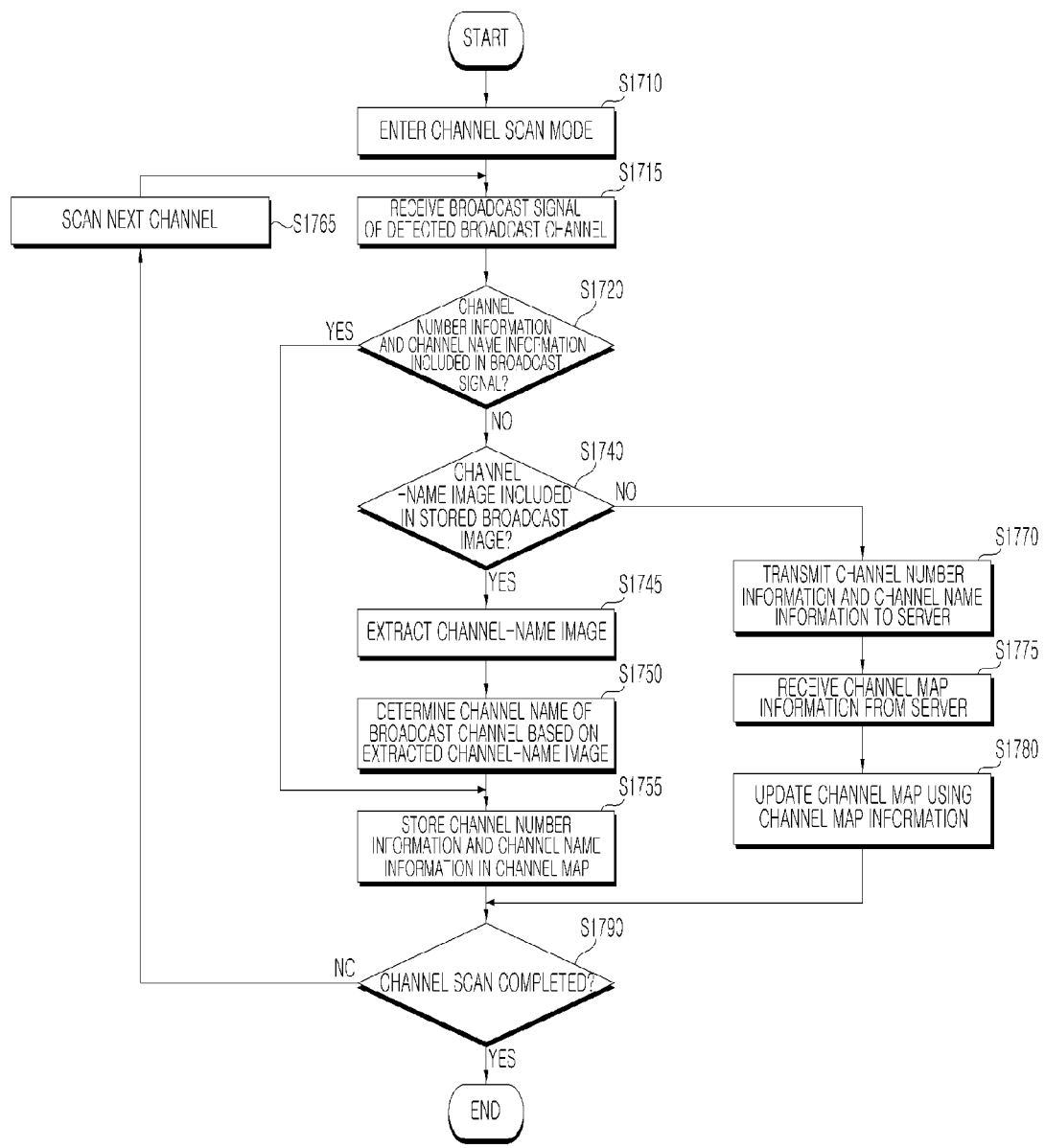
FIG. 17 is a flowchart illustrating a method for operating the image display apparatus according to another embodiment of the present invention.

FIG. 17 is a flowchart illustrating a method for operating the image display apparatus according to another embodiment of the present invention.

The operation method illustrated in FIG. 17 is similar to that illustrated in FIG. 8, except that a channel map is generated during channel scanning rather than the channel map is generated after channel scanning is completed. Accordingly, the step of storing a broadcast image (S822) and the step of storing a channel number and a channel name (S823) described before with reference to FIG. 8 may not be performed herein. The following description is given, centering on the difference from the operation method of FIG. 8.

Steps S1710, S1715, and S1720 correspond to steps S810, S815, and S820 of FIG. 8, respectively and their description is not provided herein.

Steps S1740 through S1755 are performed in the same manner as steps S840 through S855 of FIG. 8, except that the steps are repeated during scanning each channel, not after channel scanning is completed as done in FIG. 8.

Steps S1770, S1775 and S1780 correspond to steps S870, S875 and S880 of FIG. 8.

The image display apparatus 100 determines whether channel scanning has been completed (S1760). Upon completion of the channel scanning, the image display apparatus 100 scans the next channel (S1765). Then the procedure returns to step S1715.

Figure 18:
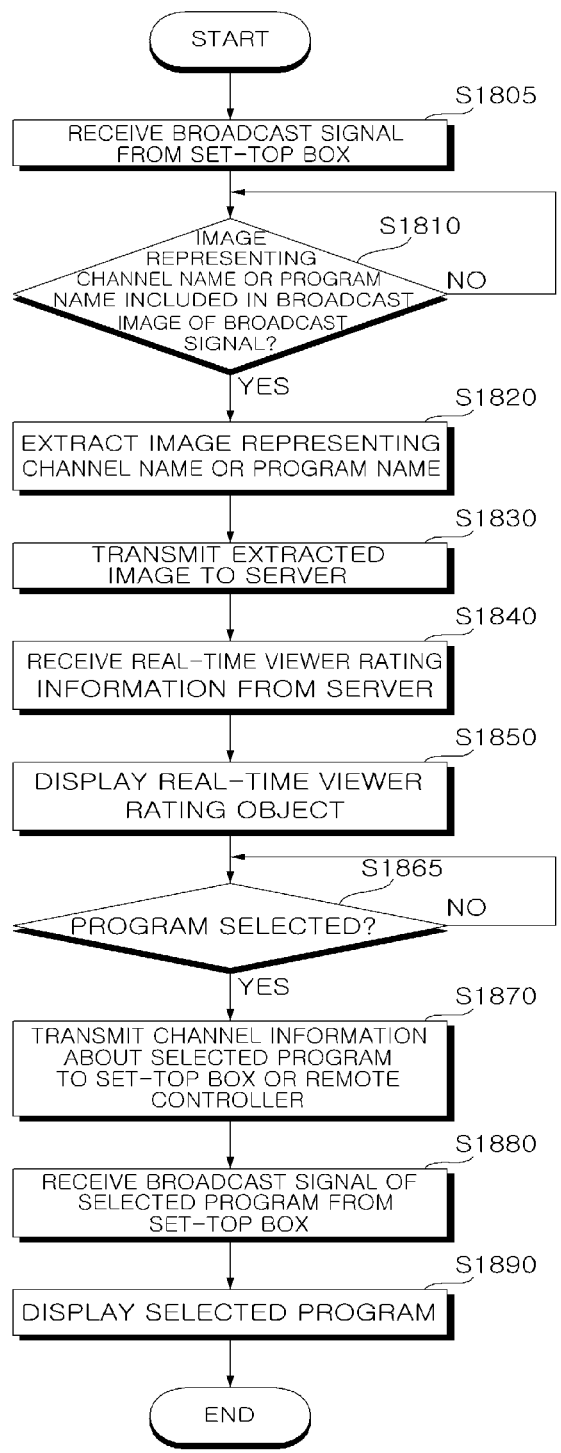
FIG. 18 is a flowchart illustrating a method for operating the image display apparatus according to another embodiment of the present invention.
Figure 19:
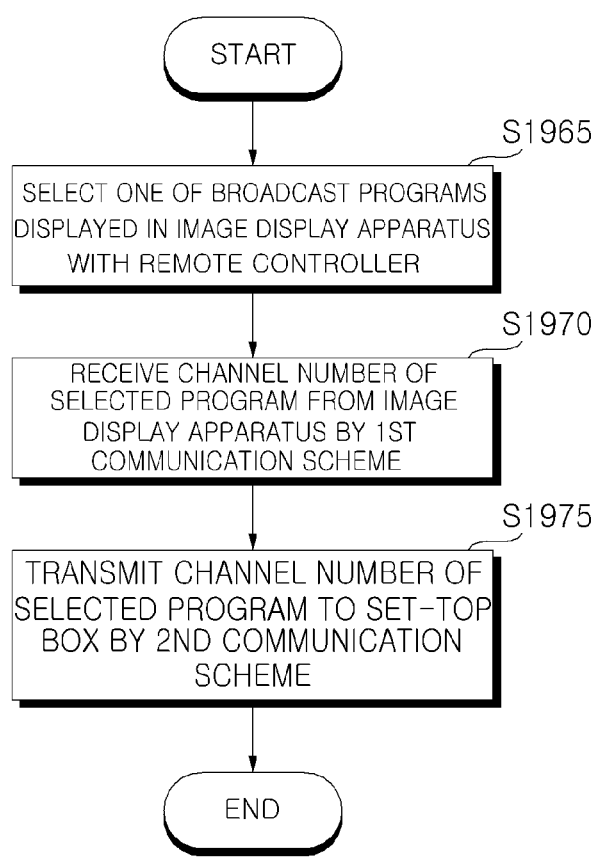
FIG. 19 is a flowchart illustrating a method for operating the remote controller according to another embodiment of the present invention.
Figure 20:
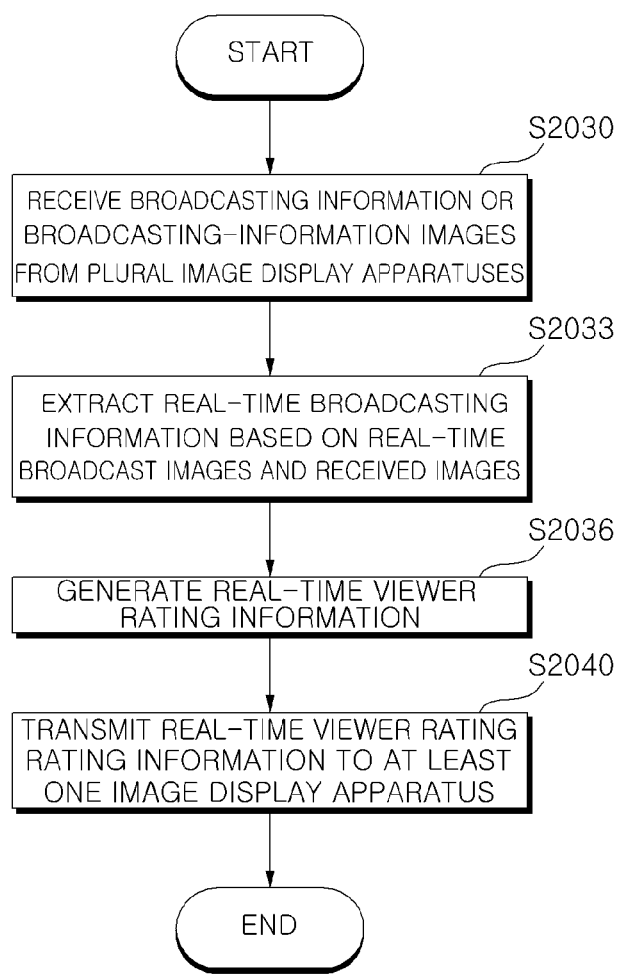
FIG. 20 is a flowchart illustrating a method for operating the server according to another embodiment of the present invention.
Figure 21:
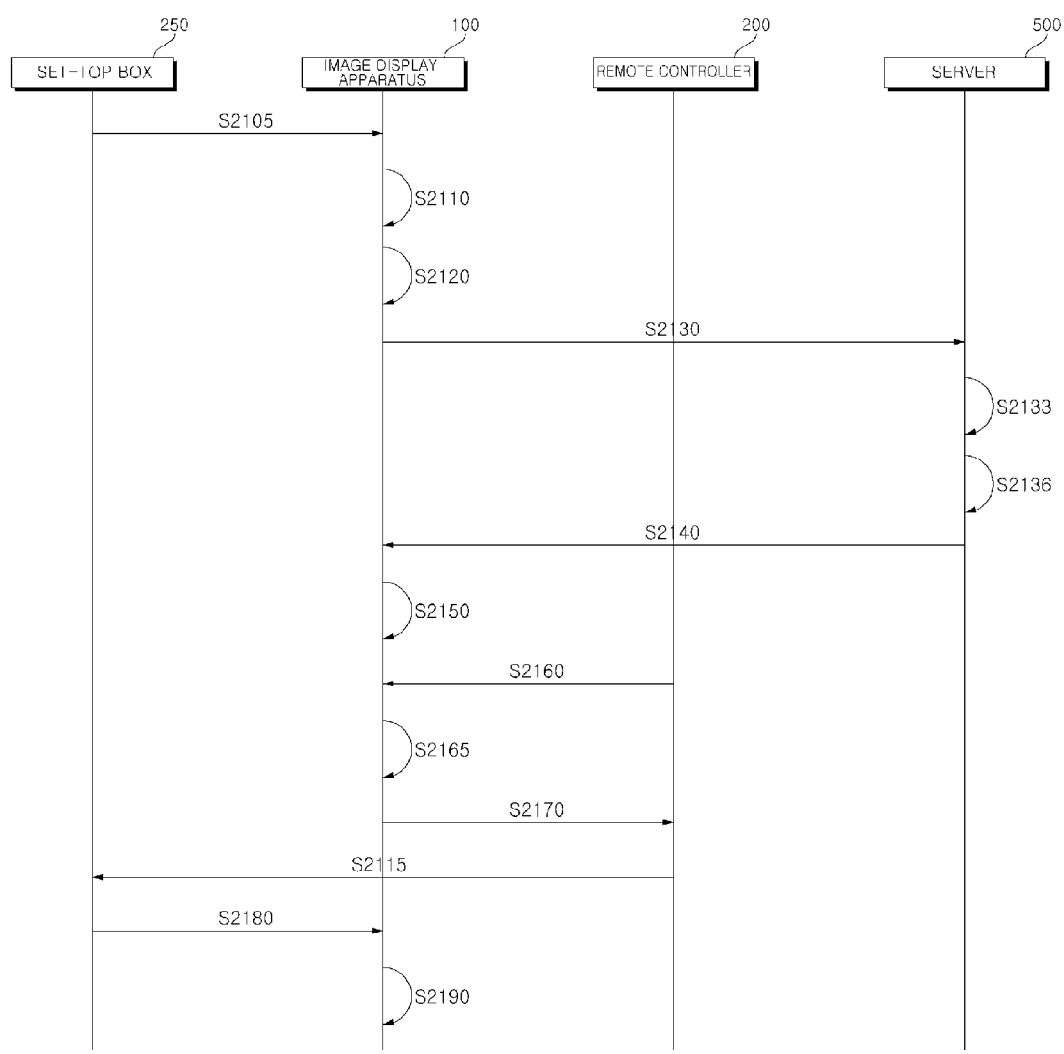
FIG. 21 is a diagram illustrating a signal flow for performing an operation among the image display apparatus, the server, the remote controller, and the set-top box according to another embodiment of the present invention.
Figure 22:
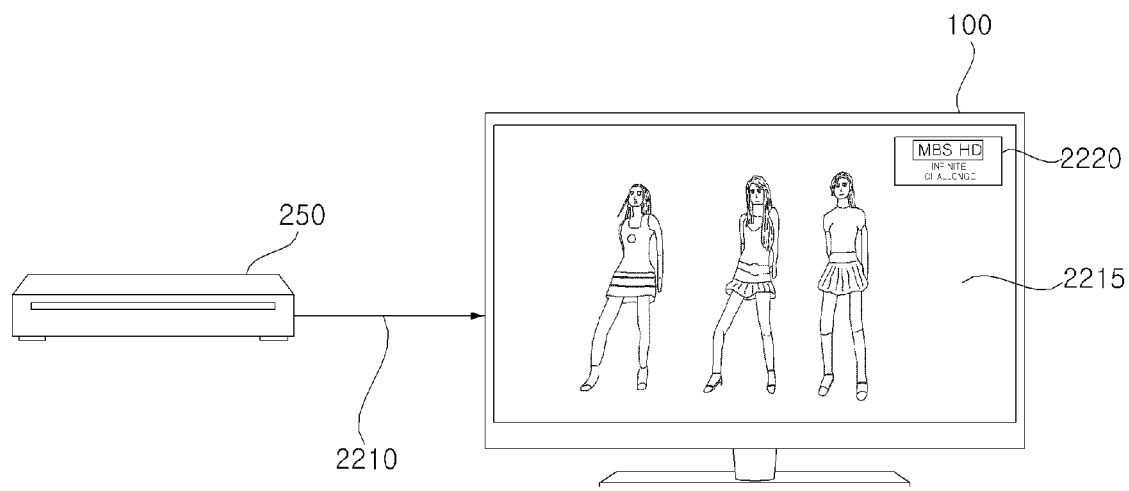
FIGS. 22 to 24 are views referred to for describing various examples of the operation method illustrated in FIG. 18, 19 or 20.
Figure 23A:
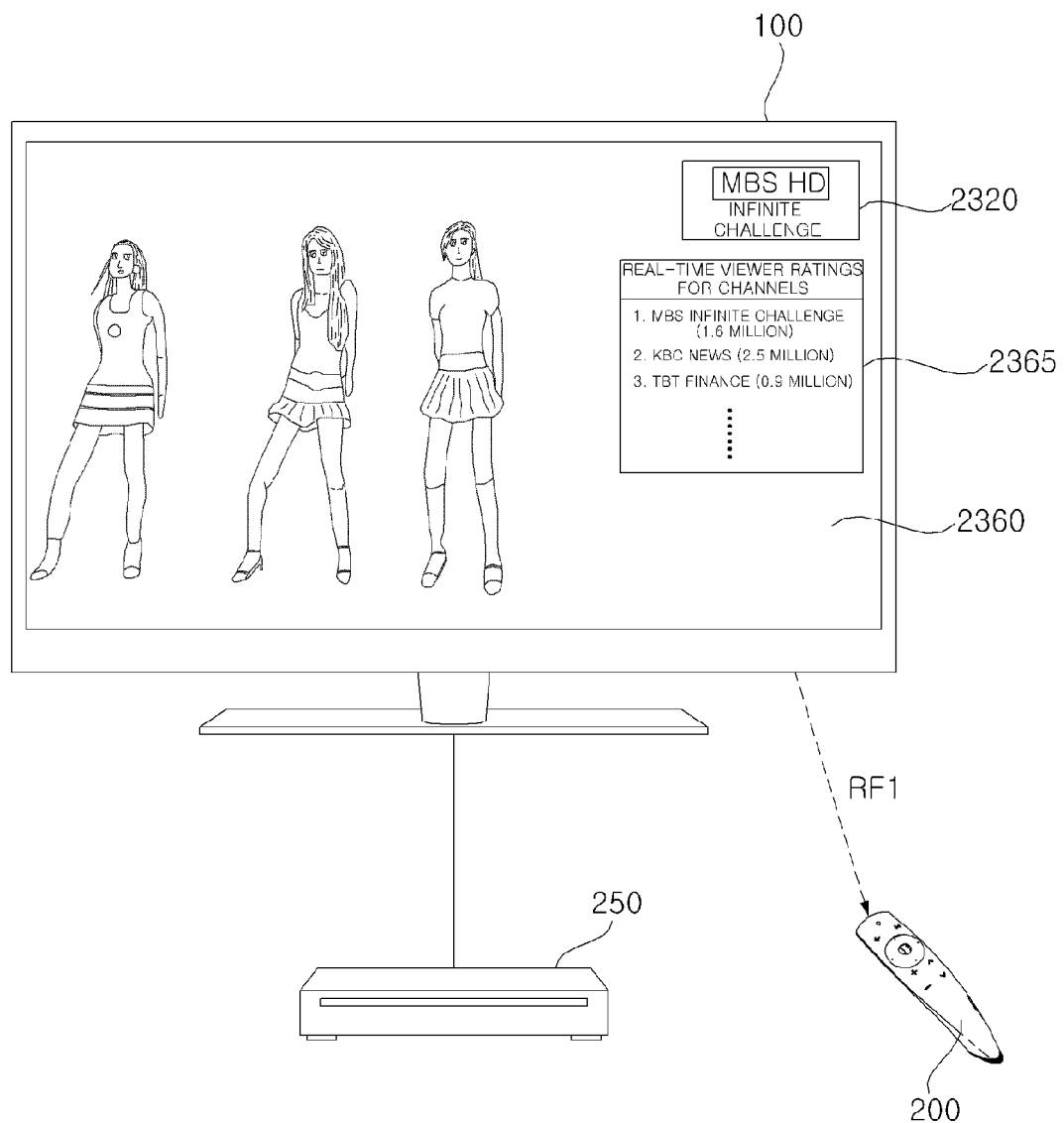
Figure 23B:
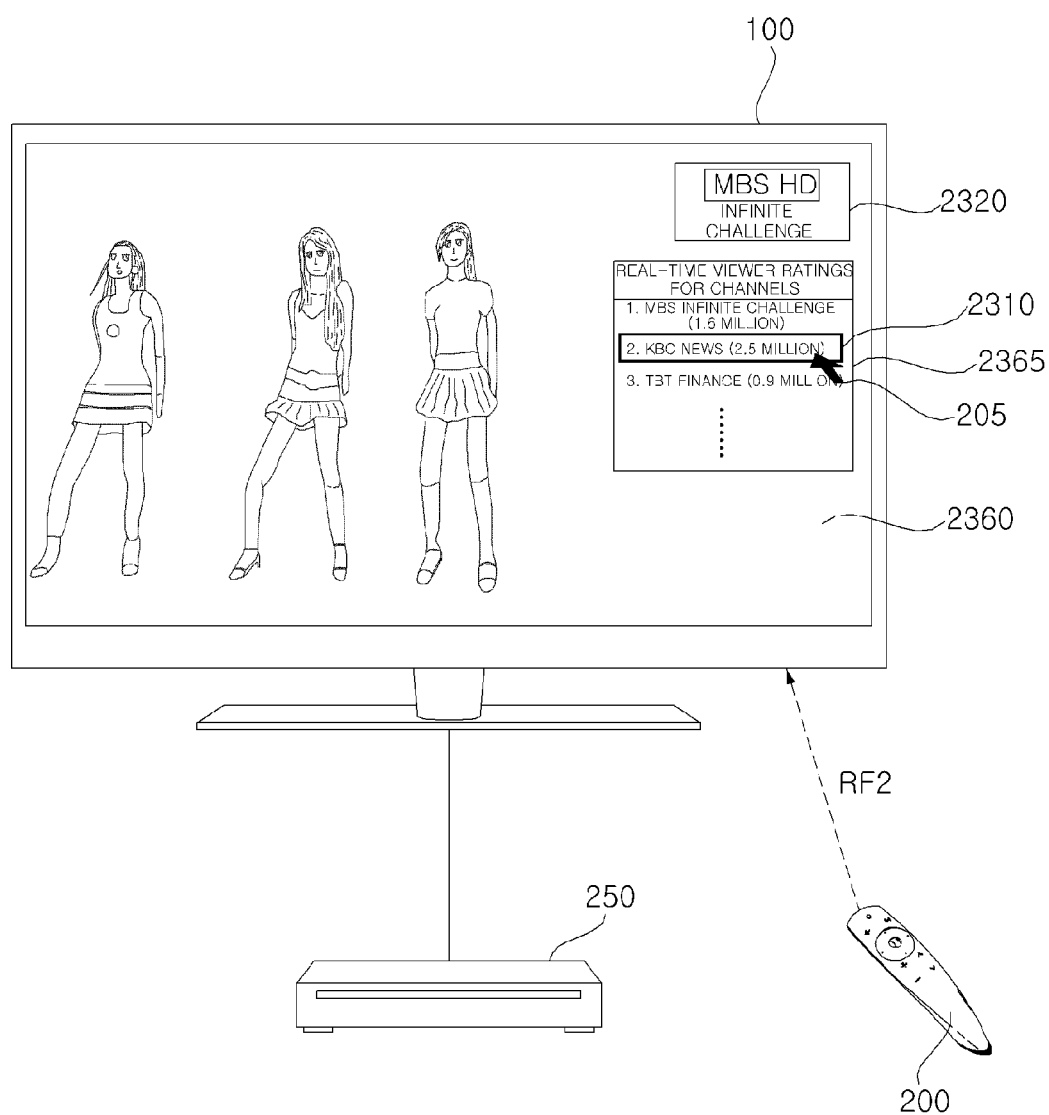
Figure 23C:
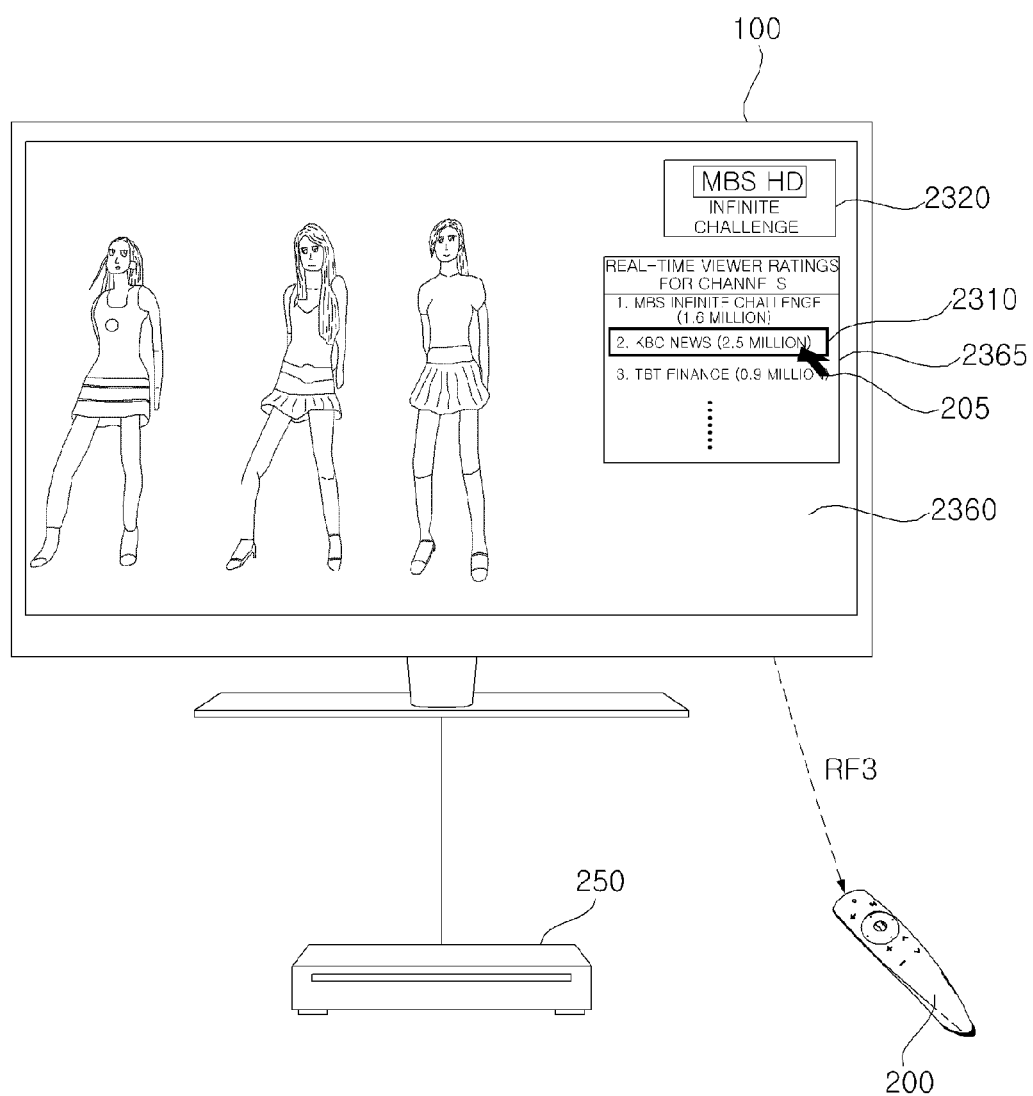
Figure 23D:
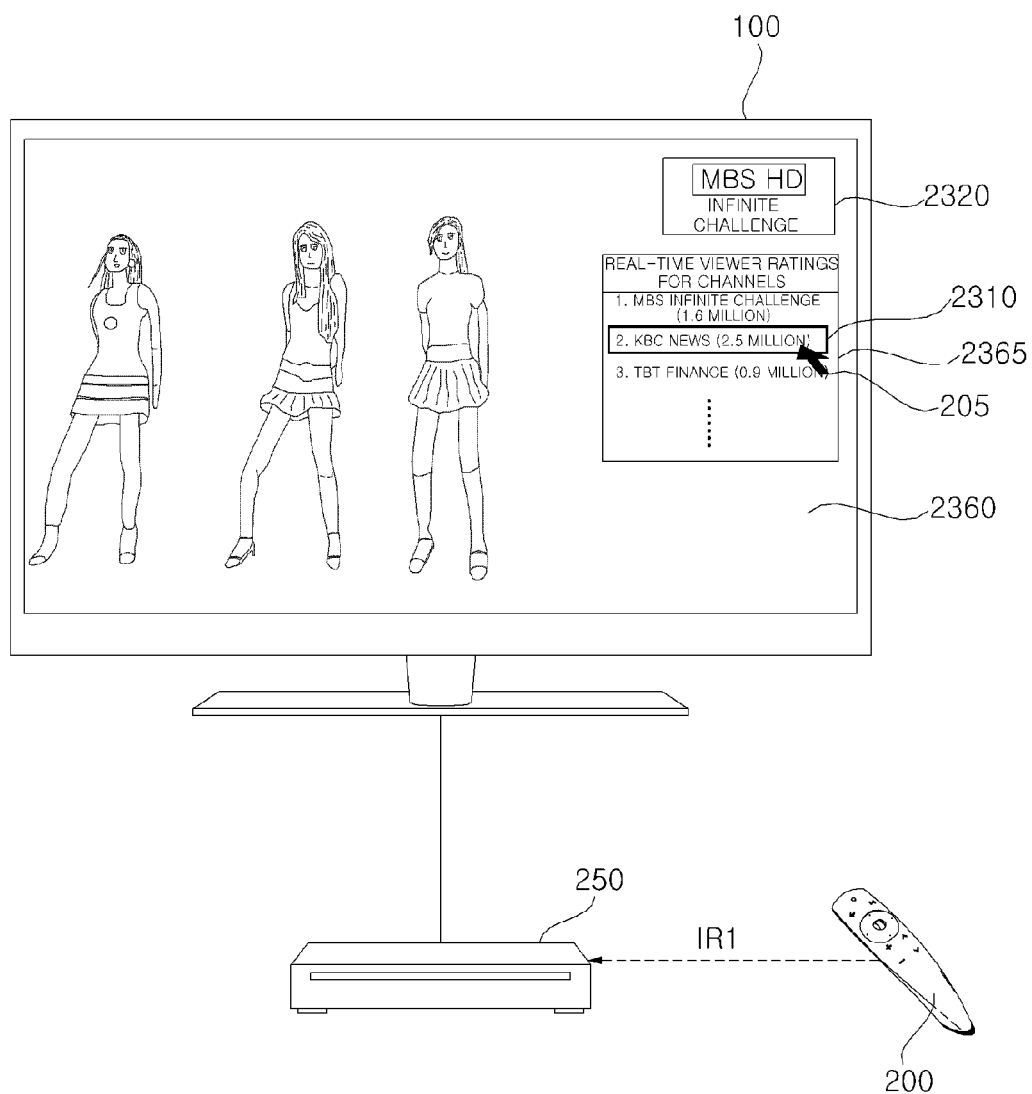
Figure 23E:
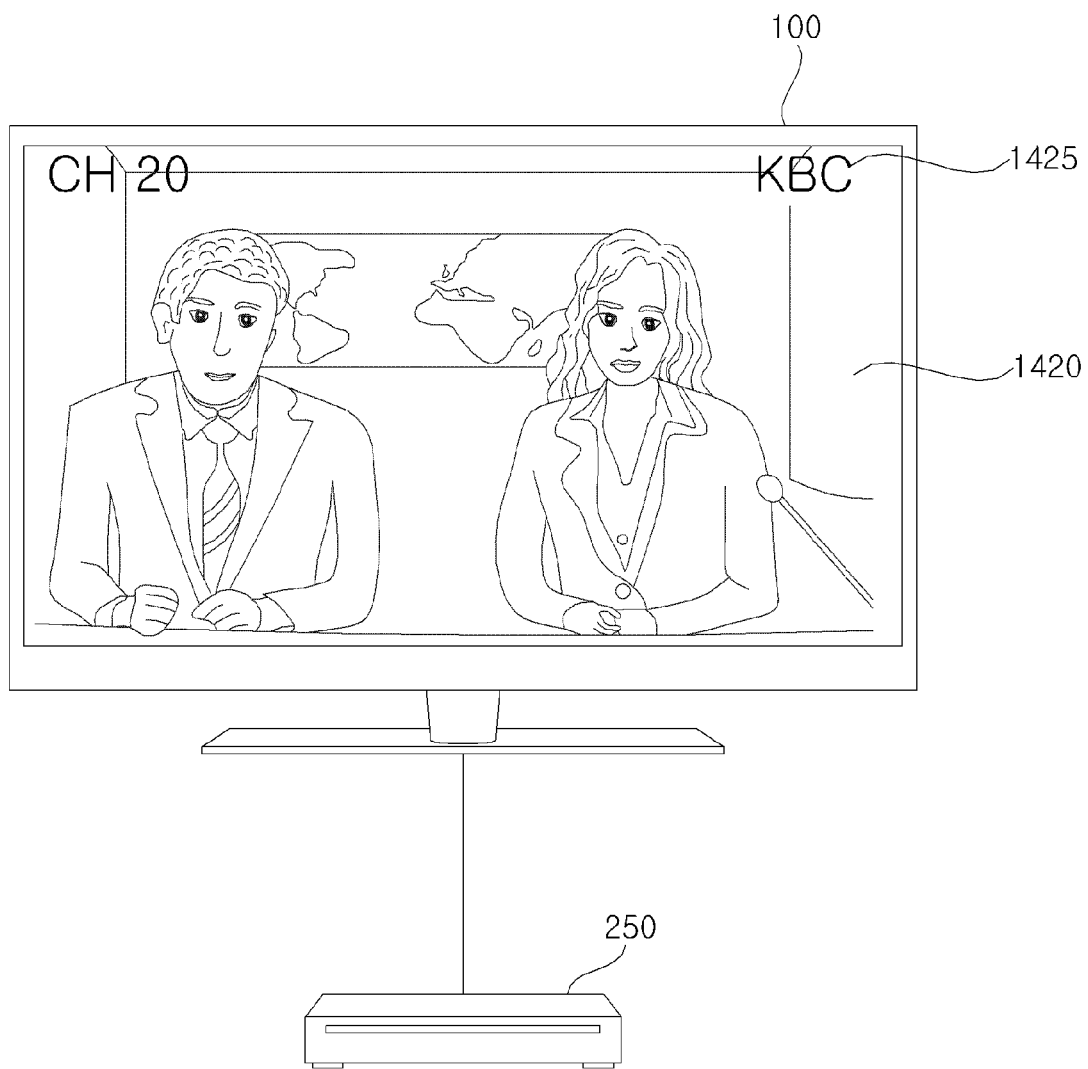
Figure 24:
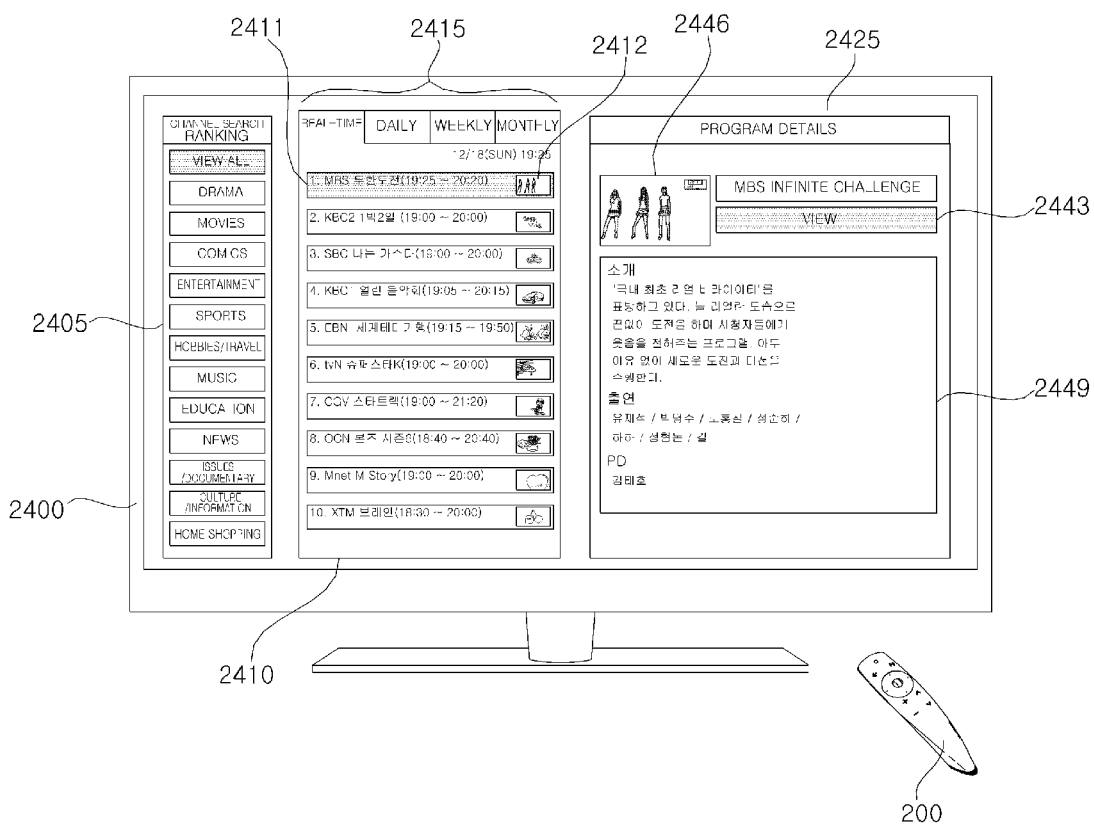

FIG. 18 is a flowchart illustrating a method for operating the image display apparatus according to another embodiment of the present invention, FIG. 19 is a flowchart illustrating a method for operating the remote controller according to another embodiment of the present invention, FIG. 20 is a flowchart illustrating a method for operating the server according to another embodiment of the present invention, FIG. 21 is a diagram illustrating a signal flow for performing an operation among the image display apparatus, the server, the remote controller, and the set-top box according to another embodiment of the present invention, and FIGS. 22 to 24 are views referred to for describing various examples of the operating method illustrated in FIG. 18, 19 or 20.

First of all, the image display apparatus 100 receives a broadcast signal from the set-top box 250 (S1805). Step S1805 corresponds to step S2105 of FIG. 21.

The image display apparatus 100 may receive a cable broadcast signal, a satellite broadcast signal, a terrestrial broadcast signal, or an IPTV broadcast signal through the set-top box 250. The received broadcast signal is provided to the controller 170 through the external device interface 130.

The controller 170 processes the received broadcast signal, for example, by demultiplexing, decoding, etc. thereby converting the broadcast signal to a signal that can be displayed on the display 180.

The controller 170 controls display of a broadcast image corresponding to the broadcast signal received from the set-top box 250 on the display 180.

Then the image display apparatus 100 determines whether an image indicating a channel name or a program name exists in the broadcast image of the broadcast signal (S1810). In the presence of an image indicating a channel name or a program name in the broadcast image of the broadcast signal, the image display apparatus 100 extracts the image indicating a channel name or a program name (S1820) and transmits the extracted image to the server 500 (S1830). Steps S1810 and S1820 correspond to steps S2110 and S2120 of FIG. 21, respectively. Step S1830 corresponds to step S2030 of FIG. 20 and S2130 of FIG. 21.

The controller 170 determines the existence of an image indicating a channel name or a program name in the broadcast image of the broadcast signal received from the set-top box 250.

Specifically, the controller 170 may detect a log using a logo image indicating the name of a broadcast channel or a logo image indicating the name of a specific program.

In general, the logo image indicating the channel name or the logo image indicating the program name is displayed at the top right corner, the bottom right corner, or the top left corner of the broadcast image. Thus, the controller 170 extracts the displayed area of the logo image and detects the logo or text from the area.

The image display apparatus 100 may transmit the detected image indicating the channel name or program name to the server 500 through the network interface 135.

The server 500 may receive the image indicating the channel name or program name of the broadcast image displayed on the image display apparatus 100 through the network interface 730. The image may be provided to the processor 720 of the server 500.

Then the server 500 extracts real-time broadcasting information based on the received image and a real-time broadcast image (S2033) and generates real-time viewer rating information (S2036). The server 500 transmits the real-time viewer rating information to at least one of a plurality of image display apparatuses (S2040). Steps S2033 and S2036 correspond to step S2133 and S2136 of FIG. 21 and step S2040 corresponds to step S1840 of FIG. 18 and step S2140 of FIG. 21.

Specifically, the processor 720 of the server 500 may generate real-time viewer rating information using real-time broadcasting information received from a plurality of image display apparatuses. The real-time viewer rating information may include information about a channel share, the number of channel viewers, a program share of a specific channel, the number of viewers for the specific channel, etc. The real-time viewer rating information may further include real-time channel search information or real-time program search information.

The processor 720 may determine whether images including broadcasting information received from a plurality of image display apparatuses are real-time broadcast images by comparing the received images with real-time broadcast images received through the network.

In the case of a real-time broadcast image, the processor 720 may extract broadcasting information such as channel information, program information, etc. from the broadcast image and generate real-time viewer rating information based on the extracted broadcasting information in the afore-described manner.

The network interface 730 may transmit the real-time viewer rating information to at least one of the image display apparatuses. Preferably, the real-time viewer rating information is transmitted to all image display apparatuses that have transmitted broadcasting information or images including the broadcasting information.

Subsequently, the image display apparatus 100 displays an object representing the received real-time viewer rating information (S1850). Step S1850 corresponds to step S2150 of FIG. 21.

The real-time viewer rating object may include a plurality of broadcast program items. Especially, the real-time broadcast program items may be arranged in the order of their viewer ratings. The real-time viewer rating object may further include broadcast program type items, a real-time ranking item, a daily ranking item, a weekly ranking item, and a monthly ranking item. The broadcast program items may be arranged by type, real-time ranking, daily ranking, weekly ranking, and monthly ranking. Accordingly, since a plurality of broadcast programs are arranged according to various criteria, user convenience can be increased.

The real-time viewer rating object may not include channel number information. That is, the real-time viewer rating object may be configured to include a plurality of program-based program items.

Upon receipt of an input requesting selection of a specific program (S1865), the image display apparatus 100 transmits channel information about the program to the set-top box 250 or the remote controller 200 (S1870). Then the image display apparatus 100 receives a broadcast signal of the selected program from the set-top box 250 (S1880) and displays the selected broadcast program (S1890). Step S1865 corresponds to step S1965 of FIG. 19 and step S2165 of FIG. 21. Step S1870 corresponds to step S1970 of FIG. 19 and step S2170 of FIG. 21. Steps S1880 and S1890 correspond to steps S2180 and S2190 of FIG. 21.

With the object including the plurality of broadcast program items displayed on the display 180 of the image display apparatus 100, the user may select one of the broadcast program items using the remote controller (S1965).

The user input interface 150 of the image display apparatus 100 may receive a remote control signal from the remote controller 200 and select a broadcast program according to the remote control signal.

Especially when the remote controller 200 outputs a pointing signal corresponding to its movement as described before with reference to FIG. 5, the controller 170 of the image display apparatus 170 may control reception of the pointing signal and display of a pointer image on the display 180 based on the pointing signal. The controller 170 may select one of the plurality of broadcast program items based on the pointing signal.

Meanwhile, the image display apparatus 100 may transmit channel information about the selected program to the remote controller 200. Upon selection of one of the plurality of broadcast programs included in the object, the controller 170 may extract channel number information or channel name information about the selected program from a channel map stored in the memory 140.

The controller 170 may transmit the channel number information or channel name information about the selected program to the remote controller 200. Or the controller 170 may transmit the channel number information or channel name information about the selected program directly to the set-top box 250.

The remote controller 200 may receive the channel number information or channel name information about the selected program from the user input interface 150 of the image display apparatus 100.

Then the remote controller 200 may transmit information about the channel number of the program based on the received channel number or channel name information to the set-top box 250.

The remote controller 200 may communicate with the set-top box 250 by IR communication and with the image display apparatus 100 by RF communication. Since the remote controller 200 exchanges data with the image display apparatus 100 in an RF-based manner but with an external device such as the set-top box 250 in an IR-based manner, the remote controller 200 may be referred to as an IR blaster.

To conduct the IR communication, the remote controller 200 may receive key values for remotely controlling the set-top box 250, from the set-top box 250, the image display apparatus 100, or the server 500. When the set-top box 250 is powered on, the key values may be received from the set-top box 250, the image display apparatus 100, or the server 500.

The set-top box 250 receives a broadcast signal of a channel corresponding to the received channel number information. For this purpose, the set-top box 250 may receive the selected channel through the tuner 270 or a stream of the channel through the network interface 255.

The set-top box 250 transmits the received broadcast signal of the channel to the image display apparatus 100. The external device interface 130 of the image display apparatus 100 receives the broadcast signal of the selected program from the set-top box 250. The controller 170 of the image display apparatus 100 processes the received broadcast signal by demultiplexing, decoding, etc. and controls display of the selected program on the display 180.

FIG. 22 and FIGS. 16A to 16E are views referred to for describing steps S1805 through S1850 of FIG. 18. For FIGS. 16A to 16E, their already given description will be referred to.

FIG. 22 is an exemplary view illustrating transmission of a broadcast signal 2210 from the set-top box 250 to the image display apparatus 100.

The image display apparatus 100 may display a broadcast image 2215 corresponding to the received broadcast signal 2210 on the display 180.

Particularly, the broadcast image 2215 may include broadcasting information 2220 representing a channel name 'MBS HD' and a program name 'Infinite Challenge'.

Meanwhile, the image display apparatus 100 transmits the image 1630 including the channel name and the program name or the broadcast image 1625 including the channel name and the program name to the server 500 in FIG. 16A.

In FIG. 16B, the server 500 determines whether the received image 1625 is a real-time broadcast image by comparing the image 1625 with the real-time broadcast images 1640 received through the network.

In FIG. 16C, the server 500 generates the real-time viewer rating information 1650.

In FIG. 16D, the server 500 transmits the real-time viewer rating information 1655 to the image display apparatus 100.

In FIG. 16E, the image display apparatus 100 displays the real-time viewer rating object 1665 along with the broadcast image 1660.

The controller 170 of the image display apparatus 100 may control generation of the real-time viewer rating object 1665 using the real-time viewer rating information 1655 received from the server 500 and thus may control display of the object 1665 on the display 180.

The broadcasting information 1620 indicating the channel name 'MBS HD' and the program name 'Infinite Challenge' is also displayed, by way of example.

Therefore, the user can readily view real-time viewer rating information. In addition, as the user can switch to another broadcast channel or broadcast program according to the viewer ratings, user convenience can be increased.

Meanwhile, the image display apparatus 100 may generate a channel map in the channel scan mode. Channel information may be extracted from the channel map in step S1870.

The channel map generation of the image display apparatus 100 has been described with reference to FIGS. 11A to 12D and thus its description is not provided herein.

FIGS. 23A to 23E are views referred to for describing steps S1865 to S1890 of FIG. 18.

FIG. 23A is an exemplary view illustrating display of a broadcast image 2360 corresponding to a broadcast signal received from the set-top box 250 on the display 180 of the image display apparatus 100. A viewer rating object 2365 may further be displayed together with the broadcast image 2360 on the display 180.

Particularly, the broadcast image 2360 may include broadcasting information 2320 representing a channel name 'MBS HD' and a program name 'Infinite Challenge'.

In FIG. 23A, for IR communication between the remote controller 200 and the set-top box 250, the image display apparatus 100 transmits key values RF1 for remotely controlling the set-top box 250 to the remote controller 200. The image display apparatus 100 may transmit the key values RF1 for remotely controlling the set-top box 250 to the remote controller 200 by RF communication.

FIG. 23B is an exemplary view illustrating selection of a specific program item 2310 from among a plurality of program items listed in the viewer rating object 2365 using a pointing signal RF2 from the remote controller 200. A pointer image 205 corresponding to the pointing signal RF2 of the remote controller 200 points at the program item 2310, thus selecting the program item 2310 in FIG. 23B. The remote controller 200 may transmit the pointing signal RF2 for selecting the program item 2310 to the image display apparatus 100 by RF communication.

FIG. 23C is an exemplary view illustrating transmission of channel information RF3 about the selected program item 2310 from the image display apparatus 100 to the remote controller 200.

For example, if the channel number and channel name of the selected program item 'KBC News' are CH 20 and KBC, respectively, the image display apparatus 100 may transmit channel information RF3 including at least one of the channel number and the channel name to the remote controller 200 by RF communication.

Meanwhile, upon selection of a program item, the image display apparatus 100 may detect a channel number matching to the program item in a pre-stored channel map. The channel map may be generated in the method described before with reference to FIGS. 11A to 14C. For an example of the channel map, FIG. 15 is referred to.

Specifically, the controller 170 of the image display apparatus 100 may extract the channel number of the selected program item by comparing the selected program item with the channel map stored in the memory 140.

FIG. 23D is an exemplary view illustrating transmission of channel number information IR1 about the selected program item 2310 from the remote controller 200 to the set-top box 250.

For example, the remote controller 200 may transmit a key value IR1 of the channel number information CH 20 about 'KBC News' to the set-top box 250.

Therefore, the set-top box 250 receives a broadcast signal of the selected channel CH 20 by channel switching and transmits the received broadcast signal to the image display apparatus 100, as illustrated in FIG. 23E. Eventually, the image display apparatus 100 may display a broadcast image 1420 of CH 20 on the display 180. Due to the channel switching, an object 1425 indicating the channel number CH 20 and the channel name KBC may be displayed.

In the case of broadcast signals provided by cable system operators, different cable system operators may assign different channel names to the same channel number or the same cable system operator may assign different channel names to the same channel number according to subscribed broadcasting service types. As more and more channel numbers are created, channel numbers do not accurately match to channel names, inconveniently.

As described before, it is preferred to display an object listing a plurality of program items such as a viewer rating object and select a program from the object, rather than a program is viewed by selecting a channel number.

In accordance with an embodiment of the present invention, one of a plurality of broadcast program items is selected in a program-based fashion without channel number information. Therefore, the image display apparatus can display a user-intended broadcast program reliably.

FIG. 24 illustrates an exemplary object listing a plurality of program items.

Referring to FIG. 24, upon receipt of viewer rating information from the server 500, the image display apparatus 100 may display a broadcast program list 2400 that lists a plurality of broadcast program items according to their viewer ratings.

The broadcast program list 2400 may include a viewer rating object that provides viewer rating information. For instance, the viewer rating object may provide real-time viewer rating information.

The real-time viewer rating object may include a plurality of broadcast program items. Particularly, the real-time broadcast program items may be arranged in the order of their viewer ratings. Thus, the real-time viewer rating object may further include broadcast program type items 2405 and a real-time/daily/weekly/monthly ranking item 2415 so that broadcast program items 2410 may be arranged by type, real-time ranking, daily ranking, weekly ranking, and monthly ranking.

Each broadcast program item may include a program name and a thumbnail image of the program. Therefore, the user can readily identify the program.

That is, the broadcast program list lists broadcast program items by viewer rating and each broadcast program item includes its thumbnail image.

Upon selection of a program item 2412 from among the program items 2410, a detailed information item 2425, a view item 2443, a thumbnail image item 2446, and detailed information 2449 may further be displayed in regard to the selected program 2412. Therefore, user convenience can be increased.

As illustrated in FIG. 24, the real-time viewer rating object may not include channel number information. This means that the real-time viewer rating object may list a plurality of program items in a program-based manner.

In general, a cable system operator assigns different channel numbers to the same channel in different regions. Therefore, it may be difficult to match channel numbers in a broadcast program list including real-time viewer rating information, as illustrated in FIG. 24. Although channel numbers can be set with respect to the image display apparatus 100, the embodiment of the present invention is characterized in that a broadcast program list is made based on broadcast program names without channel numbers.

That is, each broadcast program item may include a program name, a playing time, and a thumbnail image of the broadcast program, without the channel number of the broadcast program, as illustrated in FIG. 24.

In this manner, one of a plurality of broadcast program items can be selected in a program-based fashion without channel number information. Accordingly, the user can view an intended broadcast program easily.

Especially when the user selects an intended broadcast program item by voice, the image display apparatus 100 can readily select the broadcast program item in the broadcast program list 2400 by voice recognition.

Since the program list 2400 is created based on program items, not based on channel numbers, a user-intended program can be selected simply and accurately by voice recognition.

It is also possible to select a broadcast program in the broadcast program list 2400 using the pointer 205 representing movement of the remote controller 200.

Figure 25:
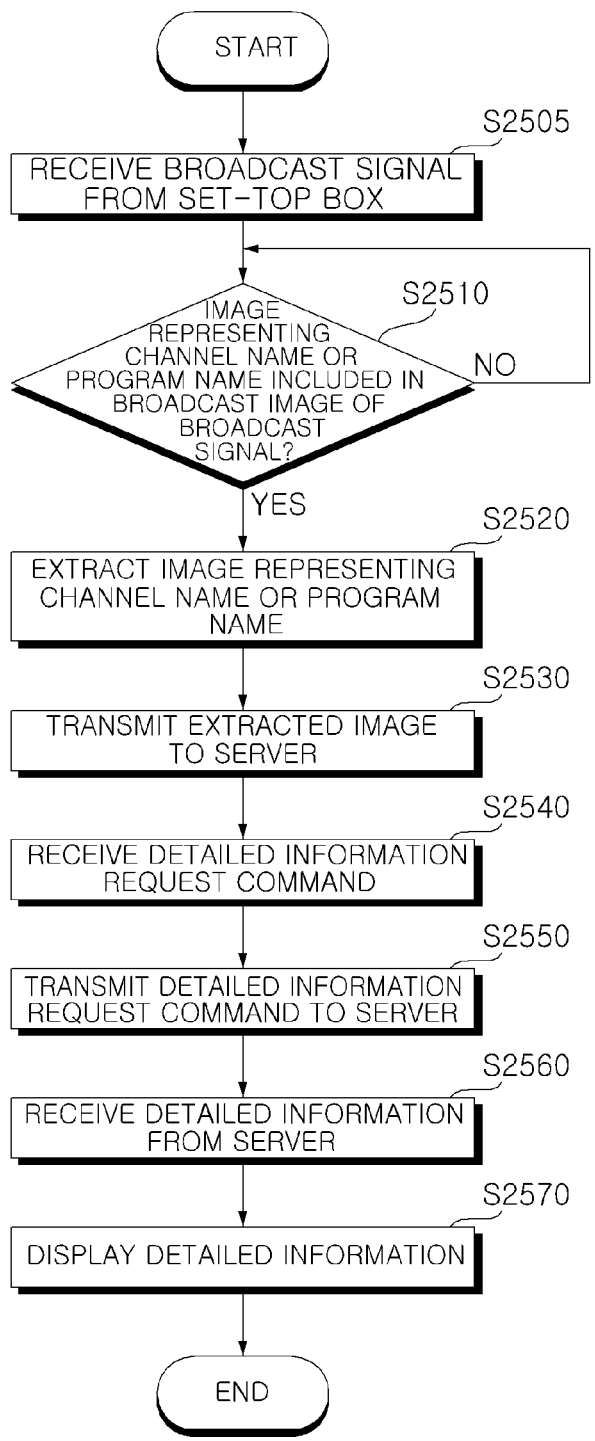
FIG. 25 is a flowchart illustrating a method for operating the image display apparatus according to another embodiment of the present invention.
Figure 26:
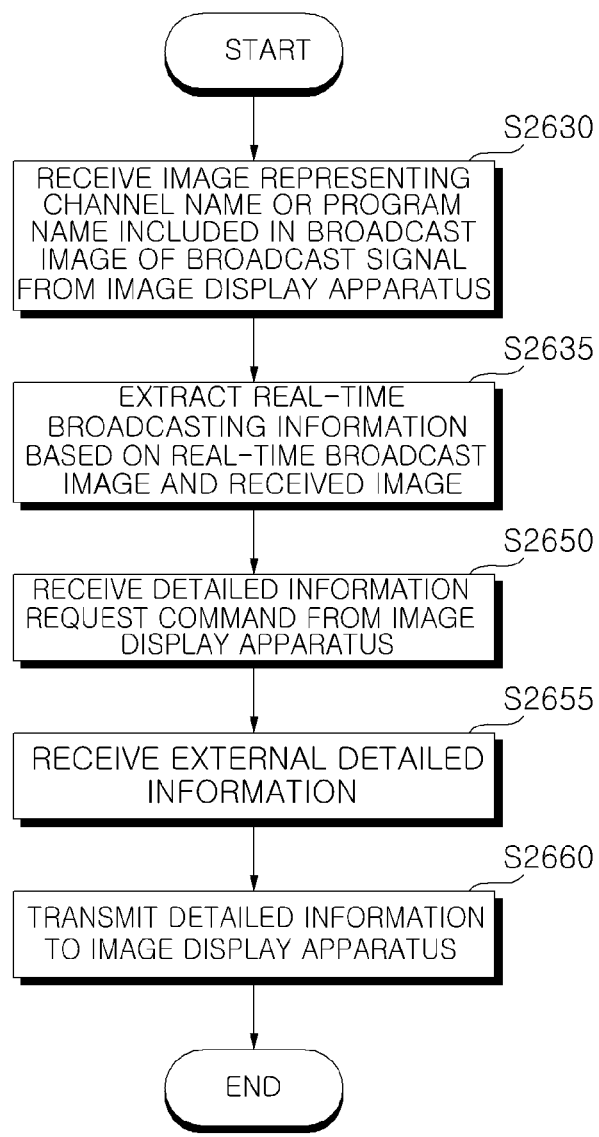
FIG. 26 is a flowchart illustrating a method for operating the server according to another embodiment of the present invention.
Figure 27:
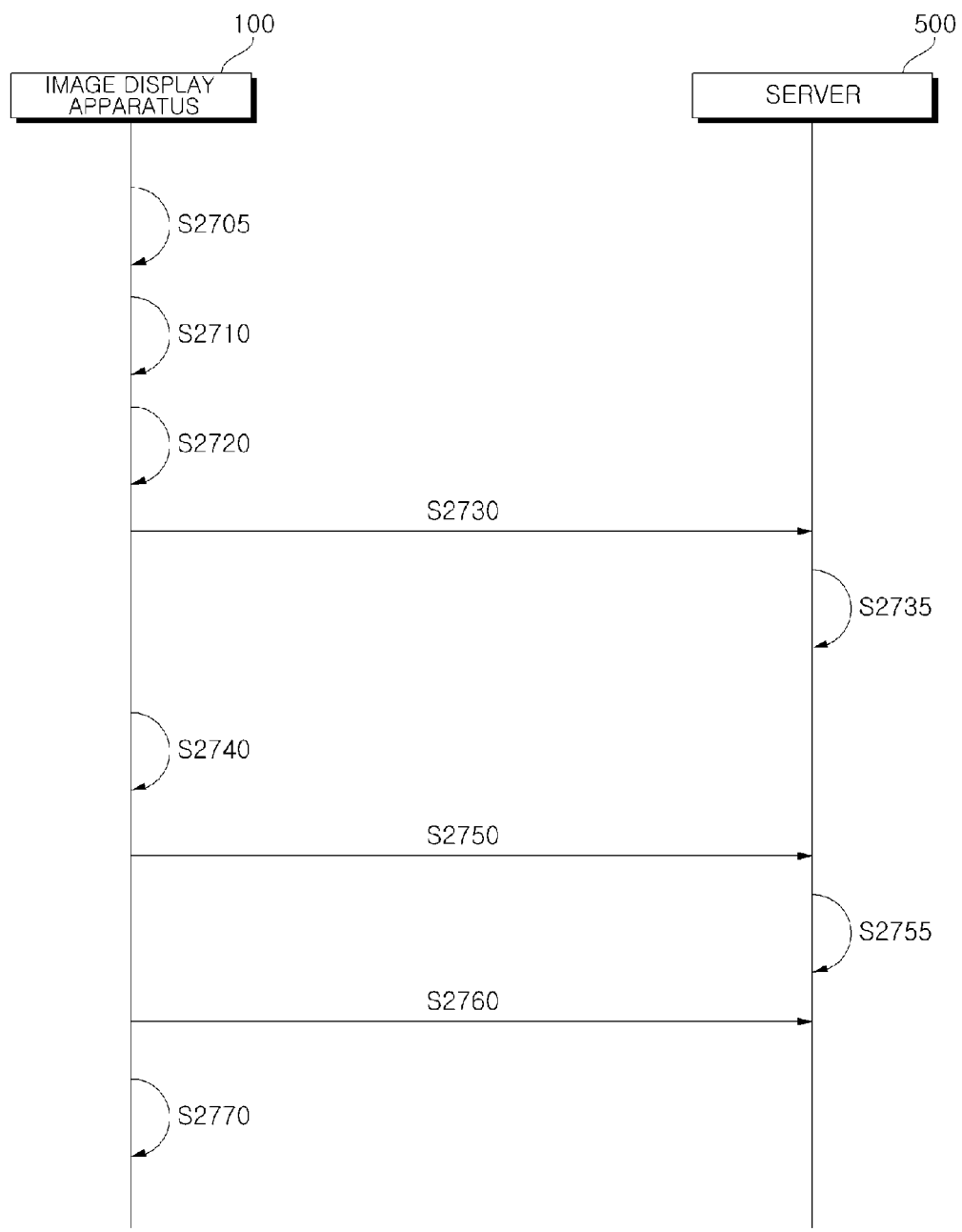
FIG. 27 is a diagram illustrating a signal flow for performing an operation between the image display apparatus and the server according to another embodiment of the present invention.

FIG. 25 is a flowchart illustrating a method for operating the image display apparatus according to another embodiment of the present invention, FIG. 26 is a flowchart illustrating a method for operating the server according to another embodiment of the present invention, FIG. 27 is a diagram illustrating a signal flow for performing an operation between the image display apparatus and the server according to another embodiment of the present invention, and FIGS. 28A to 28G are views referred to for describing the operation method illustrated in FIG. 25 or 26.

Steps S2505 to S2530 correspond to steps S1805 to S1830 of FIG. 18 and thus their description is not provided herein. Steps S2505 to S2530 also correspond to steps S2705 to S2730 of FIG. 27.

The server 500 extracts real-time broadcasting information based on a received image (S2635). Step S2635 may correspond to step S2735 of FIG. 27.

Specifically, the processor 720 of the server 500 may generate real-time viewer rating information using real-time broadcasting information received from each of a plurality of image display apparatuses. The real-time viewer rating information may include information about a channel share, the number of channel viewers, a program share of a specific channel, the number of viewers for the specific channel, etc. The real-time viewer rating information may further include real-time channel search information or real-time program search information.

The image display apparatus 100 receives a command requesting detailed information (S2540) and transmits the detailed information request command to the server 500 (S2550). Steps S2540 and S2550 correspond to steps S2740 and S2750 of FIG. 27.

The image display apparatus 100 may receive a user input being the detailed information request command, while it is displaying a broadcast program. For example, the detailed information request command may be received by input of a specific key of the remote controller 200. Detailed information may be about a background, persons, products, etc. appearing in a broadcast image.

In another example, the detailed information request command may be received by a user input, while an advertisement is being displayed after a broadcast program ends. For instance, the detailed information request command may be received by input of a specific key of the remote controller 200. Detailed information may refer to details of a product appearing in the advertisement.

Upon receipt of the detailed information request command, the controller 170 of the image display apparatus 100 may transmit the detailed information request command to the server 500 in order to display detailed information.

Then the server 500 receives the detailed information externally (S2655) and transmits the detailed information to the image display apparatus 100 (S2660). Steps S2655 corresponds to step S2755 of FIG. 27 and steps S2660 corresponds to step S2560 of FIG. 25 and step S2760 of FIG. 27.

Specifically, the processor 720 of the server 500 collects detailed information in response to the detailed information request command. Especially in the case of a real-time broadcast image, the server 500 may receive metadata regarding the detailed information from a broadcasting station server.

The processor 720 of the server 500 may control transmission of the received metadata to the image display apparatus 100.

The image display apparatus 100 displays the received detailed information (S2570). Step S2570 corresponds to step S2770 of FIG. 27.

The controller 170 of the image display apparatus 100 controls display of the received detailed information along with a broadcast image.

FIGS. 28A to 28G are views referred to for describing the method for operating the image display apparatus illustrated in FIG. 25.

Figure 28A:
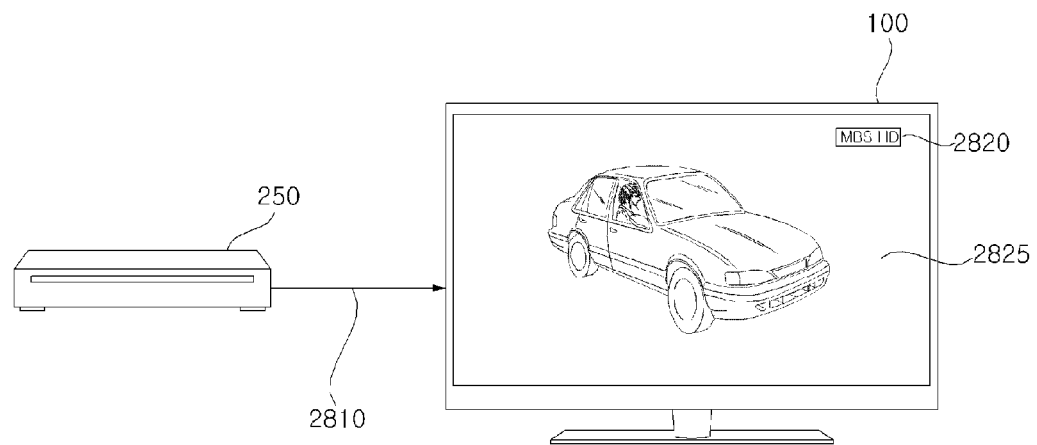
FIGS. 28A to 28G are views referred to for describing various examples of the method for operating the image display apparatus illustrated in FIG. 25 or the method for operating the server illustrated in FIG. 26.

FIG. 28A is an exemplary view illustrating transmission of a broadcast signal 2810 from the set-top box 250 to the image display apparatus 100.

The image display apparatus 100 may display a broadcast image 2825 corresponding to the received broadcast signal 2810 on the display 180.

Especially, the broadcast image 2825 may include broadcasting information 2820 such as channel name information 'MBS HD' at its corner.

As a broadcast program ends, only the channel name information is shown in the broadcast image in the illustrated case of FIG. 28A. That is, the broadcast image 2825 may be an advertisement image.

Figure 28B:
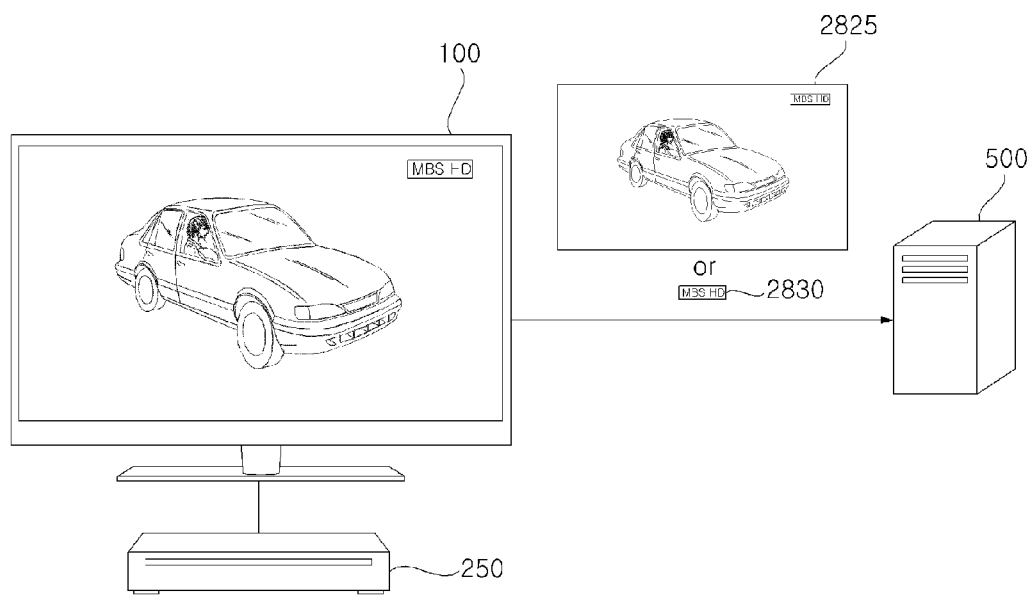

FIG. 28B is an exemplary view illustrating transmission of a channel name image 2030 or the broadcast image 2825 including the channel name from the image display apparatus 100 to the server 500.

While the broadcast image 2825 is a full broadcast image in FIG. 28B, the broadcast image 2825 may include only a broadcasting information part. That is, reference numeral 2030 denotes the image including broadcasting information.

Figure 28C:
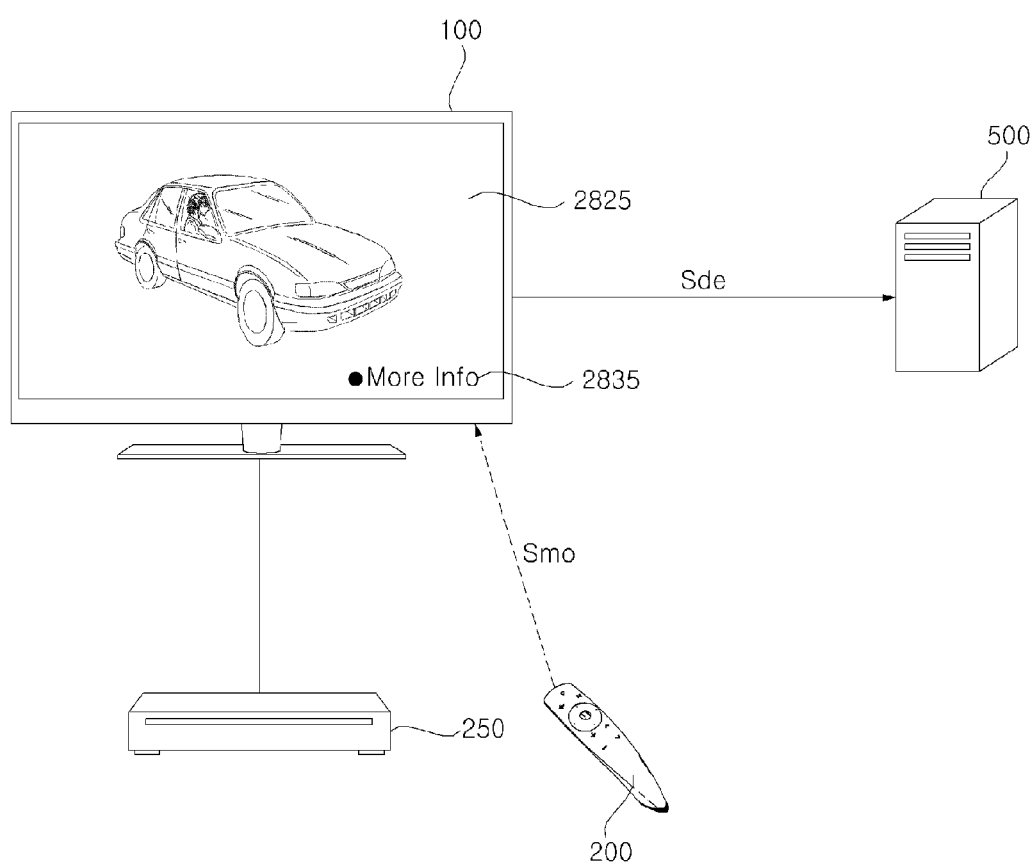

FIG. 28C is an exemplary view illustrating input of a detailed information request command Smo to the image display apparatus 100 by manipulation of a specific key in the remote controller 200. The image display apparatus 100 may display an object 2835 representing a detailed information request on the display 180.

In FIG. 28C, the image display apparatus 100 also transmits a detailed information request command Sde to the server 500, by way of example.

Figure 28D:
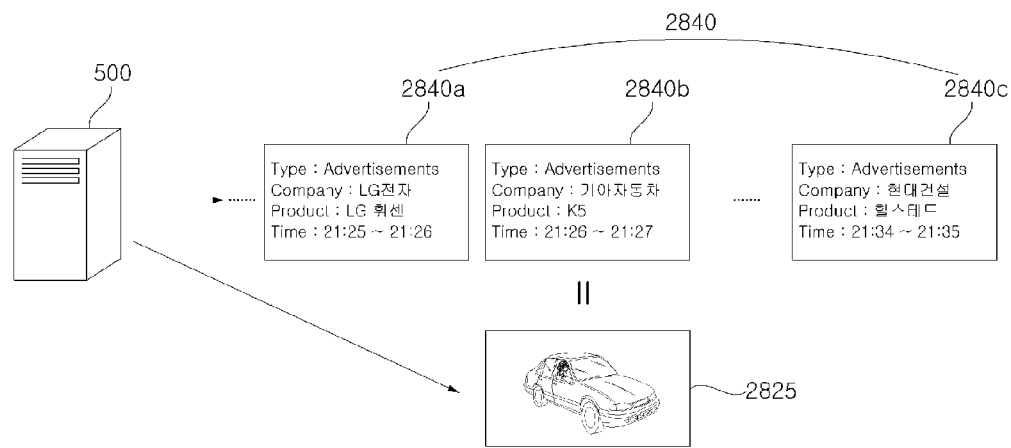

FIG. 28D is an exemplary view illustrating determining matching detailed information by comparing detailed information 2840 received through the network with the image 2825 received from the image display apparatus 100 at the server 500.

Because the server 500 determines a channel number for the image display apparatus 100 from the channel name image 2030 or the broadcast image 2825 including the channel name received from the image display apparatus 100, the server 500 may access a broadcasting station server related to the channel number, receive detailed information items 2840a, 2840b and 2840c from the broadcasting station server through the network, and store the detailed information items 2840a, 2840b and 2840c in the memory 740.

To be more specific, the server 500 may receive detailed information items about time-scheduled advertisements from the broadcasting station server and store the detailed information items in the memory 740.

The processor 720 of the server 500 compares the received image 2825 with the detailed information items 2840a, 2840b, and 2840c. If any of the detailed information items 2840a, 2840b, and 2840c matches to the image 2825, the processor 720 determines that the matching information item is detailed information about the image 2825.

In the illustrated case of FIG. 28D, the second detailed information item 2840b corresponds to the image 2825, by way of example.

Figure 28E:
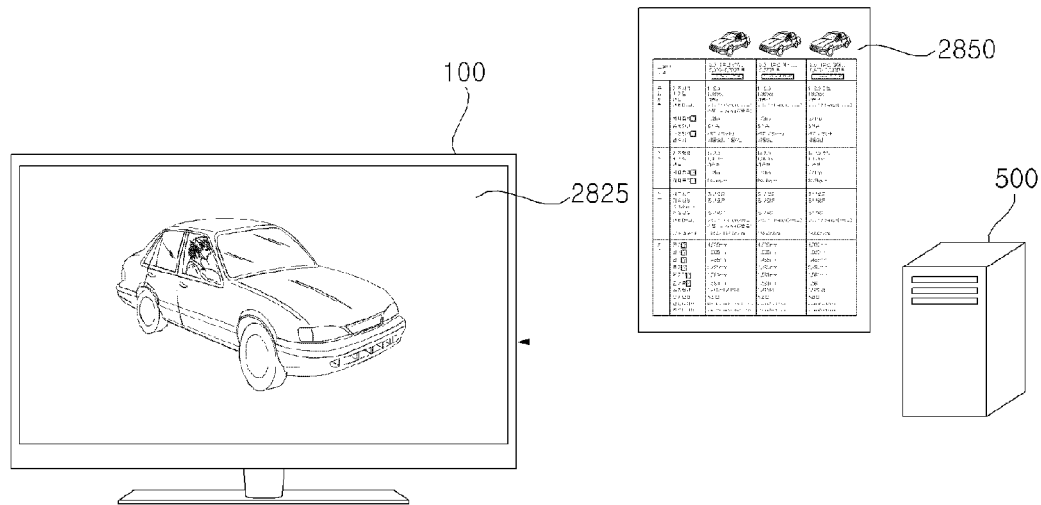

FIG. 28E is an exemplary view illustrating transmission of detailed information 2850 related to the second detailed information item from the server 500 to the image display apparatus 100.

The image display apparatus 100 may receive the detailed information 2850 from the server 500 through the network interface 135.

Figure 28F:
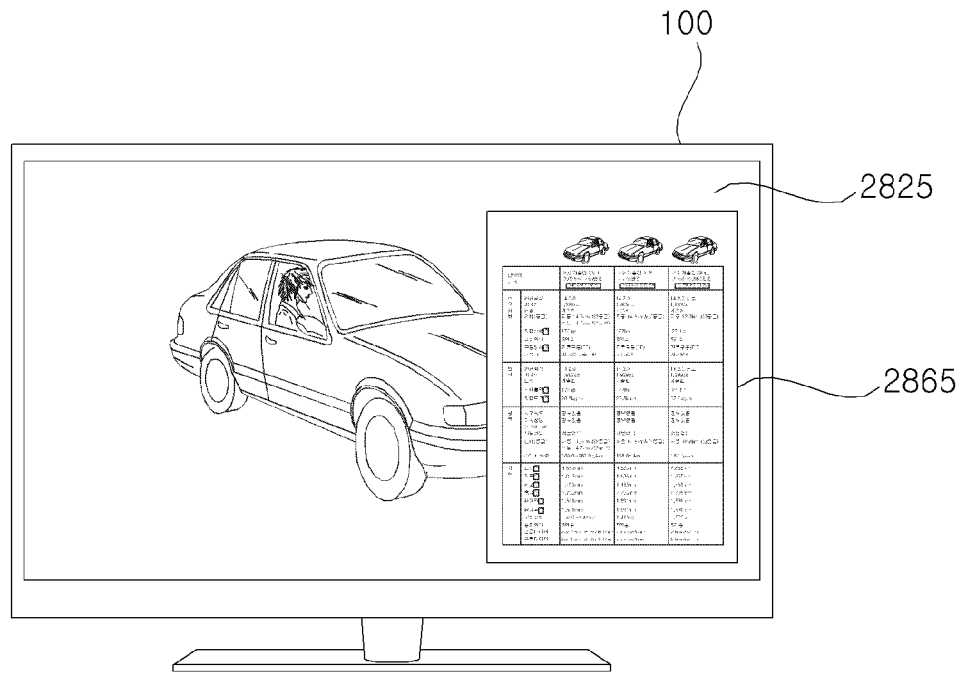

FIG. 28F is an exemplary view illustrating display of an object 2865 representing the detailed information along with a broadcast image 2060 in the image display apparatus 100.

The controller 170 of the image display apparatus 100 may generate the detailed information object 2865 using the detailed information 2850 received from the server 500 and may control display of the detailed information object 2865 on the display 180. Therefore, the user can readily view details of a broadcast image, while viewing the broadcast image.

Figure 28G:
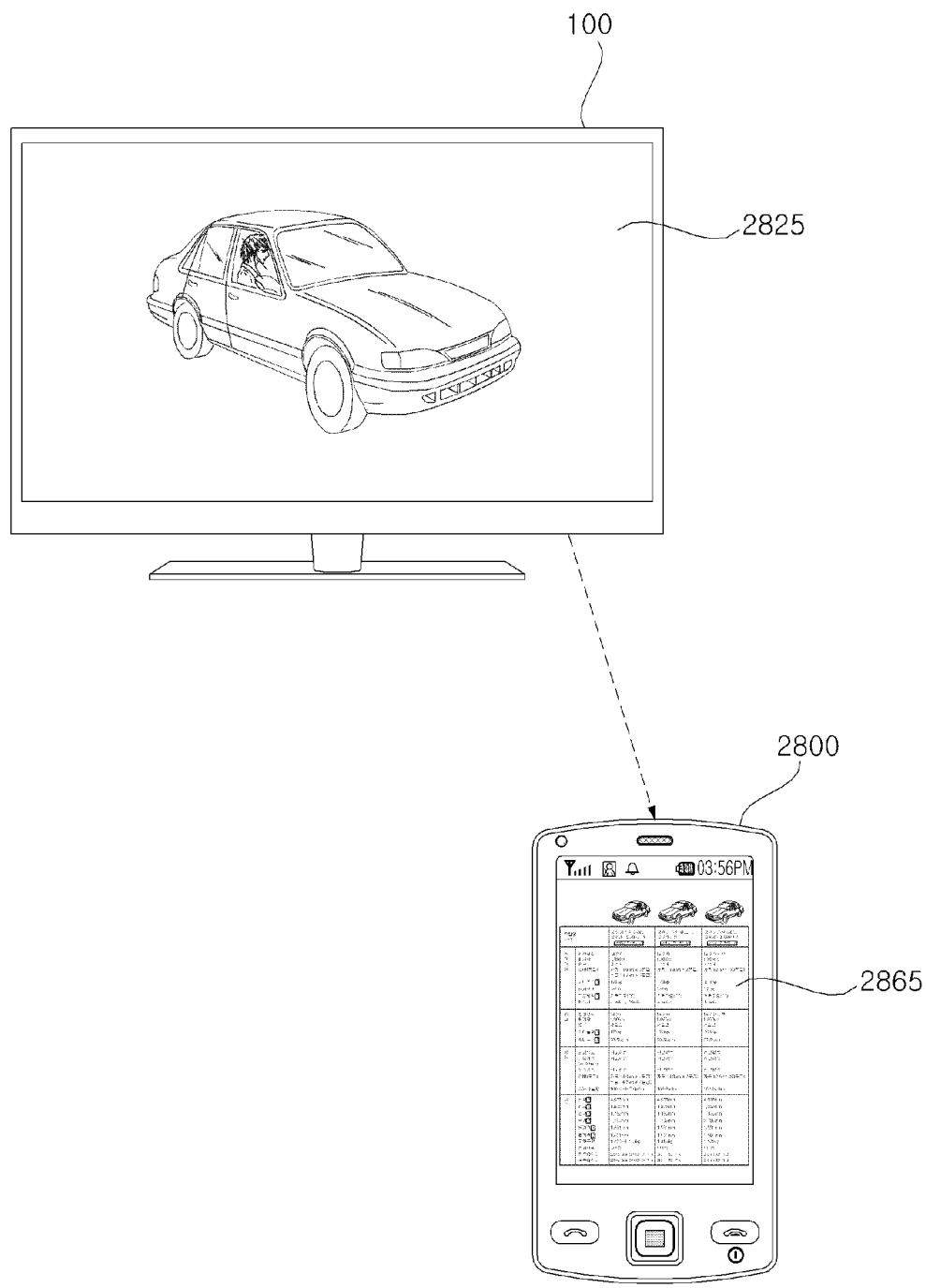

FIG. 28G is an exemplary view illustrating transmission of the detailed information received from the server to a nearby portable terminal 2800 by the image display apparatus 100 and display of the detailed information object 2865 on the display of the portable terminal 2800.

Since the broadcast image 2825 is displayed on the display 180 of the image display apparatus 100 and the detailed information object 2865 is displayed on the display of the portable terminal 2800, the user can obtain the details of the on-going broadcast image, while viewing the broadcast image without interruptions.

Figure 29:
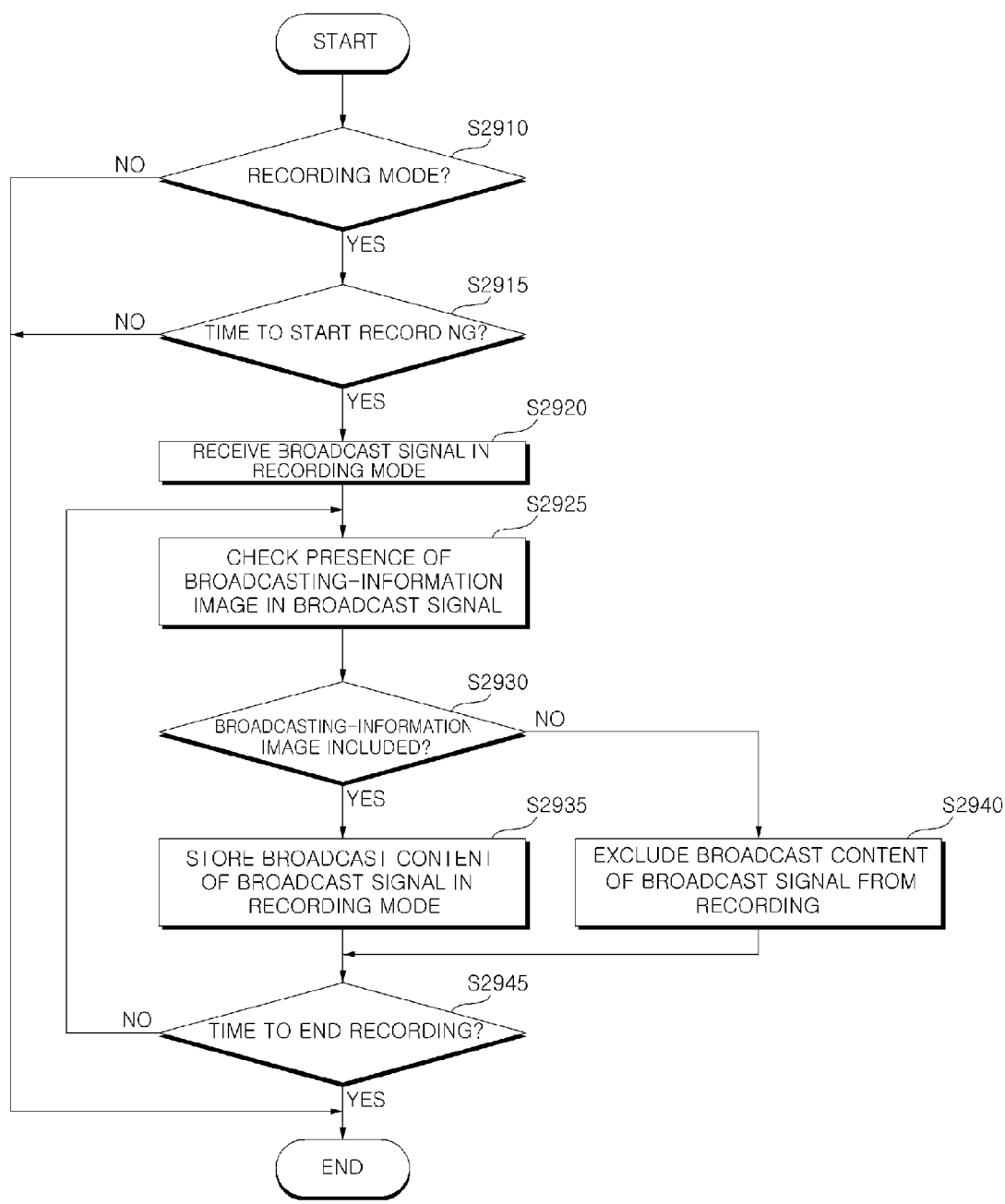
FIG. 29 is a flowchart illustrating a method for operating the image display apparatus according to another embodiment of the present invention.
Figure 30:
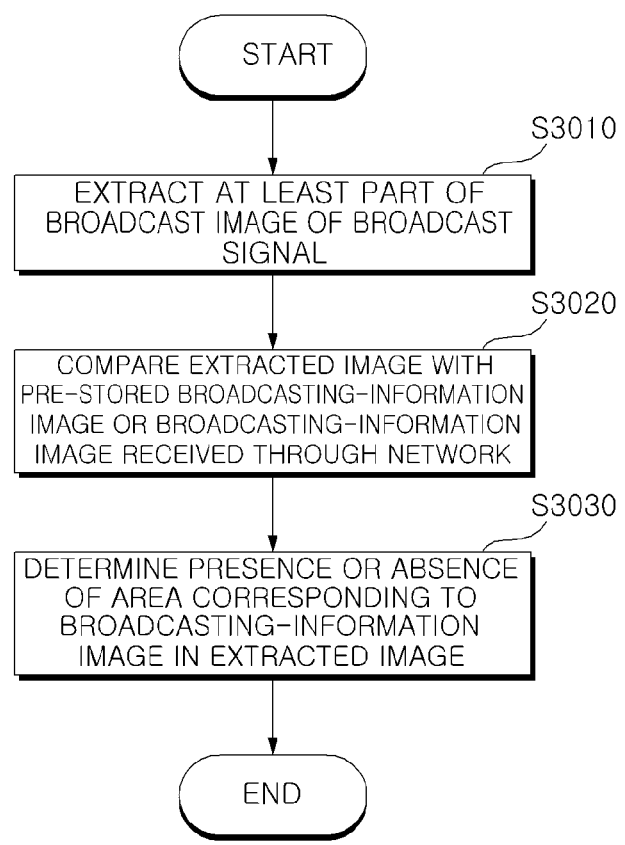
FIG. 30 is a flowchart illustrating a method for detecting an image including broadcasting information in the image display apparatus according to another embodiment of the present invention.

FIG. 29 is a flowchart illustrating a method for operating the image display apparatus according to another embodiment of the present invention, FIG. 30 is a flowchart illustrating a method for detecting an image including broadcasting information in the image display apparatus according to another embodiment of the present invention, and FIGS. 31A to 33B are views referred to for describing various examples of the operation method illustrated in FIG. 29.

The image display apparatus 100, particularly the controller 170 determines whether a recording mode has been set (S2910). The recording mode may be set in response to reception of a user input.

For example, when the user enters an input requesting display of a scheduled recording menu to schedule recording of a program, the controller 170 may control display of the scheduled recording menu on the display 180.

Figure 31A:
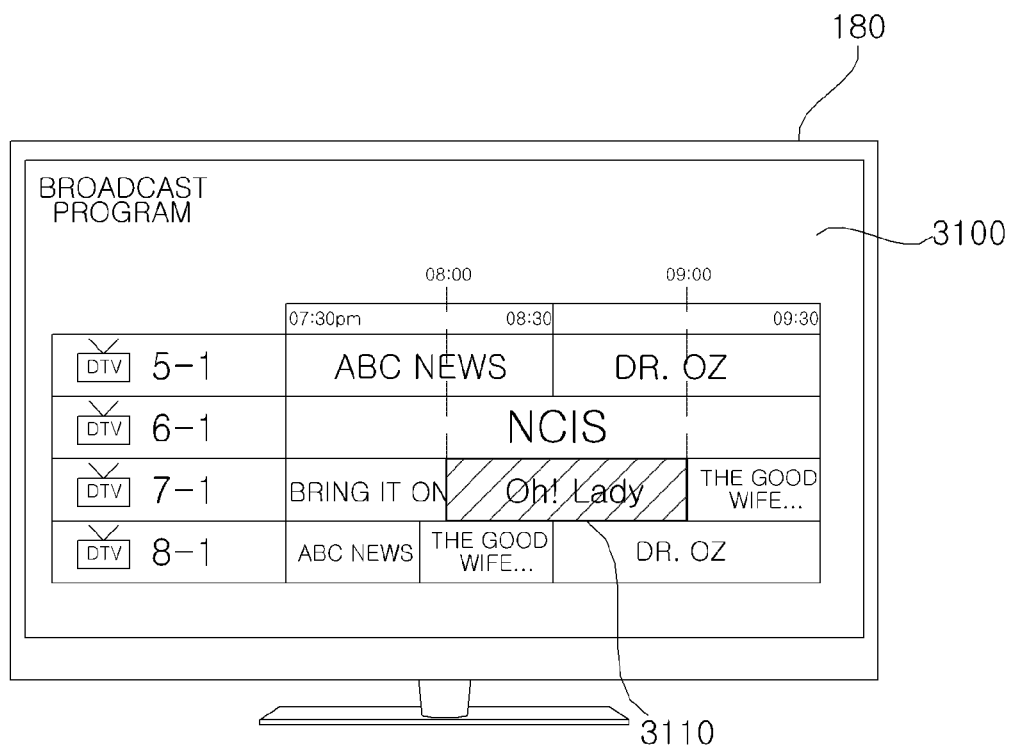
FIGS. 31A to 33B are views referred to for describing various examples of the method for operating the image display apparatus illustrated in FIG. 29.
Figure 31A:
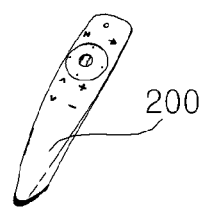

FIG. 31A is an exemplary view illustrating a user's selection of an intended program item 3110 on an EPG screen 3100 displayed on the display 180. As the user selects the program item 3110 on the EPG screen 3100, he or she can set the recording mode for the broadcast program.

While the remote controller 200 capable of displaying a pointer is shown in FIG. 31A, this is purely exemplary. Thus, the program item 3110 may be selected by manipulating a directional key of a general remote controller or a directional key given as a local key.

When the recording mode has been set in this manner, the image display apparatus 100, particularly the controller 170 determines whether it is time to record the program (S2915). If it is time to record the program, the controller 170 controls reception of a broadcast signal of the program according to the recording mode (S2920).

In FIG. 31A, in the case where the recording-scheduled program 3110 starts at 8:00 PM, the controller 170 determines whether it is time to record the program 3110. If it is time to record the program 3110, the controller 170 controls reception of a broadcast signal of the program 3110 in the recording mode.

For instance, if it is time to record the program 3110 while the user is viewing CH 6-1 through the image display apparatus 100, the controller 170 may control the broadcasting receiver 105 to receive a broadcast signal on CH 7-1 for which the recording mode has been set.

If the image display apparatus 100 is provided with a plurality of tuners, while a broadcast signal is being received on the current channel CH 6.1 through the first tuner, a broadcast signal is also received on CH 7-1 through the second tuner, starting from the recording time. Therefore, the image display apparatus 100 can continue displaying a broadcast image corresponding to the broadcast signal of CH 6-1 irrespective of the recording mode.

On the contrary, if the image display apparatus 100 has a single tuner, the tuner may switch from CH 6-1 to CH 7-1 to thereby receive a broadcast signal on CH 7-1. Therefore, when the recording time comes during displaying a broadcast image of CH 6-1, the image display apparatus 100 may start to display a broadcast image of CH 7-1.

When the image display apparatus 100 is powered off before the recording starts, the image display apparatus 100 may be powered on again and receive a broadcast signal of the recording-scheduled channel at the scheduled recording time.

Then the image display apparatus 100, particularly the controller 170 determines whether an image including broadcasting information is included in the broadcast signal (S2925). In the presence of a broadcasting information image (S2930), the image display apparatus 100 stores broadcast content corresponding to the broadcast signal in the recording mode (S2935). In the absence of a broadcasting information image (S2930), the image display apparatus 100 does not store the broadcast content corresponding to the broadcast signal in the recording mode (S2940).

In the case where the recording mode is set using the EPG information received in a broadcast signal as illustrated in FIG. 31A, an advertisement interposed between programs may also be recorded.

In FIG. 31A, while the EPG reveals that the program item 3110 'Oh! Lady' scheduled to be recorded starts on 8:00 PM and the previous program 'Bring It On' also ends on 8:00 PM, the recording-scheduled program 'Oh! Lady' may actually start at a different time, for example, at 8:05 or 8:10 PM. The starting time of a broadcast program may be changed under the circumstances of a broadcasting station.

In this context, an embodiment of the present invention provides a method for recording only an intended broadcast program without any advertisement.

For this purpose, the controller 170 determines whether a broadcasting information image exists in a received broadcast signal.

With reference to FIG. 30, a method for determining whether an image including broadcasting information exists in a broadcast signal will be described below.

Referring to FIG. 30, the controller 170 extracts a broadcast image of a channel for which the recording mode has been set in order to determine whether a broadcasting information image exists in the broadcast signal (S3010).

The controller 170 extracts a broadcast image of a recording-scheduled broadcast program. For example, the video processor 320 of FIG. 3 may extract an image on a frame basis from a decoded broadcast video.

Then the controller 170 compares the extracted broadcast image with a pre-stored broadcasting information image or a broadcasting information image received through the network (S3020) and determines whether an area corresponding to the broadcasting information image exists in the extracted broadcast image (S3030).

In the embodiment of the present invention, an image is classified as a program image or an advertisement image depending on whether the image includes a channel name (e.g. MBS, CBB, KBB, NCC, etc.) or a logo indicating the channel name.

To distinguish a program image from an advertisement image, the controller 170 compares the extracted broadcast image with broadcast information images stored in the memory 140 or broadcasting information images received through the network interface 135.

Broadcasting information images may be classified by broadcast channel in the memory 140. The broadcasting information images may be received from a specific server through the network interface 135 and then stored.

Meanwhile, to receive a broadcasting information image in real time from the server 500 through a network, the image display apparatus 100 may transmit recording-scheduled channel information and recording time information to the server 500.

The controller 170 determines whether an area corresponding to a broadcasting information image is present in the extracted broadcast image by checking whether there is an identical area between the extracted broadcast image and the pre-stored broadcasting information images or the broadcasting information images received through the network interface 135.

Subsequently, the controller 170 may extract a broadcast image of a channel received for scheduled recording in order to determine the absence or presence of a broadcasting information image in the broadcast signal. This operation corresponds to step S3010 of FIG. 30.

The controller 170 transmits the extracted broadcast image and receives information indicating whether the extracted broadcast image includes an area with a broadcasting information image from the server 500.

That is, unlike the operation illustrated in FIG. 30, the server 500 may determine whether the extracted broadcast image includes an image with a channel name (e.g. MBS, CBB, NCC, etc.) or a logo indicating the channel name. Thus, the server 500 transmits the information indicating whether the extracted broadcast image includes a broadcasting information image to the image display apparatus 100. The image display apparatus 100, particularly the controller 170 determines from the received information whether the broadcast signal includes a broadcasting information image.

The image display apparatus 100, particularly the controller 170 determines whether it is time to end the recording (S2945). If it is time to end the recording, the controller 170 discontinues storing the broadcast content. If the recoding still runs, the controller 170 repeats step S2925 to S2940 to continue the recording.

Figure 31B:
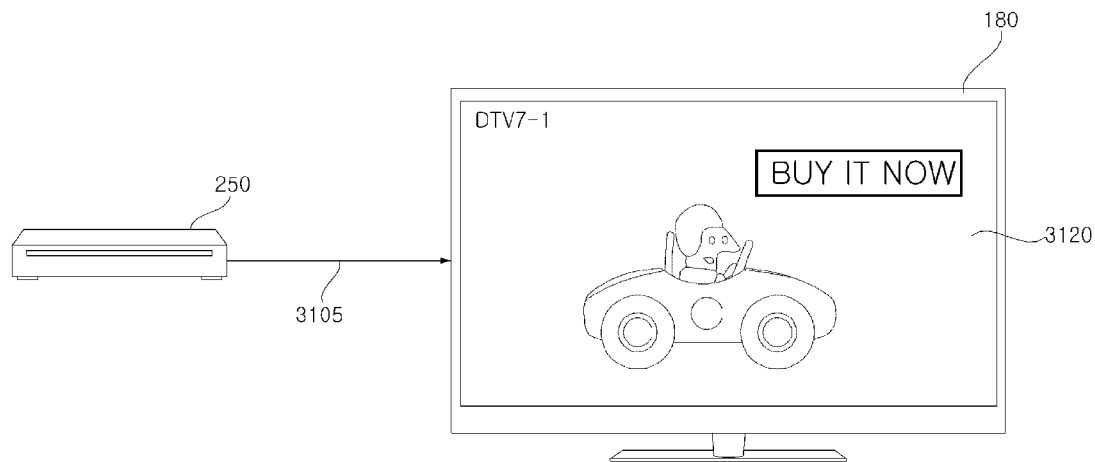

Referring to FIG. 31B, the image display apparatus 100 may receive a broadcast signal on CH 7-1 set to the recording mode through the set-top box 250 at a first time (T=t1), for example, at 8:00 PM after the recording time. An advertisement image 3120, not the broadcast program 'Oh! Lady' to be recorded, is displayed on the display 180, by way of example.

The controller 170 extracts an image from the advertisement image 3120 and determines whether the image is an image of the broadcast program or an advertisement image by comparing the extracted image with a pre-stored broadcasting information image or a broadcasting information image received through the network.

In FIG. 31B, while a channel number is shown, neither a channel name (e.g. MBS, CBB, KBB, NCC, etc.) nor a program name (e.g. Oh! Lady, ABC News, DR. OZ, etc.) is shown. Accordingly, the controller 170 does not store the image 3120 despite the recording time, determining that the image 3120 is an advertisement image through detection of such a logo as including a channel name.

Figure 31C:
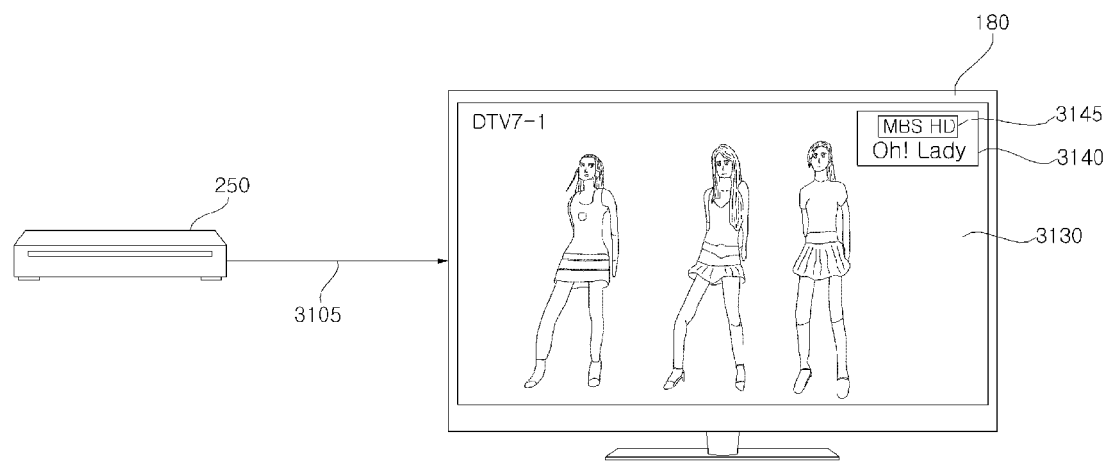

Referring to FIG. 31C, the image display apparatus 100 continues to receive a broadcast signal 3105 on CH 7-1 set to the recording mode through the set-top box 250 at a second time (T=t2), for example, at 8:05 PM. Not an advertisement image but a broadcast image 3130 of the broadcast program 'Oh! Lady' is displayed on the display 180, by way of example.

The controller 170 extracts an image from the broadcast program image 3130 and determines whether the image is a broadcast program image or an advertisement image by comparing the extracted image with a pre-stored broadcasting information image or a broadcasting information image received through the network.

In FIG. 31C, a channel number, a channel name 3145, MBS HD identifying a broadcast channel, and a broadcast program name 'Oh! Lady' are illustrated. Accordingly, the controller 170 stores the image 3130 in the memory 140, determining that the image 3130 is an image of the recording-scheduled broadcast program through detection of an image area 3140 including the channel name 3145.

Figure 31D:
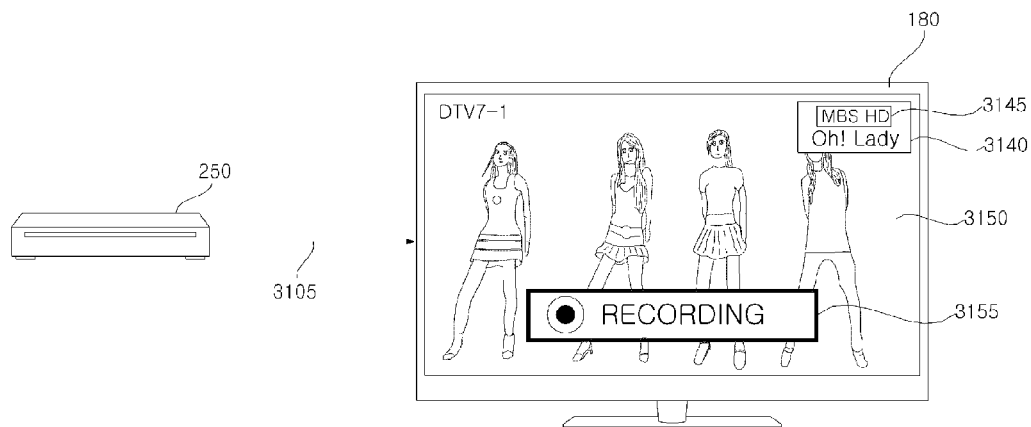

Referring to FIG. 31D, the image area 3140 including the channel name 3145 exists in a received broadcast image 3150 at a third time (T=t3), for example, at 8:10 PM. Therefore, the image display apparatus 100 continues to store the image 3150. For user convenience, an object 3155 indicating recording in progress may be displayed.

Figure 31E:
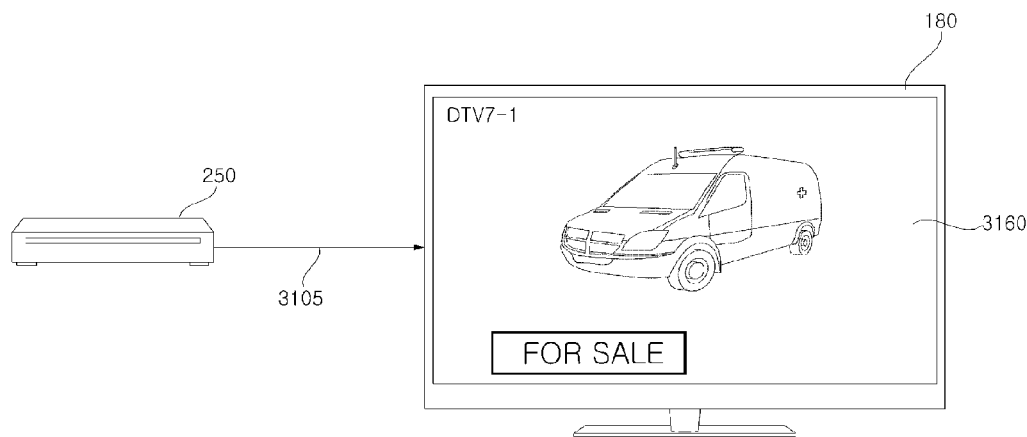

Referring to FIG. 31E, the channel name 3145 does not appear in a received broadcast image 3160 at a fourth time (T=t4), for example, at 8:30 PM. For example, if an advertisement is scheduled in the middle of the broadcast program, an intermediate advertisement image 3160 may be displayed as illustrated in FIG. 31E.

Because the channel name, MBS HD and the broadcast program name, Oh! Lady are not displayed, the controller 170 does not store the image 3160 in the memory 140 despite the recording time, determining that the image 3160 is an advertisement image.

Figure 31F:
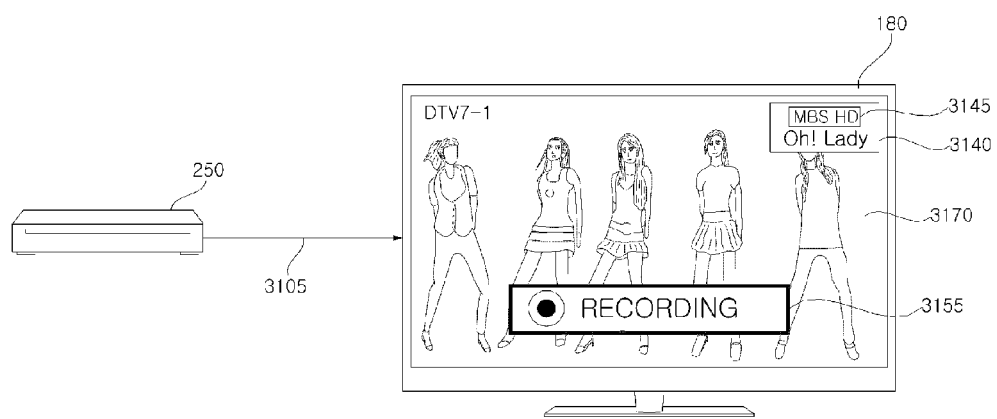

Referring to FIG. 31F, the image area 3140 including the channel name 3145 appears in a received broadcast image 3170 at a fifth time (T=t5), for example, at 8:35 PM. Thus the image display apparatus 100 resumes storing the image 3170 in the memory 140. For user convenience, the object 3155 indicating recording in progress may be displayed.

Figure 31G:
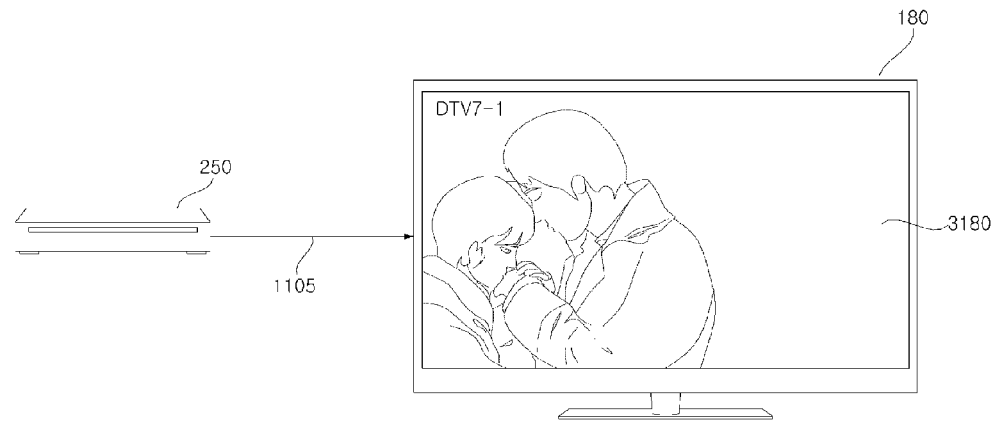

Referring to FIG. 31G, the channel name 3145 does not exist in a received broadcast image 3180 at a sixth time (T=t6) corresponding to the ending time of recording, for example, at 9:00 PM.

Because the channel name, MBS HD and the broadcast program name, Oh! Lady are not displayed, the controller 170 does not store the image 3180 in the memory 140 despite the recording time, determining that the image 3180 is an advertisement image.

As described above, when the recording mode is set, the image display apparatus determines whether a broadcasting information image exists in a broadcast signal. In the presence of the broadcasting information image, the image display apparatus stores broadcast content corresponding to the broadcast signal. As a result, user-intended broadcast content can be accurately recorded and thus user convenience can be increased.

If the step of determining the presence or absence of a broadcasting information image (S2925) is repeated, the controller 170 may monitor the existence of a broadcasting information image more frequently at a recording starting time or a recording ending time than at any other time point in the recording mode.

Since an advertisement image is usually received at the recording starting time, reception of a broadcasting information image is monitored around the recording starting time more frequently. Consequently, only images of a desired program can be recorded reliably.

An advertisement image is also received generally at the recording ending time and thus reception of a broadcasting information image is monitored around the recording ending time more frequently. Consequently, only images of a desired program can be recorded reliably.

While a broadcast image is received through the set-top box 250 in FIGS. 31A to 31G, this is purely exemplary. Thus, the image display apparatus 100 may receive a broadcast image through the broadcasting receiver 105, particularly the tuner unit 110.

Figure 32:
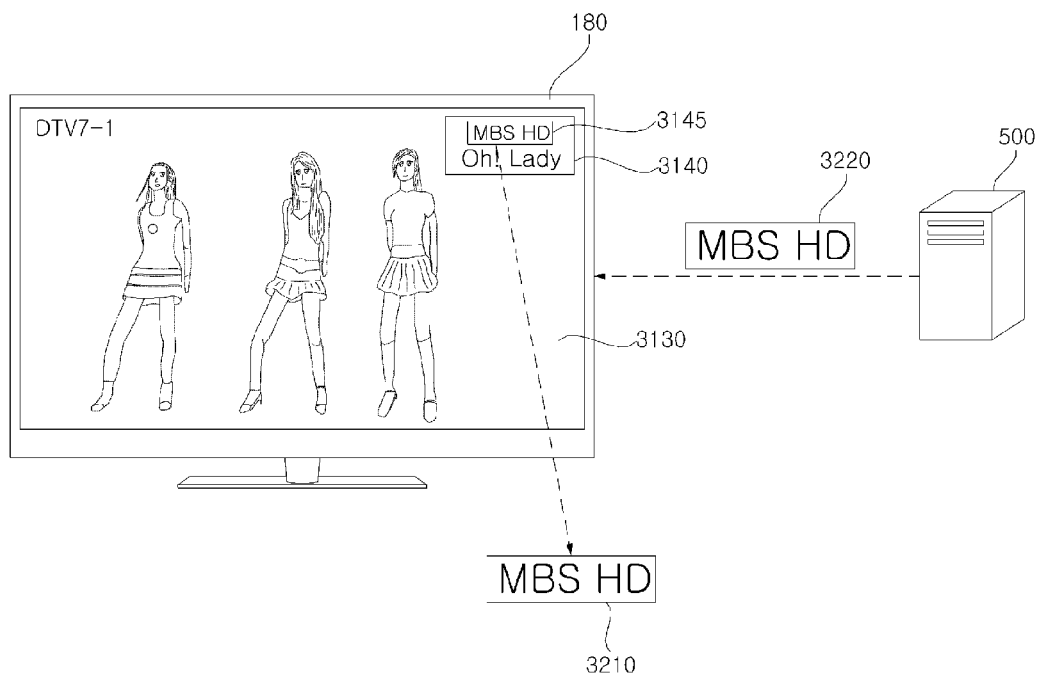

FIG. 32 is an exemplary view illustrating comparison between an extracted broadcast image with a pre-stored broadcasting information image or a broadcasting information image received through the network.

The controller 170 extracts an image from the broadcast image 3130 of the recording-scheduled channel, CH 7-1 in the recording mode. The extracted image may be a full video frame but it is the partial area 3140 of the video frame in FIG. 32, by way of example.

The partial area 3140 resides at the same position across a plurality of frames and thus the controller 170 may extract this area 3140. Then the controller 170 compares an image 3210 in the extracted area with a broadcasting information image 3220 received from the server 500 through the network. If the image 3210 in the extracted area is identical to the broadcasting information image 3220, the image display apparatus 100, particularly the controller 170 controls storage of broadcast content of the broadcast program. The memory 140 stores both the video and audio of the broadcast program.

Figure 33A:
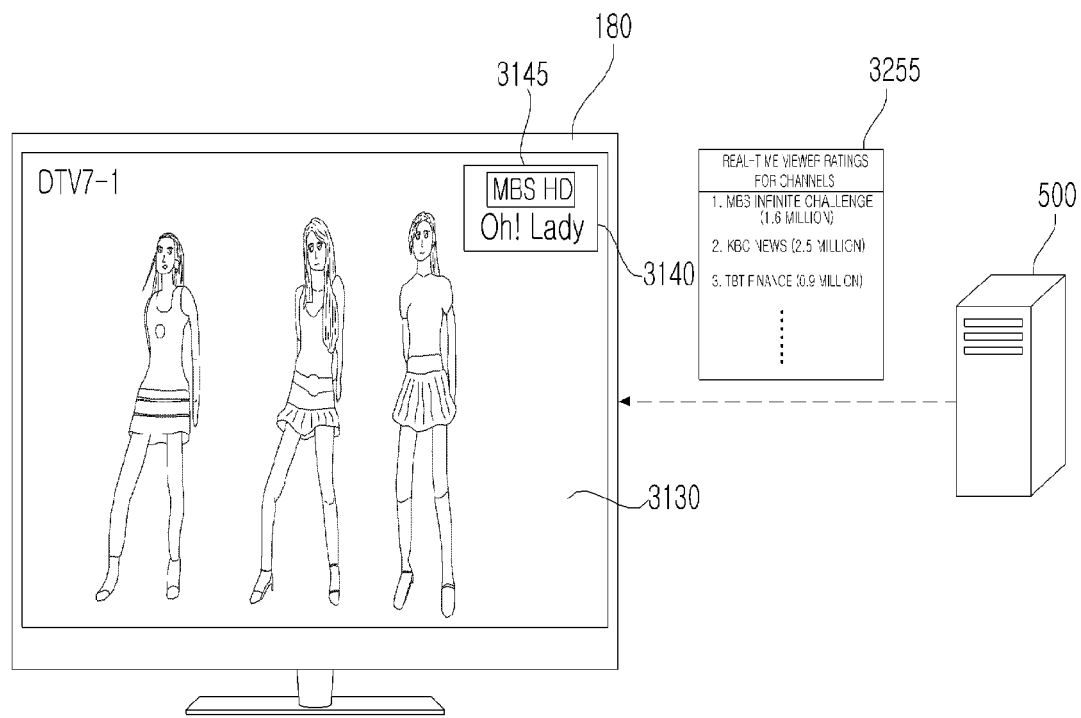

FIG. 33A is an exemplary view illustrating transmission of the real-time viewer rating information 3255 from the server 500 to the image display apparatus 100.

The image display apparatus 100 may receive the real-time viewer rating information 3255 from the server 500 through the network interface 135. As illustrated in FIG. 32, the network interface 135 may receive the broadcasting information image 3220 and the real-time viewer rating information 3255 together.

Meanwhile, the broadcasting program image 3130 is shown as including the image area 3140 with the channel name 3145 on the display 180, by way of example. Therefore, the memory 140 may store broadcast content of the broadcast program.

Figure 33B:
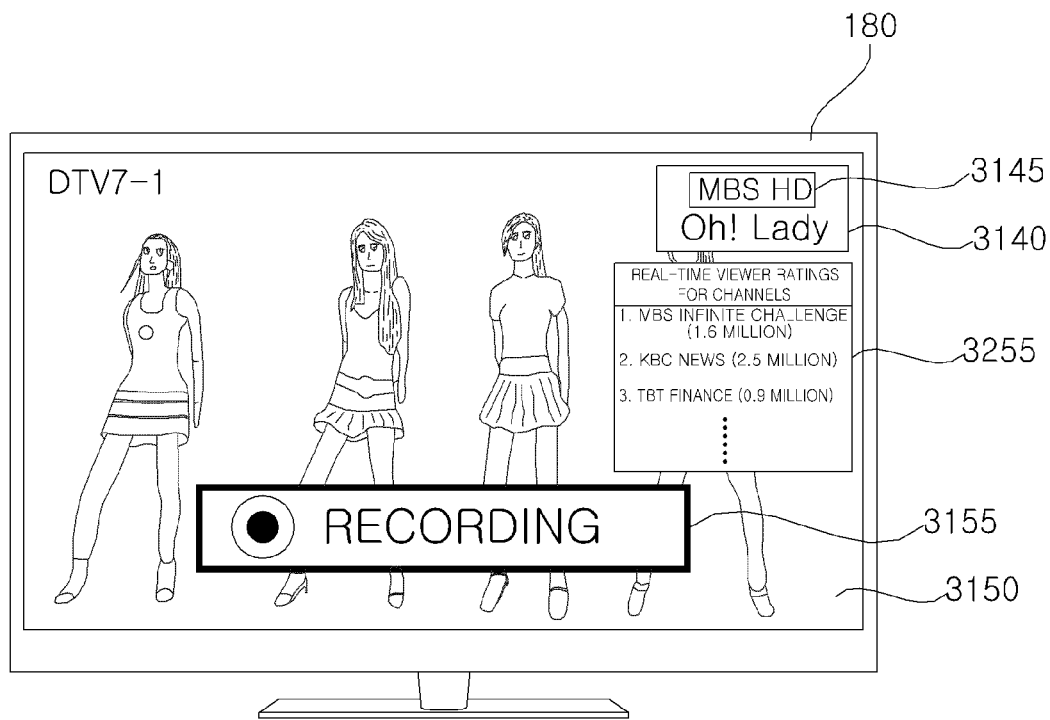

FIG. 33B is an exemplary view illustrating display of a real-time viewer rating information object 3255 along with a broadcast image 3150.

The controller 170 may control generation of the real-time viewer rating information object 3255 using real-time viewer rating information received from the server 500 and control display of the real-time viewer rating information object 3255 on the display 180.

Because the broadcast program image 3150 includes the image area 3140 with the channel name 3145, the memory 140 continues to store the broadcast content of the broadcast program. For user convenience, the object 3155 indicating recording in progress may be displayed.

Figure 34:
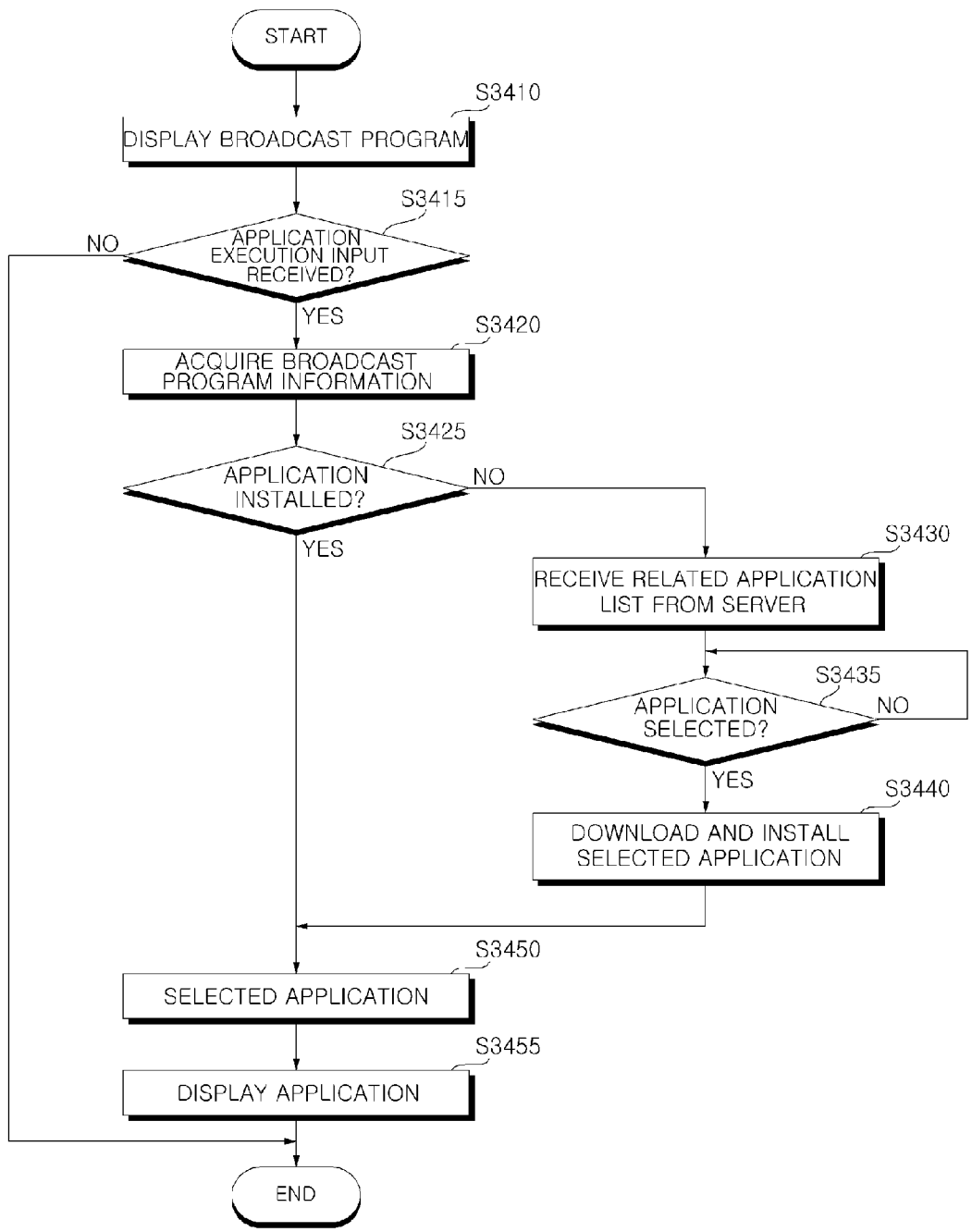
FIG. 34 is a flowchart illustrating a method for operating the image display apparatus according to another embodiment of the present invention.
Figure 35:
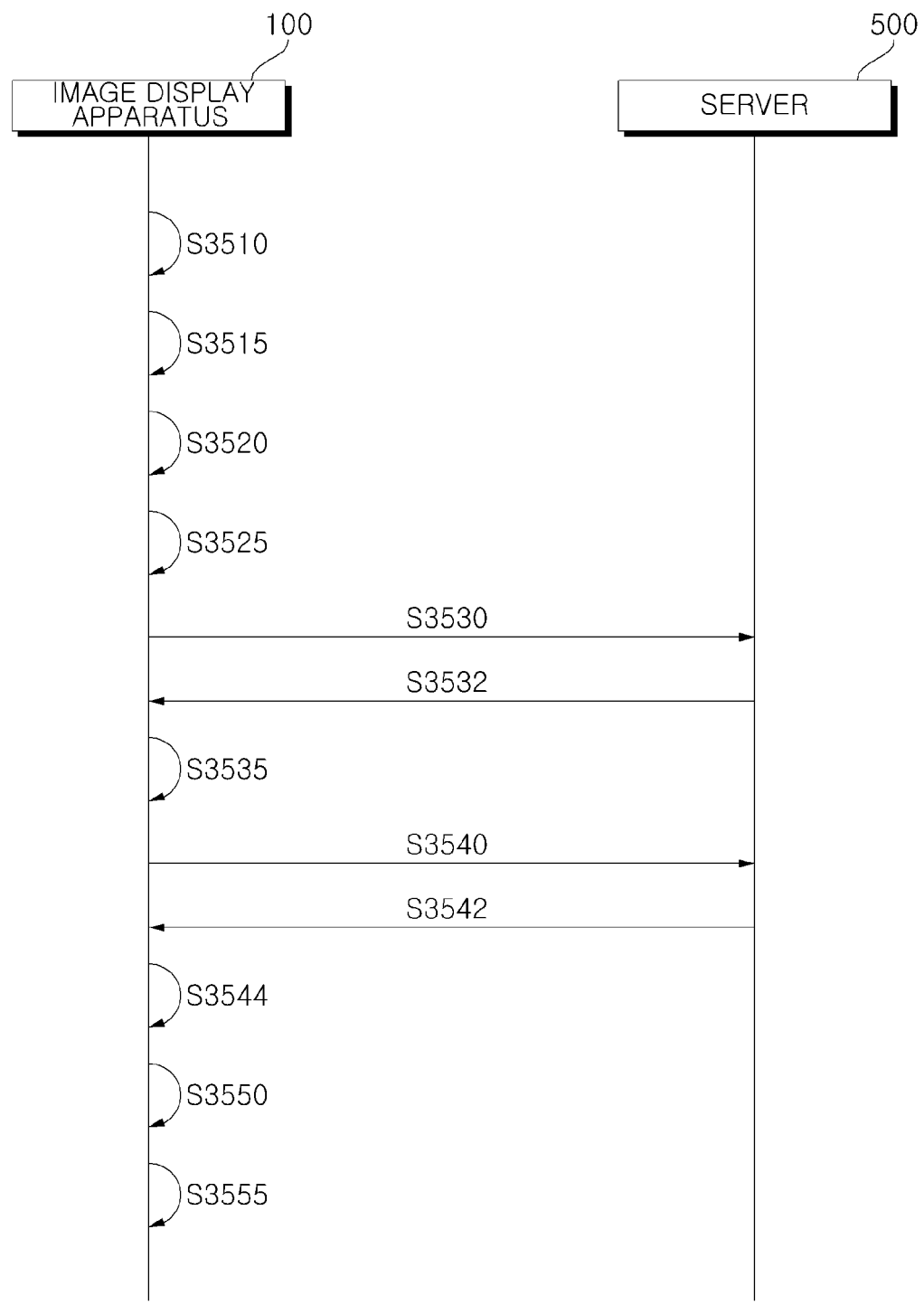
FIG. 35 is a diagram illustrating a signal flow for performing an operation between the image display apparatus and the server according to another embodiment of the present invention.

FIG. 34 is a flowchart illustrating a method for operating the image display apparatus according to another embodiment of the present invention, FIG. 35 is a diagram illustrating a signal flow for performing an operation between the image display apparatus and the server according to another embodiment of the present invention, and FIGS. 36A to 37E are views referred to for describing the method for operating the image display apparatus illustrated in FIG. 34.

The image display apparatus 100 displays a broadcast program (S3410). Step S3410 corresponds to step S3510 of FIG. 35.

The image display apparatus 100 may receive a broadcast signal through the tuner unit 110, the network interface 135, or the external device interface 130 illustrated in FIG. 2.

A broadcast signal from the tuner unit 110, which is received through the antenna, may be a terrestrial broadcast signal. Especially in the case of terrestrial digital broadcasting, the broadcast signal may include EPG information. The received broadcast signal is processed in the controller 170 and the processed video of a broadcast program corresponding to the broadcast signal may be displayed on the display 180.

Figure 36A:
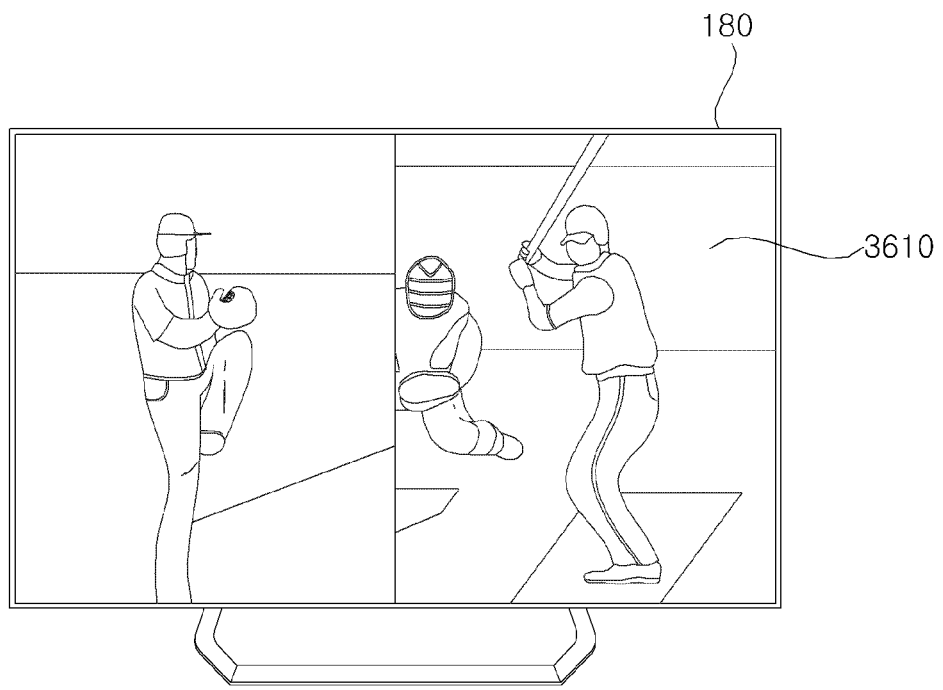
FIGS. 36A to 37E are views referred to for describing various examples of the method for operating the image display apparatus illustrated in FIG. 34.

FIG. 36A is an exemplary view illustrating display of a specific broadcast program image 3610, specifically an image of a baseball program on the display 180.

A broadcast signal from the network interface 135 or the external device interface 130 may be received through the set-top box 250, as illustrated in FIG. 1. The received broadcast signal is processed in the controller 170 and the processed video of a broadcast program corresponding to the broadcast signal may be displayed on the display 180.

The controller 170 of the image display apparatus 100 determines whether an application execution input has been received (S3145). Upon receipt of the application execution input, the controller 170 acquires broadcast program information (S3420). Steps S3415 and S3420 correspond to steps S3515 and S3520.

The controller 170 may determine whether the application execution input has been received by an input of a local key or an input from the remote controller 200.

Figure 36B:
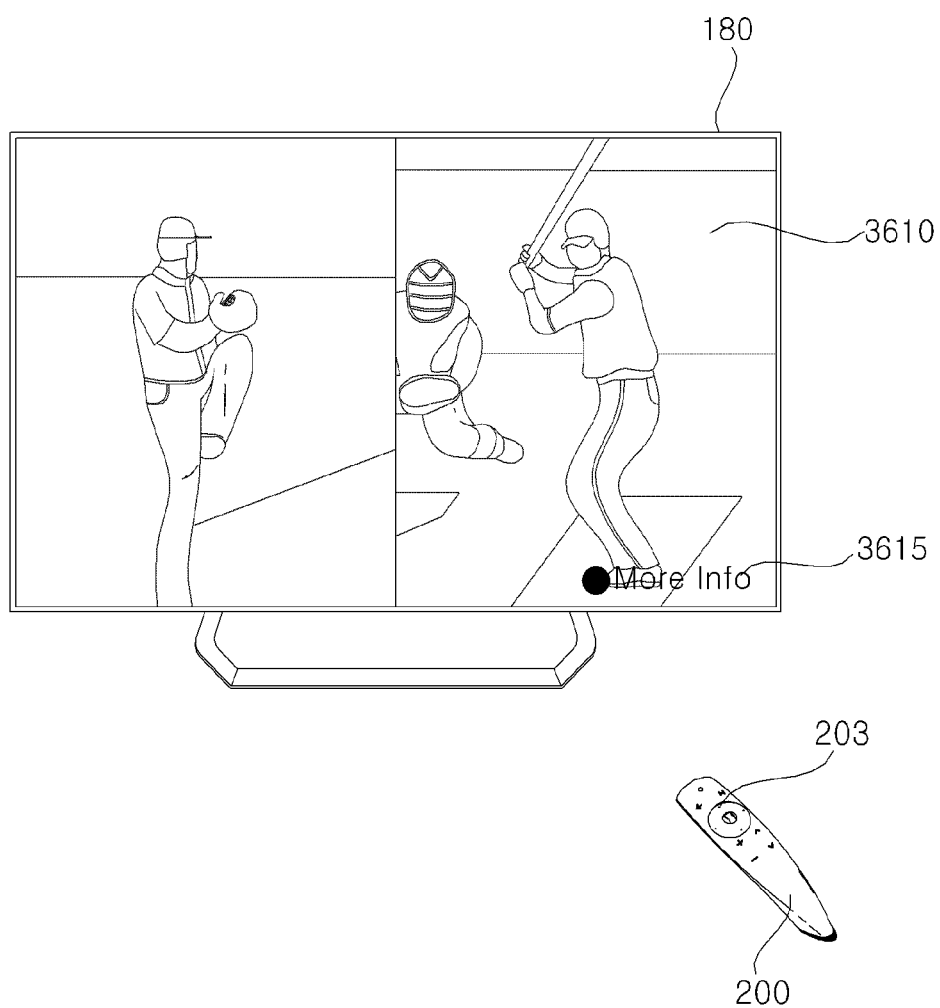

FIG. 36B is an exemplary view illustrating manipulation of a specific key 203 in the remote controller 200. The controller 170 may determine that the application execution input has been received for the on-going broadcast program 3610 in response to the input of the specific key 203 of the remote controller 200.

The controller 170 may control display of an object indicating the application execution input. For example, an object 3615 "More Info" is displayed in FIG. 36B.

The controller 170 acquires information about the on-going broadcast program before executing an application corresponding to the broadcast program in response to the application execution input. Specifically, the controller 170 may acquire information about the channel name, program name, etc. of the on-going broadcast program.

If the received broadcast signal is a terrestrial digital broadcast signal received through the antenna, the broadcast signal includes EPG information and thus the controller 170 may acquire channel name information and program name information from the EPG information.

Figure 36C:
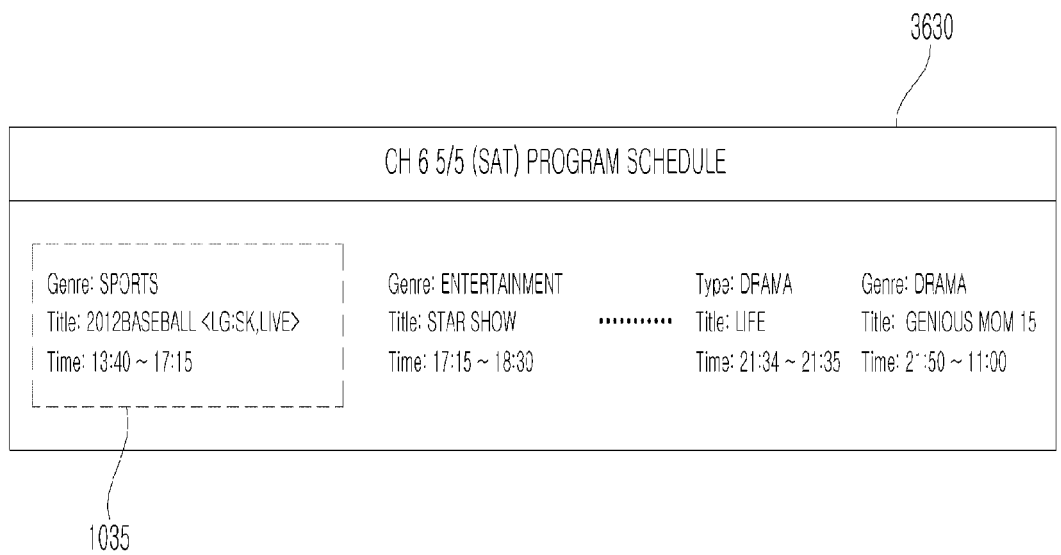

FIG. 36C is an exemplary view illustrating EPG information 3630 about an on-going channel CH6. The EPG information 3630 provides program information 1035 that specifies the genre, program name, and playing time of the on-going broadcast program.

If the received broadcast signal does not include EPG information, for example, the received broadcast signal is an analog signal received through the antenna or a broadcast signal received through the set-top box 250, the controller 170 may detect a logo image from a received broadcast image and acquire program information from the detected logo image. Especially, the controller 170 may transmit the detected logo image to the server 500 and then receive program information such as the name of the broadcast program from the server 500. Subsequently, the controller 170 determines whether the application related to the broadcast program has been installed (S3425). If the application has not been installed, steps S3430, S3435 and S3440 are performed. On the other hand, if the application has been installed, steps S3450 and S3455 are performed immediately.

Steps S3425, S3450, and S3455 correspond to steps S3525, S3550, and S3555 of FIG. 35.

The controller 170 of the image display apparatus 100 determines whether the application related to the broadcast program has been installed. For example, the controller 170 determines whether the application related to the broadcast program has been installed by searching a list of installed applications.

If the application related to the broadcast program has been installed, the controller 170 controls immediate execution of the application and display of the executed application on the display 180.

Figure 36D:
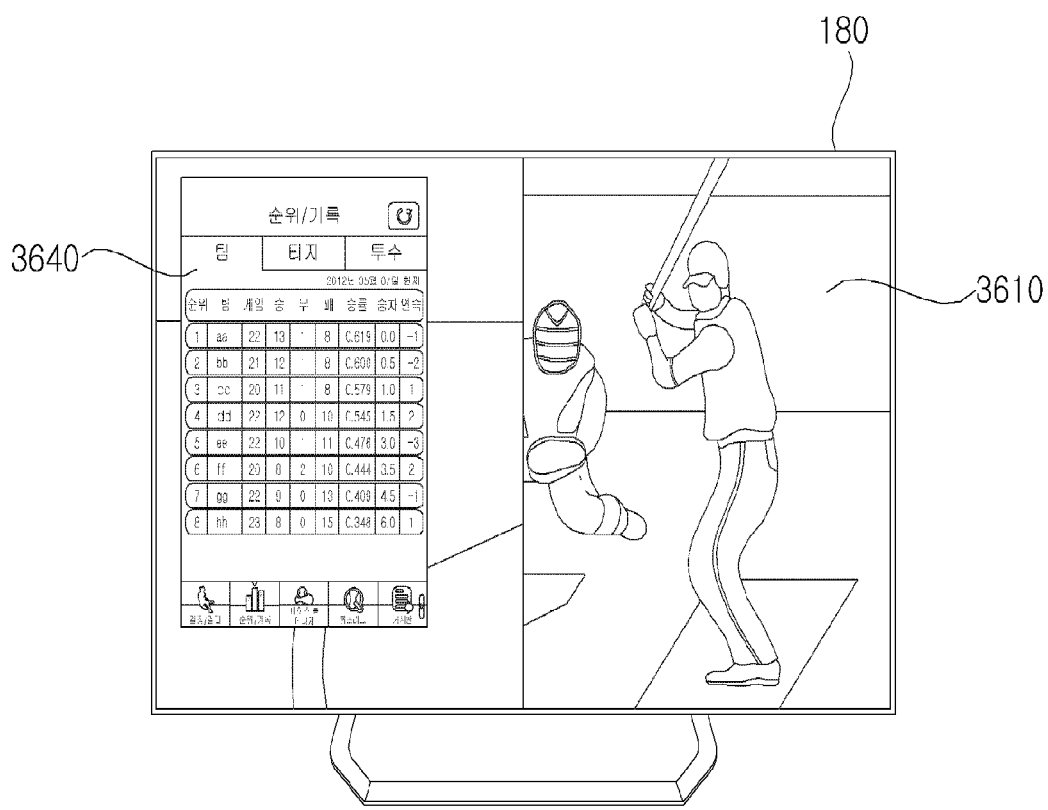

FIG. 36D is an exemplary view illustrating execution and display of an application 3640 regarding the baseball program image 3610 that the user is viewing. Especially, the baseball program image 3610 and the application 3640 are displayed together.

As illustrated in FIG. 36D, the application 3640 may provide the rankings of teams, hitters, and pitchers, etc. The application 3640 may also include a schedule/result item, a bulletin board item, etc. Therefore, the user can readily view intended additional information.

Meanwhile, applications may be installed and executed on a broadcast program basis. In addition, each application may include different contents according to program characteristics.

If the application has not been installed, steps S3430, S3435, and S3440 are performed.

That is, the image display apparatus 100 accesses the server 500 and receives an application list from the server 500 (S3430). Upon selection of a specific application item from the list (S3435), the image display apparatus 100 downloads and installs the selected application (S3440).

Steps S3430, S3435 and S3440 will be described in greater detail with reference to FIG. 35. The image display apparatus 100 accesses the server 500 through the network interface 135 and transmits information about the name of the program that the user is viewing to the server 500 (S3530). Then the image display apparatus 100 receives an application list related to the broadcast program from the server 500 (S3532).

Figure 37A:
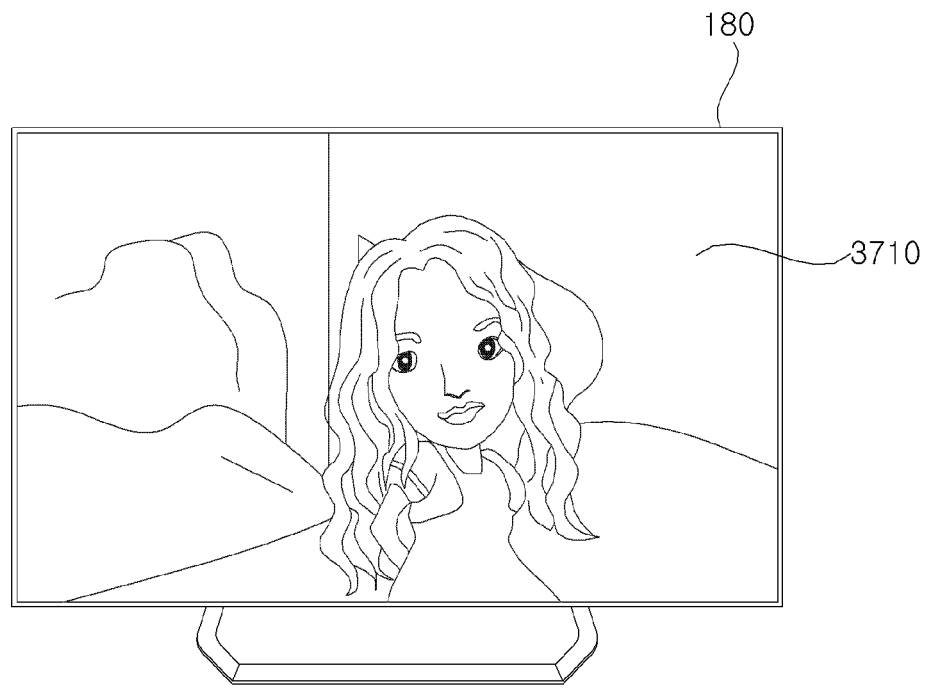
Figure 37B:
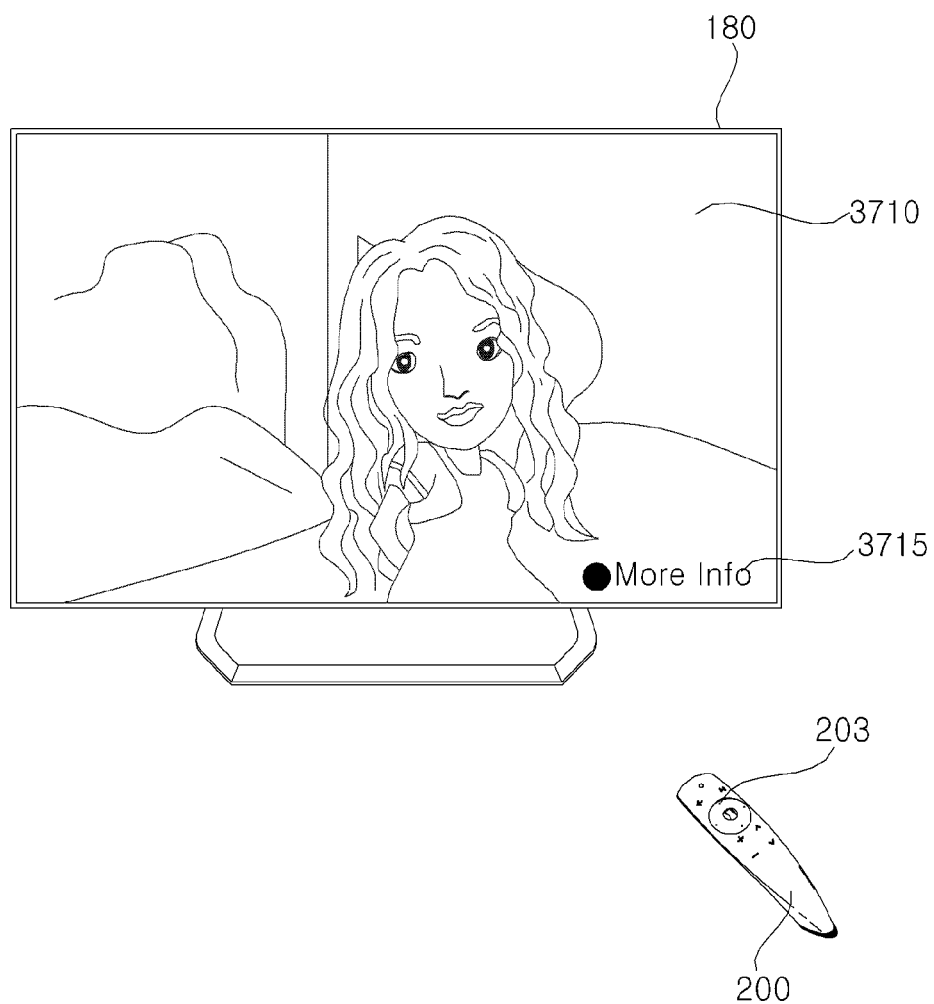
Figure 37C:
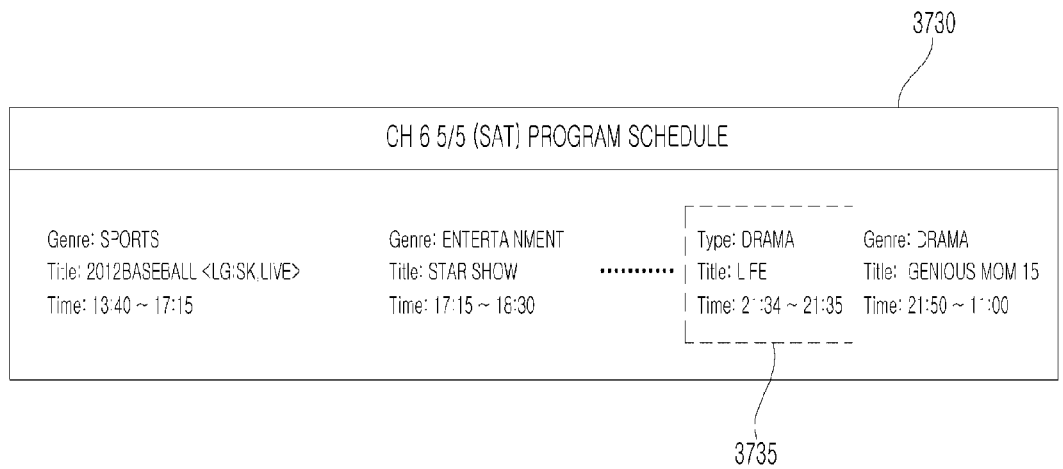

FIGS. 37A, 37B and 37C correspond to FIGS. 36A, 36B and 36C. That is, FIG. 37A illustrates display of a specific broadcast program image 3710, FIG. 37B illustrates receipt of an application execution input by input of the specific key 203 in the remote controller 200, and FIG. 37C illustrates program information 3735 included in an EPG 3730.

Figure 37D:
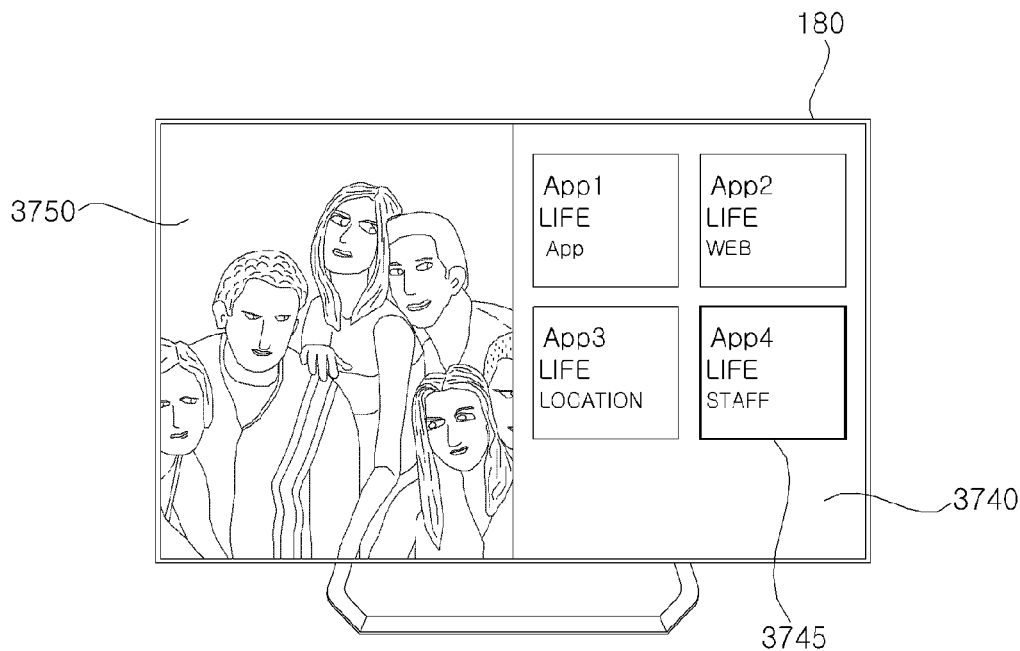

FIG. 37D is an exemplary view illustrating display of an application list 3740 related to the broadcast program, received from the server 500 on the display 180.

The application list 3740 related to the broadcast program may include a plurality of application items. In FIG. 37D, four applications are shown. The application list 3740 may be displayed along with a representative image 3750 of the on-going broadcast program. Obviously, the representative image 3750 may also be received from the server 500.

The controller 170 of the image display apparatus 100 may receive an input that selects one of the plurality of application items in the list from a local key or the remote controller 200 (S3535). The controller 170 of the image display apparatus 100 accesses the server 500 and requests download of the selected application to the server 500 (S3540). The image display apparatus 100 downloads the selected application from the server 500 (S3542) and installs the downloaded application (S3544). Then the afore-described steps S3450 and S3455 are performed.

Figure 37E:
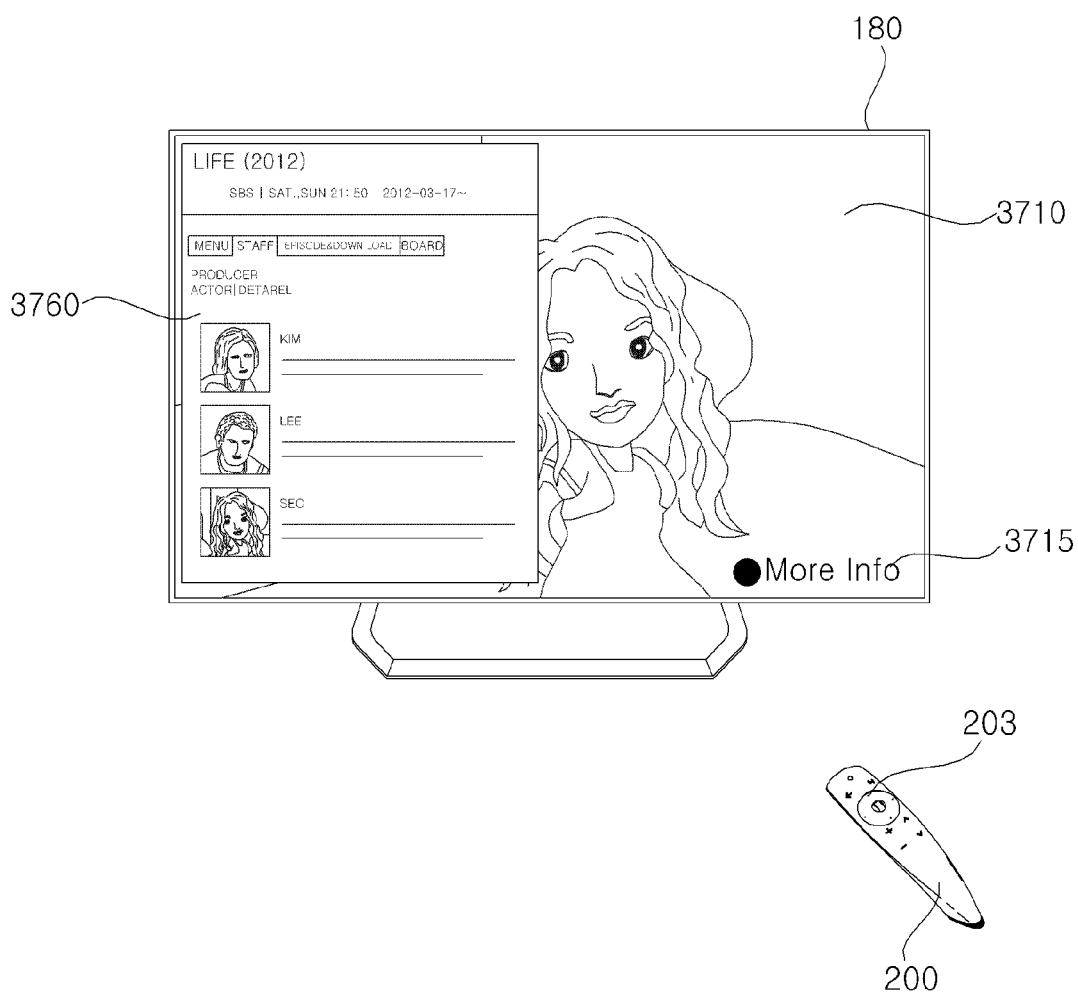

Upon selection of an application item 3745 from the list 3140 illustrated in FIG. 37D, an application 3760 corresponding to the selected application item 3745 may be installed and displayed as illustrated in FIG. 37E. Therefore, the user can view additional information about the broadcast program easily.

Figure 38:
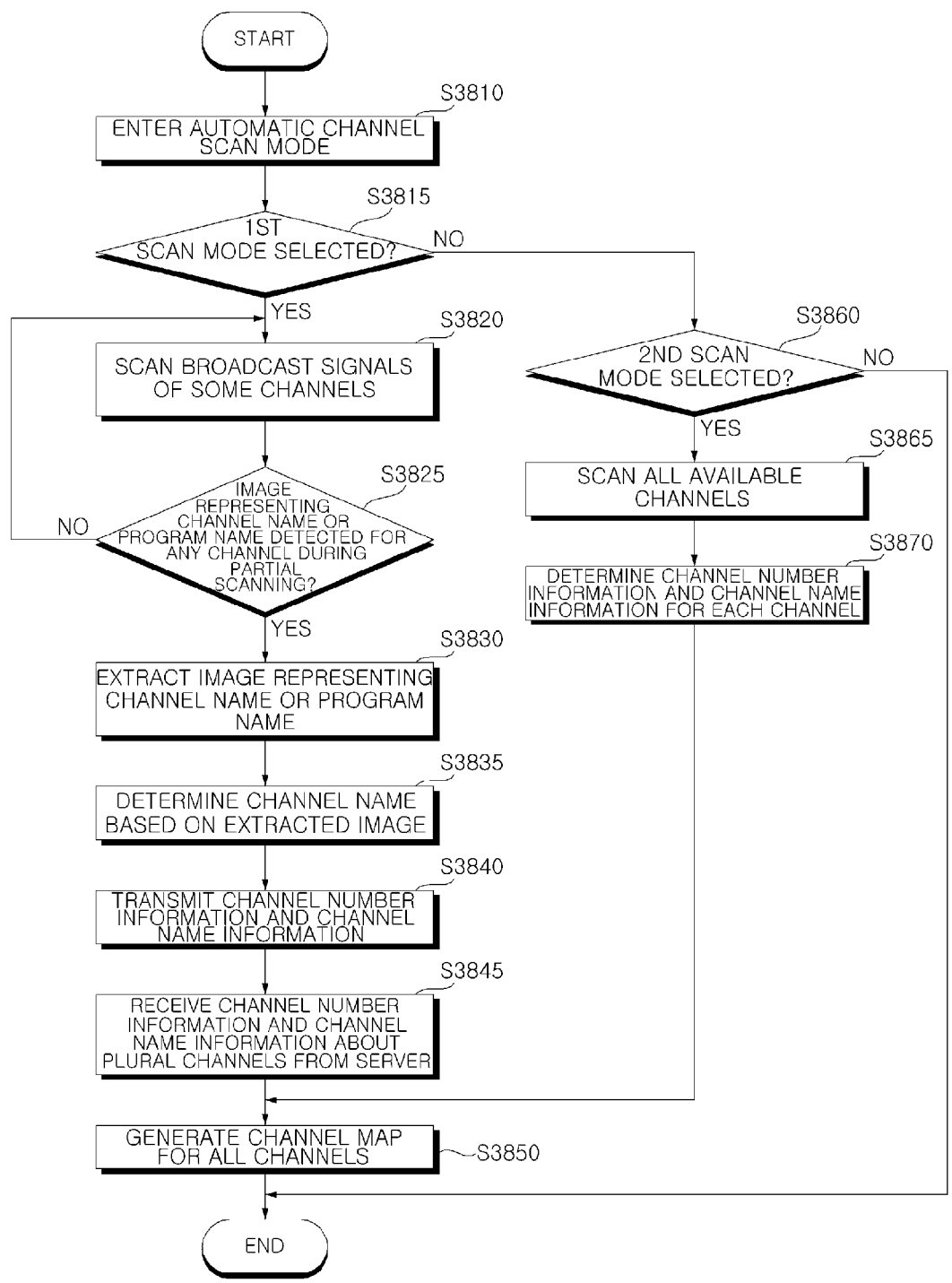
FIG. 38 is a flowchart illustrating a method for operating the image display apparatus according to a further embodiment of the present invention.

FIG. 38 is a flowchart illustrating a method for operating the image display apparatus according to a further embodiment of the present invention, and FIGS. 39A to 40C are views referred to for describing various examples of the method for operating the image display apparatus illustrated in FIG. 38.

The image display apparatus 100 enters the automatic channel scan mode (S3810). While a menu screen is being displayed, the automatic channel scan mode may be selected by input of a local key of the image display apparatus 100 or input of a specific key of the remote controller 200. When the automatic channel scan mode is selected, the controller 170 may enter the automatic channel scan mode.

In accordance with an embodiment of the present invention, the automatic channel scan mode may be classified into fast mode and normal mode. In the fast mode, a channel search is fast completed by scanning only some channels, whereas in the normal mode, total channels are scanned.

Figure 40A:
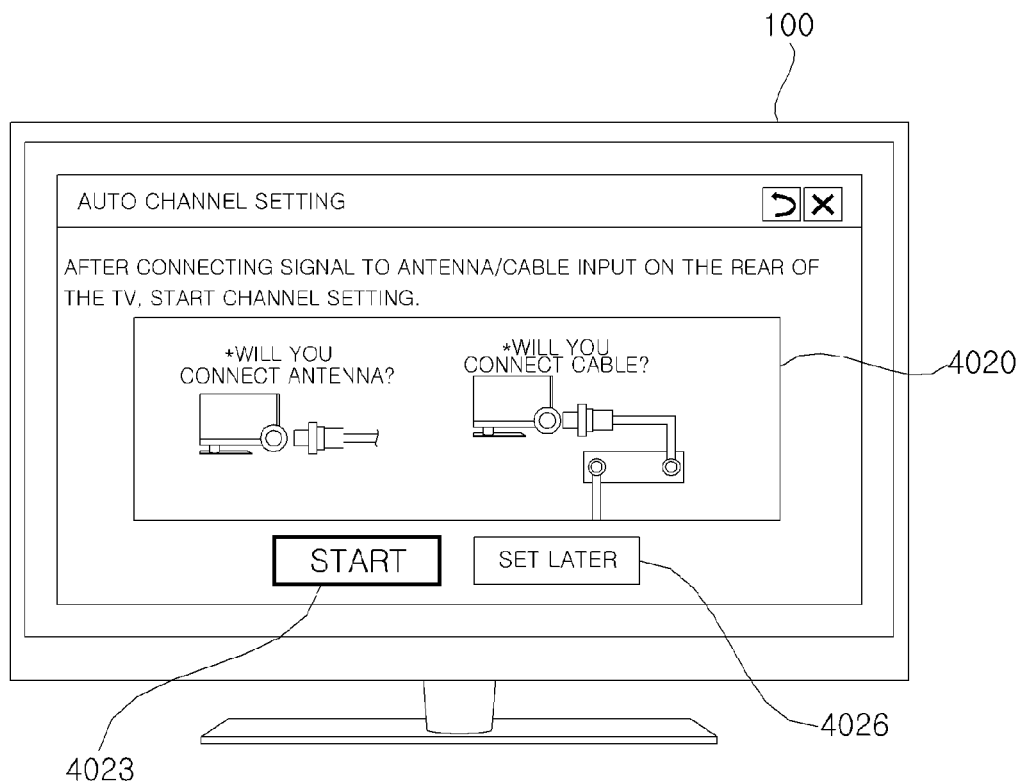

FIG. 40A is an exemplary view illustrating display of an automatic channel scan mode screen 4010 on the display 180. In FIG. 40A, a fast mode object 4013 and a normal mode object 4016 are displayed together on the automatic channel scan mode screen 4010 so that one of the fast mode and the normal mode may be selected according to user selection.

The image display apparatus 100 determines whether a first scan mode has been selected from among a plurality of scan modes (S3815). If the first scan mode has been selected, step S3820 is performed and otherwise, step S3860 is performed. The controller 170 determines whether the fast mode has been selected by a local key input or an input from the remote controller 200 and, if the fast mode has been selected, controls execution of the fast mode.

Referring to FIG. 40A, upon selection of the fast mode object 4013 on the automatic channel scan mode screen 4010, the image display apparatus 100 may scan channels in the fast mode.

Figure 40B:
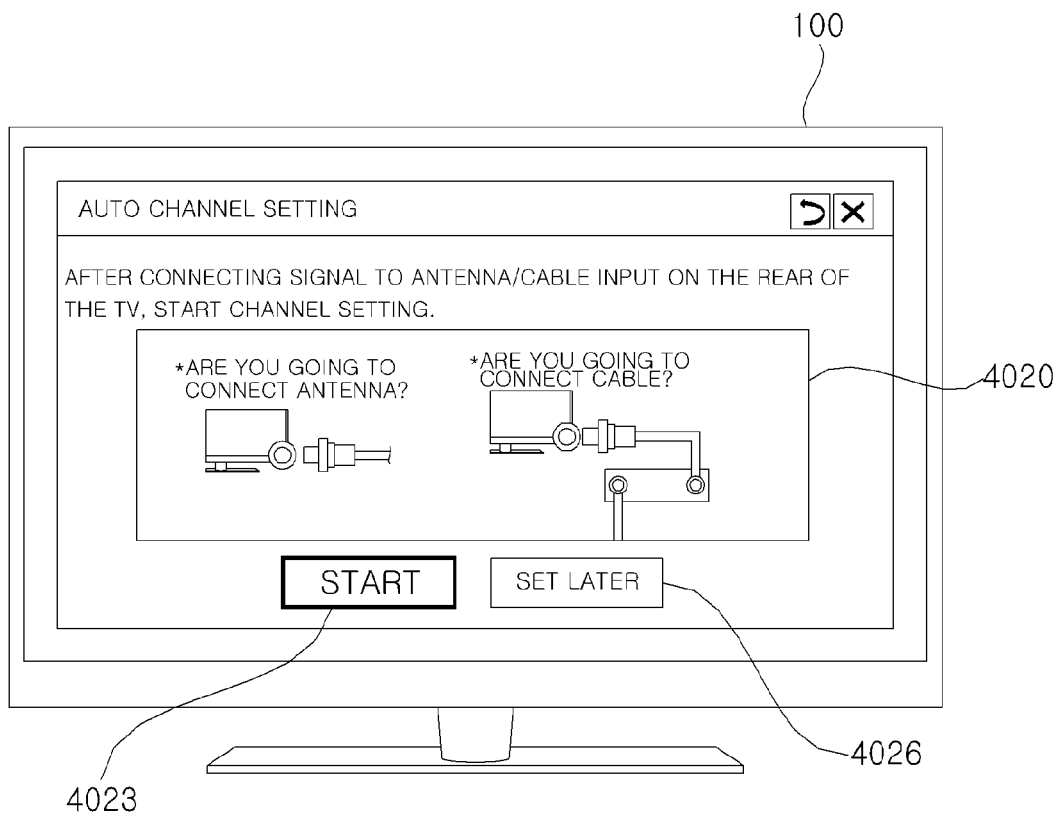

FIG. 40B is an exemplary view illustrating display of a screen 4020 indicating an antenna connection or a cable connection, when the fast mode is selected. A 'Start' object 4023 and a 'Set later' object 4026 are also displayed.

Figure 40C:
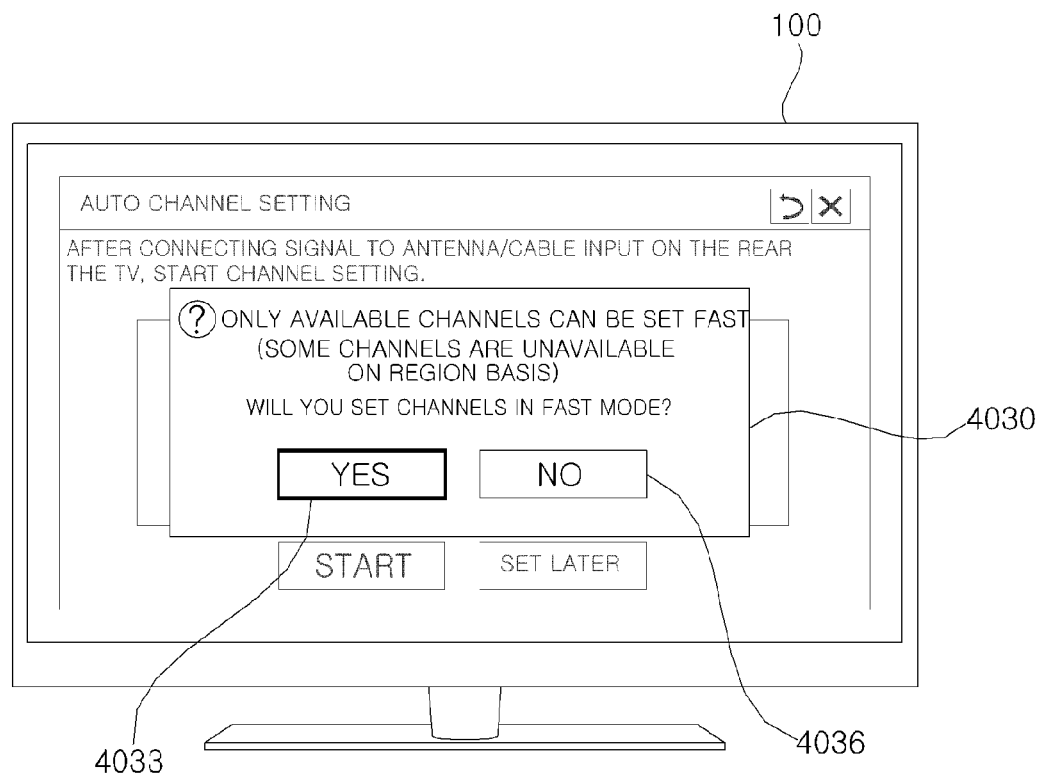

FIG. 40C is an exemplary view illustrating display of a fast mode start screen 4030 on the display 180. In FIG. 40C, the fast mode start screen 4030 may be displayed shortly after selection of the fast mode object 4013 illustrated in FIG. 40A or shortly after selection of the 'Start' object 4023 illustrated in FIG. 40B.

Referring to FIG. 4C, upon selection of a 'Yes' object 4033 in the fast mode start screen 4030, the fast mode may be set immediately. On the other hand, upon selection of a 'No' object 4036 in the fast mode start screen 4030, the normal mode may be set immediately.

The image display apparatus 100 scans broadcast signals of some channels among broadcast signals of a plurality of available channels (S3820). In the fast automatic channel scan mode, only a part of total channels available to the image display apparatus 100 are scanned and channel number information about the total channels are acquired using channel number information and channel name information about the scanned channels.

For this purpose, the image display apparatus 100 preferably scans only a part of the total channels. More preferably, some of cable broadcast channels, not terrestrial broadcast channels are scanned or some channels that differ in channel numbers according to services provided by a cable system operator are scanned.

That is, it is preferred that the channel numbers and names of some channels to which different channel numbers are assigned in different regions or according to different subscribed services are determined by channel scanning, rather than the channel numbers and names of channels to which the same channel numbers are assigned irrespective of regions or subscribed cable services are determined by channel scanning.

The controller 170 may control input of some cable channels through the external device interface 130.

Figure 39A:
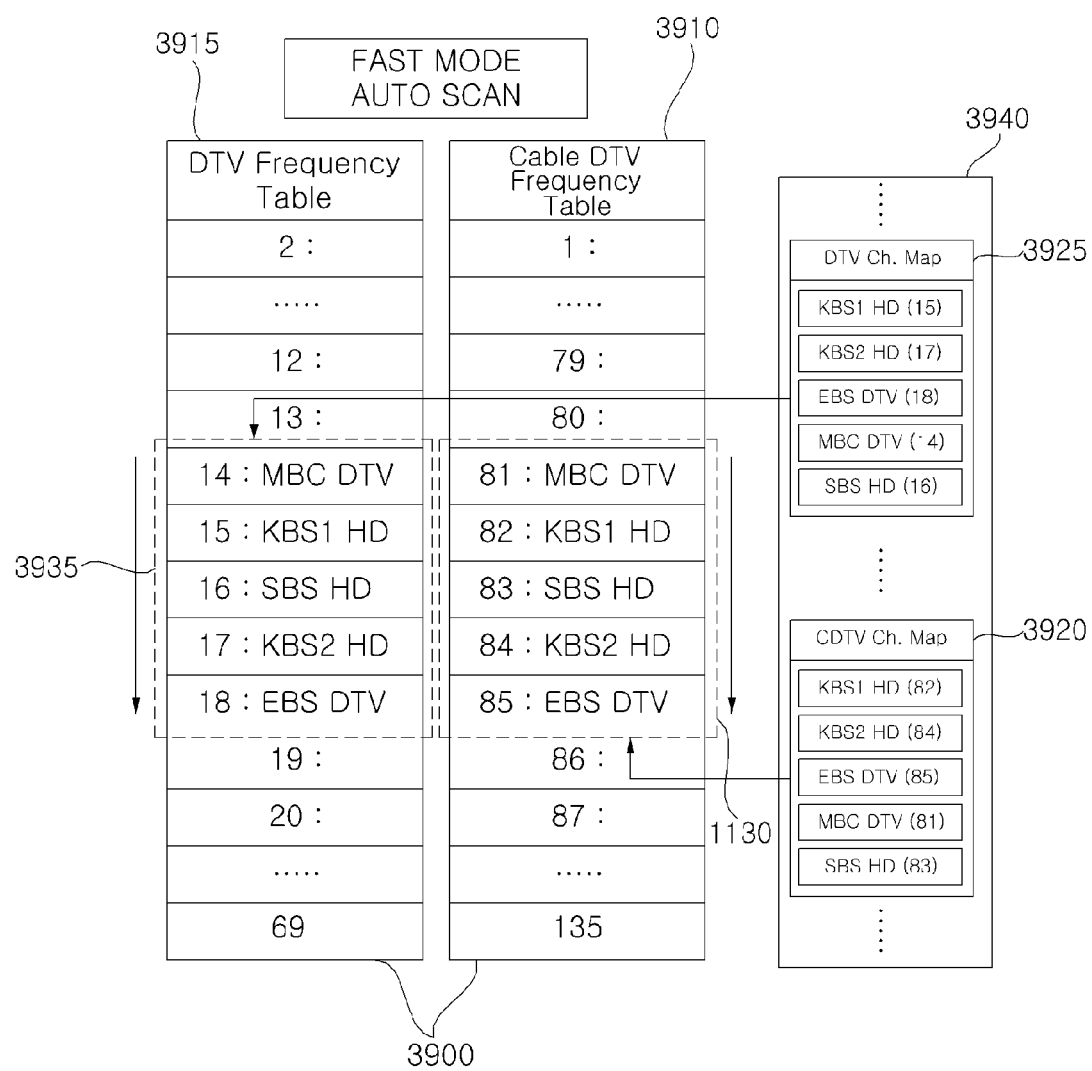
FIGS. 39A to 40C are views referred to for describing various examples of the method for operating the image display apparatus illustrated in FIG. 38.

Referring to FIG. 39A, it is noted that a part 3930 of cable channels 3910 among total channels 3900 are scanned. That is, cable channels CH 81 to CH 85 may be scanned.

During scanning of some channels, the image display apparatus 100 determines whether an image indicating a channel name or a program name exists in a broadcast image of a broadcast signal received on each channel (S3825). In the presence of an image indicating a channel name or a program name in the broadcast image, the image representing a channel name or a program name is extracted (S3830).

During scanning some channels, the controller 170 determines channel number information about the channels according to the frequencies of the channels. The controller 170 also determines the names of the channels.

A cable broadcast signal provided by a cable system operator does not provide EPG information. Therefore, a log detection technique is used to determine the name of a channel in an embodiment of the present invention.

That is, the controller 170 of the image display apparatus 100 determines whether an image indicating a channel name or a program name exists in a broadcast image of a broadcast signal received on each channel. In the presence of an image indicating a channel name or a program name, the controller 170 extracts the image.

For example, a log image representing a channel name or a program name is located at a corner of a broadcast image. Therefore, the controller 170 may extract the image from a corner of the broadcast image, especially from the top right corner, top left corner, or bottom right corner of the broadcast image.

The image display apparatus 100 determines the channel name of the broadcast signal based on the extracted image (S3855). The controller 170 of the image display apparatus 100 may determine the channel name of the channel based on the extracted image. For example, if a logo image representing a channel name is stored for each channel in the memory 140, the controller 170 may determine the channel name of the channel by comparing a broadcast image of the channel with the stored logo images.

In another example, the image display apparatus 100 may transmit the extracted image to the server 500 through the network interface 135 and receive channel name information corresponding to the image from the server 500. The image display apparatus 100 may determine the channel name of the channel based on the received channel name information.

Referring to FIG. 39A, it can be noted that the part 3930 of the cable channels 3910 among the total channels 3900 are scanned in the fast mode and the channel names of the cable channels CH 81 to CH 85 are determined. The channel names of the cable channels CH 81 to CH 85 may be MBC DTV, KBS1 HD, SBS HD, KBS2 HD, and EBD DTV, respectively.

The image display apparatus 100 transmits the determined channel number information and channel name information to the server 500 (S3840). Thus the server 500 receives the channel number information and the channel name information from the image display apparatus 100 (S3940). The controller 170 of the image display apparatus 100 may control transmission of the determined channel number information and channel name information to the server 500 through the network interface 135 during a partial scanning period.

For example, the image display apparatus 100 may transmit the channel number information and channel name information about the cable channels CH 81 to CH 85 illustrated in FIG. 39A to the server 500.

Besides the channel number information and channel name information, the image display apparatus 100 may further transmit location information (region information) about the image display apparatus 100 or information about a cable system operator that provides a subscribed cable broadcasting service (including information about the name of the cable system operator). Therefore, the server 500 may select a suitable channel map based on the location information or the subscribed cable system operator information in addition to the channel number information and channel name information.

The server 500 selects a matching channel map based on the received channel number information and channel name information. Specifically, the processor 720 of the server 500 selects a channel map matching to the channel number information and channel name information received from the image display apparatus 100 from among various channel maps stored in the memory 740.

Despite the same cable broadcasting channels, different channel numbers may be assigned to them in different regions or according to different subscribed services. In an embodiment of the present invention, a channel map is selected based on channel number information and/or channel name information about some channels, received from the image display apparatus 100.

For example, the processor 720 of the server 500 may select a channel map matching to the channel number information and channel name information about CH 81 to CH 85 illustrated in FIG. 39A.

Then the server 500 transmits channel number information and channel name information about a plurality of channels to the image display apparatus 100 according to the matching channel map.

The image display apparatus 100 receives the channel number information and channel name information about the plurality of channels (S3845).

The server 500 transmits the selected channel map through the network interface 730. Specifically, the server 500 may transmit the channel number information and channel name information about the plurality of channels in the selected channel map. Therefore, the image display apparatus 100 may receive the channel number information and channel name information about the plurality of channels through the network interface 130.

For example, as illustrated in FIG. 39A, the image display apparatus 100 may receive a channel map 3940. The channel map 3940 includes a channel map 3925 listing the channel numbers and channel names of terrestrial channels and a channel map 3920 listing the channel numbers and channel names of cable channels.

If the server 500 selects a plurality of channel maps, it may transmit the plurality of channel maps. For example, if there are two channel maps matching to the channel number information and channel name information about CH 81 to CH 85 in FIG. 39A, the server 500 may transmit the two channel maps or channel number information and channel name information about a plurality of channels included in each of the channel maps to the image display apparatus 100.

The image display apparatus 100 generates a channel map for the total channels (S3850). The controller 170 of the image display apparatus 100 may generate a channel map using the received channel number information and channel name information about the plurality of channels of the channel map.

Specifically, the image display apparatus 100 determines channel number information and channel name information about each channel during additional scanning and compares the determined channel number information and channel name information with the channel number information and channel name information about the plurality of channels, received from the server 500. If the determined channel number information and channel name information are identical to the received channel number information and channel name information, the image display apparatus 100 may determine that the received channel number information and channel name information are valid. The image display apparatus 100 may generate a channel map for the total channels using at least one of the received channel number information or channel name information about the plurality of channels.

For example, the controller 170 of the image display apparatus 100 may control the tuner 390 to additionally scan a part (CH 12 to CH 18) of terrestrial channels in FIG. 39A and may determine channel number information and channel name information about each channel during the additional scanning.

The controller 170 of the image display apparatus 100 compares the channel number and channel name information about CH 14 to CH 18 with the channel map 3925 of the terrestrial channels received from the server 500. If the channel number and channel name information match to the channel map 3925, the controller 170 determines that the overall channel map 3940 received from the server 500 is valid.

Accordingly, the controller 170 finally determines the overall channel map 3940 received from the server 500 as a channel map for the image display apparatus 100.

That is, the channel number information about the total channels 3900 can be acquired rapidly, simply by scanning about 12 channels instead of all of tens or hundreds of channels in the fast mode as illustrated in FIG. 39A, as described above. In addition, the channel name information about the total channels 3900 can be acquired. Thus, an overall channel map can be configured readily.

Meanwhile, determination of a final channel map means termination of the automatic channel scan mode.

On the other hand, if the first scan mode has not been selected in step S3815, the image display apparatus 100 determines whether a second scan mode has been selected (S3860). If the second scan mode has been selected, the image display apparatus 100 scans all of the plurality of available channels (S3865). The image display apparatus 100 determines channel number information and channel name information about each channel during scanning the channel (S3870).

The controller 170 of the image display apparatus 100 determines whether the normal mode has been selected by a local key input or an input from the remote controller 200. Upon selection of the normal mode, the controller 170 enters the normal mode.

Referring to FIG. 40A, upon selection of the normal mode object 4016 in the automatic channel scan mode screen 4010, the image display apparatus 100 may scan channels in the normal mode.

Referring to FIG. 40C, upon selection of the 'No' object 4036 in the fast mode start screen 4030, the image display apparatus 100 may scan channels in the normal mode.

The controller 170 of the image display apparatus 100 may control the tuner unit 110 to scan all of terrestrial channels and may also control the external device interface 130 to scan all of cable channels.

Figure 39B:
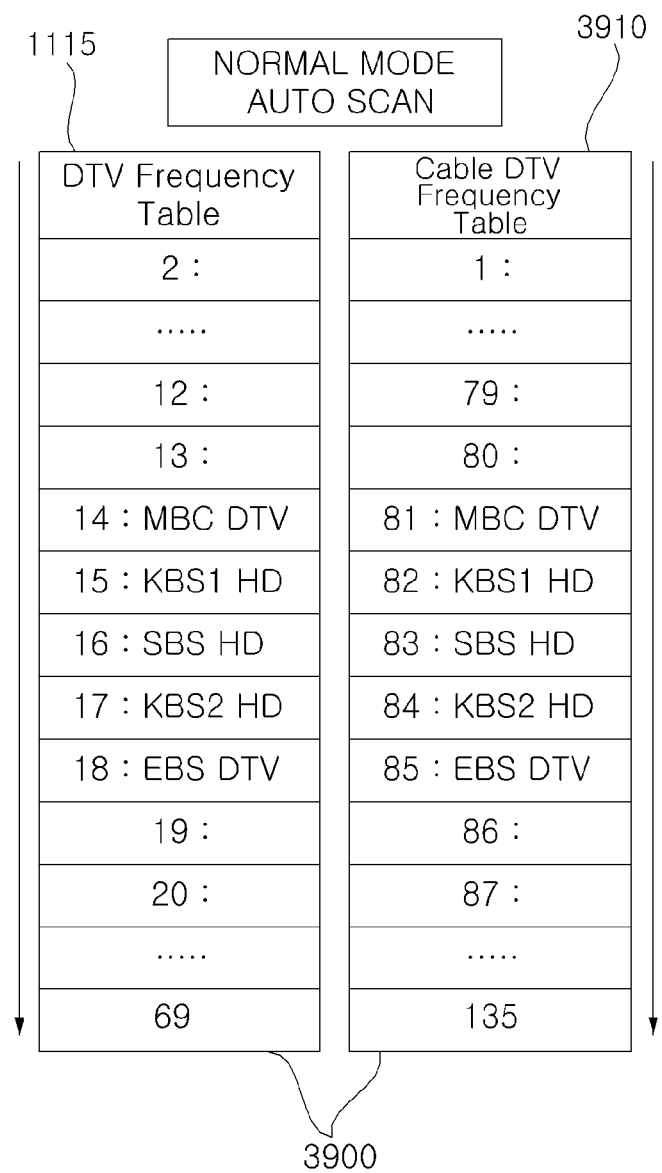

FIG. 39B is an exemplary view illustrating scanning of the total channels 3900. That is, all of the terrestrial channels 3915 are sequentially scanned and then all of the cable channels 3910 are sequentially scanned.

The controller 170 of the image display apparatus 100 may determine the channel number of each channel, while switching between the frequencies of the channels. In the case of terrestrial digital broadcast channels, their channel names may be determined from EPG information. In the case of terrestrial analog broadcast channels or cable channels, their channel names may be determined by detecting logo images from broadcast images of broadcast signals, as described before.

Compared to the fast mode, the total channels are scanned in the normal mode. Therefore, the channel names of the channels may not be determined, when needed. Determination of the channel numbers of the channels may be sufficient.

Upon completion of scanning the total channels, the controller 170 may generate a channel map using the determined channel number information. If there are determined channel names, the channel names may be used in generating the channel map.

The fast mode may be one of a plurality of modes for automatic channel scanning. That is, the fast mode may be performed during automatic channel scanning.

As is apparent from the above description, in accordance with an embodiment of the present invention, upon selection of one of a plurality of broadcast programs in a broadcast program list, an image display apparatus transmits channel information about the selected broadcast program to a remote controller, receives a broadcast signal of the broadcast program corresponding to the channel information from a set-top box, and displays a broadcast image corresponding to the broadcast signal. Therefore, a user can readily view an intended broadcast program.

One of the plurality of broadcast programs can be selected in a program-based fashion without channel number information. Therefore, the user can view an intended broadcast program reliably.

As the remote controller communicates with the set-top box in a first communication scheme and with the image display apparatus in a second communication scheme, the image display apparatus and the set-top box can be easily controlled using the single remote controller.

In accordance with another embodiment of the present invention, while a broadcast signal of a detected broadcast channel is being received in channel scan mode, if an image indicating a channel name is included in a broadcast image, the channel name image is extracted and the channel name of the broadcast channel is determined based on the extracted image. Thus, a channel map can be easily generated using channel number information and channel name information, thereby increasing user convenience.

On the contrary, in the absence of a channel name image in the broadcast image of the broadcast channel, channel number information and channel name information determined for other broadcast channels are transmitted to a server, channel map information is received from the server, and a channel map is updated using the received channel map information. Therefore, the channel map is completed so that it may include channel names for all channels.

In the case where channel number information and channel name information are included in a broadcast signal of a received broadcast channel such as a digital broadcast channel, the channel number and channel name of the broadcast channel can be determined and stored in a channel map, thus updating the channel map.

In accordance with another embodiment of the present invention, the server receives extracted image information or channel number and channel name information from the image display apparatus, selects a matching channel map from among a plurality of pre-stored channel maps, and then transmits information about the selected channel map to the image display apparatus. Accordingly, the image display apparatus can readily complete its channel map.

The server receives channel number information and channel name information from a plurality of image display apparatuses. If channel number information and channel name information received from a specific number of image display apparatuses among the plurality of image display apparatuses are identical, the server generates a channel map using the identical channel number information and channel name information and registers the channel map as a new channel map, if the channel map does not exist in the server.

As the image display apparatus displays this channel map, user convenience can be increased.

Furthermore, the image display apparatus can receive real-time viewer rating information from the server and display an object indicating the received real-time viewer rating information. Therefore, a user can readily view the real-time viewer rating information, thus experiencing increased use convenience.

In accordance with another embodiment of the present invention, since the image display apparatus can receive detailed information about a displayed broadcast image from the server and display the detailed information, user convenience can be increased.

The server can receive an image indicating a channel name or program name from the image display apparatus and thus readily identify a broadcast channel received at the image display apparatus based on the received image.

In accordance with another embodiment of the present invention, when recording mode is set, the image display apparatus determines the presence or absence of an image indicating broadcasting information in a broadcast signal. In the presence of the broadcasting information image, the image display apparatus stores broadcast content corresponding to the broadcast signal. Therefore, the image display apparatus can record only user-intended broadcast content, thereby increasing user convenience.

Especially in the absence of a broadcasting information image, the image display apparatus does not store the broadcast content corresponding to the broadcast signal despite a recording time in the recording mode. Accordingly, the image display apparatus can record only user-intended broadcast content reliably, thereby increasing user convenience.

A specific broadcast program item can be selected for scheduling recording on an EPG screen according to user selection. The presence or absence of a broadcasting information image is monitored at a recording starting time according to a recording mode setting. Thus, only user-intended broadcast content can be recorded reliably, except an advertisement image.

Since a broadcast signal is monitored to detect a broadcasting information image more frequently at the recording starting or ending time, only user-intended broadcast content can be recorded reliably, thereby increasing user convenience.

In accordance with another embodiment of the present invention, upon receipt of an application execution input, the image display apparatus acquires information about a broadcast program and displays a related application. Therefore, the user can readily acquire additional information about the broadcast program, thus experiencing increased use convenience.

The user convenience is further increased because an application can be executed on a broadcast program basis.

If a related application has not been installed in the image display apparatus, the image display apparatus accesses the server and an application list from the server. Upon selection of an application in the list, the image display apparatus downloads the selected application and installs the application. Therefore, a user-intended application can be installed and executed simply.

The broadcast program information can be extracted from EPG information in a received broadcast signal or acquired based on a log image indicating a channel name or program name in a broadcast image of a broadcast signal. In the absence of an EPG, the broadcast program information can be acquired by logo detection. Thus, user convenience can be increased.

In accordance with another embodiment of the present invention, the image display apparatus scans broadcast signals of some channels in automatic channel scan mode. During scanning the channels, the image display apparatus extracts an image indicating a channel name or program name from a broadcast image of a broadcast signal from each of the detected channels, determines the channel names of the broadcast signals using the extracted images, and fast identify total channels based on the determined channel names. Accordingly, user convenience can be increased.

For automatic channel scan, an object that allows selection one of a first scan mode for fast channel scan and a second scan mode for scanning all channels is displayed to thereby increase user convenience.

In accordance with another embodiment of the present invention, the image display apparatus transmits its location information or cable system operator information to the server in the automatic channel scan mode. Then the image display apparatus receives channel number and channel name information about a plurality of channels from the server, scans broadcast signals of a part of the plurality of channels, determines channel number information and channel name information about the channels during the partial scanning, and fast identifies all channels using the determined channel number and channel name information. Therefore, user convenience can be increased.

In a further embodiment of the present invention, the server receives channel number information and channel name information, or location information or cable system operator information about the image display apparatus from the image display apparatus, selects a channel map matching the received information, and transmits channel number information and channel name information about a plurality channels included in the matching channel map to the image display apparatus. Therefore, the image display apparatus can search channels fast in the automatic channel scan mode.

The image display apparatus and the methods for operating the image display apparatus according to the foregoing exemplary embodiments are not restricted to the exemplary embodiments set forth herein. Therefore, variations and combinations of the exemplary embodiments set forth herein may fall within the scope of the present invention.

The methods for operating the image display apparatus according to the foregoing exemplary embodiments may be implemented as code that can be written on a computer-readable recording medium and thus read by a processor in the portable terminal and the image display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, comprising:
displaying a broadcast program list listing a plurality of broadcast programs;
receiving, upon selection of one of the plurality of broadcast programs, a broadcast signal of the selected broadcast program;
displaying the received broadcast program, wherein the broadcast program list includes real-time viewer rating information, a thumbnail image, and a name for each of the plurality of broadcast programs;
extracting, in a presence of images representing a channel name or a program name in a plurality of images of a plurality of broadcast programs, the images representing the channel name or the program name from the plurality of images;
transmitting the extracted images to a server; and
receiving the real-time viewer rating information about the plurality of broadcast programs from the server.

2. The method according to claim 1, wherein the reception of a broadcast signal comprises:
extracting, upon selection of the one of the plurality of broadcast programs, channel information about the selected broadcast program using a pre-stored channel map; and
receiving the broadcast signal of the selected broadcast program according to the extracted channel information.

3. The method according to claim 1, further comprising receiving the broadcast program list from the server.

4. The method according to claim 1, further comprising:
receiving detailed information about a displayed broadcast image of the broadcast program from the server; and
displaying the received detailed information.

5. The method according to claim 1, further comprising:
determining whether an image representing broadcasting information is included in the broadcast signal, when recording mode is set; and
storing broadcast content corresponding to the broadcast signal in the recording mode, in the presence of the image representing the broadcasting information in the broadcast signal.

6. The method according to claim 1, further comprising:
executing an application related to the broadcast program based on broadcast program information about the broadcast program, upon receipt of an application execution input; and
displaying the executed application.

7. The method according to claim 1, further comprising:
entering a fast mode of automatic channel scan mode;
scanning broadcast signals of a part of a plurality of channels available to the image display apparatus, wherein the image representing the channel name or the program name is extracted during the scanning broadcast signals of a part of a plurality of channels available to the image display;
determining channel number information and channel name information about the broadcast signal corresponding to partially scanned channels based on the extracted image;
transmitting the determined channel number information and channel name information corresponding to the partially scanned channels to the server;
receiving channel number information and channel name information about the plurality of channels including the partially scanned channels from the server; and
generating a channel map using at least one of the received channel number information or channel name information about the plurality of channels including the partially scanned channels.

8. The method according to claim 1, wherein the broadcast program list includes at least one of a broadcast program type item, a real time ranking item, a daily ranking item, a weekly ranking item, or a monthly ranking item.

9. The method according to claim 1, wherein the reception of a broadcast signal comprises receiving the broadcast signal of the selected broadcast program from a set-top box.

10. The method according to claim 2, further comprising:
   entering a channel scan mode;
   receiving a broadcast signal of a detected broadcast channel in the channel scan mode;
   determining channel number information and channel name information about the broadcast channel based on the extracted images; and
   storing the channel number information and the channel name information about the broadcast channel in the channel map.

11. The method according to claim 10, further comprising:
   transmitting the channel number information and the channel name information to the server, in the absence of the images representing the channel name in the plurality of images of a plurality of broadcast images;
   receiving channel map information from the server; and
   updating the channel map using the received channel map information.

12. The method according to claim 10, wherein the determination of channel name information comprises determining a channel name of the broadcast channel by comparing the extracted images with a logo image representing a channel name pre-stored or received through a network.

13. A method for operating an image display apparatus, comprising:
   displaying a broadcast program list listing a plurality of broadcast programs;
   transmitting, upon selection of one of the plurality of broadcast programs, channel information about the selected broadcast program to a remote controller;
   receiving a broadcast signal of the broadcast program corresponding to the channel information from a set-top box;
   displaying the received broadcast program;
   extracting, in a presence of images representing a channel name or a program name in a plurality of images of a plurality of broadcast programs, the images representing the channel name or the program name from the plurality of images;
   transmitting the extracted images to a server; and
   receiving the real-time viewer rating information about the plurality of broadcast programs from the server.

14. The method according to claim 13, wherein the broadcast program list includes real-time viewer rating information, a thumbnail image, and a name for each of the plurality of broadcast programs.

15. An image display apparatus comprising:
   a network interface to exchange data with a server;
   a display to display a broadcast program list listing a plurality of broadcast programs;
   a broadcasting receiver to receive, upon selection of one of the plurality of broadcast programs, a broadcast signal of the selected broadcast program; and
   a controller to control display of the received broadcast program,
   wherein the broadcast program list includes real-time viewer rating information, a thumbnail image, and a name for each of the plurality of broadcast programs, and
   wherein in a presence of images representing a channel name or a program name in a plurality of images of a plurality of broadcast programs, the controller extracts images representing the channel name or the program name from the plurality of images, transmits the extracted images to the server, and receives the real-time viewer rating information about the plurality of broadcast programs from the server.

16. The image display apparatus according to claim 15, wherein upon selection of the one of the plurality of broadcast programs, the controller extracts channel information about the selected broadcast program using a pre-stored channel map, and the broadcasting receiver receives the broadcast signal of the selected broadcast program according to the extracted channel information.

17. The image display apparatus according to claim 16, further comprising a memory to store the channel map,
   wherein the broadcasting receiver receives a broadcast signal of a detected broadcast channel in a channel scan mode, and in the presence of an image representing a channel name in a broadcast image of the broadcast signal, the controller determines channel number information and channel name information about the broadcast channel based on the extracted images, and stores the channel number information and the channel name information about the broadcast channel in the channel map.

18. The image display apparatus according to claim 17, wherein the network interface is configured to transmit the channel number information and the channel name information to the server, in the absence of the images representing the channel name in the plurality of images of a plurality of broadcast images and to receive channel map information from the server, and
   wherein the controller updates the channel map using the received channel map information.

* * * * *